US012795008B2

(12) United States Patent
Baik et al.

(10) Patent No.: US 12,795,008 B2
(45) Date of Patent: Nov. 10, 2026

(54) SLIDABLE ELECTRONIC DEVICE COMPRISING FLEXIBLE DISPLAY

(71) Applicant: Samsung Electronics Co., Ltd., Suwon-si (KR)

(72) Inventors: Jinwook Baik, Suwon-si (KR); Hwamok Pak, Suwon-si (KR); Byounguk Yoon, Suwon-si (KR); Sunggun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 204 days.

(21) Appl. No.: 18/902,696

(22) Filed: Sep. 30, 2024

(65) Prior Publication Data

US 2025/0023967 A1 Jan. 16, 2025

Related U.S. Application Data

(63) Continuation of application No. PCT/KR2023/004183, filed on Mar. 29, 2023.

(30) Foreign Application Priority Data

Mar. 30, 2022 (KR) ........................ 10-2022-0039980
Jun. 21, 2022 (KR) ........................ 10-2022-0075727

(51) Int. Cl.
*H04M 1/02* (2006.01)

(52) U.S. Cl.
CPC ....... *H04M 1/0235* (2013.01); *H04M 1/0268* (2013.01)

(58) Field of Classification Search
CPC .. H04M 1/0235; H04M 1/0268; H04M 1/185; H04M 1/0237; H04M 1/02;
(Continued)

(56) References Cited

U.S. PATENT DOCUMENTS 7,496,194 B2 2/2009 Jeun
10,129,376 B2 11/2018 Cho et al.
(Continued)

FOREIGN PATENT DOCUMENTS

CN 110320968 A 10/2019
CN 112901708 A 6/2021
(Continued)

OTHER PUBLICATIONS

International Search Report for PCT/KR2023/004183 mailed Jun. 23, 2023, 4 pages.
(Continued)

*Primary Examiner* — Andrew Wendell
(74) *Attorney, Agent, or Firm* — Nixon & Vanderhye, P.C.

(57) ABSTRACT

According to an exemplary embodiment of the present disclosure, a slidable electronic device comprises: a flexible display module; a first housing in which a first area of the flexible display module is arranged; a second housing which can slide with respect to the first housing, and supports a second area of the flexible display module; and a hook assembly positioned in the second housing, wherein the hook assembly comprises a block arranged on the second housing, a hook positioned on the block so as to be linearly movable with respect to the block, and a lock positioned on the block so as to be linearly movable, respect to the block, in the direction perpendicular to the movement direction of the hook, and, while in a first state in which the second housing is slid out by a first distance with respect to the first housing, the hook is inserted into a hook coupling groove provided on the first housing, and, while in a second state in which, from the first state, the second housing is slid out further by a second distance with respect to the first housing, the hook escapes the hook coupling groove, and the lock is
(Continued)

coupled to a recess provided on the hook and can fix the hook in place.

17 Claims, 22 Drawing Sheets

(58) Field of Classification Search
CPC ............. H04M 1/0233; H04M 1/0266; H04M 1/0295; G06F 1/1624; G06F 1/1652; H04B 1/03; H04B 1/08
See application file for complete search history.

(56) References Cited

U.S. PATENT DOCUMENTS

| | | | | |
|---|---|---|---|---|
| 10,362,689 | B2 | 7/2019 | Cho et al. | |
| 10,747,269 | B1 | 8/2020 | Choi et al. | |
| 11,523,526 | B2 | 12/2022 | Liu | |
| 12,048,107 | B2 | 7/2024 | Li | |
| 2003/0064688 | A1* | 4/2003 | Mizuta | H04M 1/0247 455/90.3 |
| 2006/0053847 | A1* | 3/2006 | Taki | H04M 1/0237 70/247 |
| 2008/0129554 | A1* | 6/2008 | Patel | H04M 1/66 341/24 |
| 2010/0283934 | A1* | 11/2010 | Wang | G06F 1/1601 349/58 |
| 2017/0325342 | A1* | 11/2017 | Lee | G06F 1/1652 |
| 2019/0278335 | A1* | 9/2019 | Yeh | G06F 1/1601 |
| 2020/0177718 | A1* | 6/2020 | Cao | G06F 1/1681 |
| 2021/0185835 | A1 | 6/2021 | Song et al. | |
| 2021/0223820 | A1 | 7/2021 | Yoo et al. | |
| 2021/0329106 | A1* | 10/2021 | Song | H01Q 1/243 |
| 2022/0232716 | A1 | 7/2022 | Lim et al. | |
| 2022/0253103 | A1* | 8/2022 | Choi | G06F 1/1624 |
| 2022/0418123 | A1* | 12/2022 | Liu | G01D 5/145 |

FOREIGN PATENT DOCUMENTS

| | | | |
|---|---|---|---|
| CN | 114038337 | A | 2/2022 |
| CN | 115225736 | A | 10/2022 |
| CN | 116506537 | A | 7/2023 |
| KR | 20060025744 | A | 3/2006 |
| KR | 20090123463 | A | 12/2009 |
| KR | 20160011718 | A | 2/2016 |
| KR | 101649664 | B1 | 8/2016 |
| KR | 20160141255 | A | 12/2016 |
| KR | 20210143419 | A | 11/2021 |
| KR | 20210148396 | A | 12/2021 |

OTHER PUBLICATIONS

Written Opinion of the ISA for PCT/KR2023/004183 mailed Jun. 23, 2023, 4 pages.
Extended European Search Report dated Feb. 19, 2025 issued in European Patent Application No. 23716755.6.

* cited by examiner

SLIDABLE ELECTRONIC DEVICE COMPRISING FLEXIBLE DISPLAY

TECHNICAL FIELD

The disclosure relates to a slidable electronic device including a flexible display.

Background Art

In line with development of digital technologies, electronic devices have been provided in various types such as a smartphone, a tablet personal computer, or a personal digital assistant (PDA). Electronic devices have been designed to provide larger screens while having portable sizes.

The above-described information may be provided as a related art intended to help understanding of the disclosure. No claim or determination is raised with regard to whether any of the above descriptions can be applied as a prior art related to the disclosure.

DISCLOSURE OF INVENTION

Technical Problem

An electronic device may move a flexible display in a sliding type, thereby providing screen expansion. When the electronic device slides, the flexible display may be moved from inside the electronic device to the outside of the electronic device, and the screen may be expanded accordingly. When an external impact is applied to the electronic device due to a situation such as a fall of the electronic device, the flexible display and/or components (for example, electrically power elements) having driving-related connection thereto may be fractured.

Embodiments of the disclosure may provide a slidable electronic device including a flexible display, wherein the stress influence of an external impact on the flexible display and/or components having driving-related connection to the flexible display can be reduced.

Technical problems addressed by the disclosure are not limited to the above-mentioned technical problems, and other technical problems not mentioned herein will be clearly understood from the following description by those skilled in the art to which the disclosure pertains.

Solution to Problem

According to an example embodiment of the disclosure, a slidable electronic device may include a flexible display module, a first housing, a second housing, and a hook assembly. A first area of the flexible display module may be disposed in the first housing. The second housing may be configured to be slidable with respect to the first housing and support a second area of the flexible display module. The hook assembly may be positioned in the second housing. The hook assembly may include a block, a hook, and a lock. The block may be disposed in the second housing. The hook may be positioned in the block so as to be linearly movable with respect to the block. The lock may be positioned in the block so as to be linearly movable in a direction perpendicular to the movement direction of the hook with respect to the block. In a first state where the second housing is slid out with respect to the first housing by a first distance, the hook may be inserted into a hook fastening groove provided on the first housing. In a second state where the second housing is further slid out with respect to the first housing by a second distance in the first state, the hook may be separated from the hook fastening groove, and the lock may be fastened to a recess provided on the hook so as to fix the position of the hook.

According to an example embodiment of the disclosure, a slidable electronic device may include a flexible display module, a first housing, a second housing, a third housing, and a hook assembly. A first area of the flexible display module may be disposed in the first housing. The second housing may be configured to be slidable with respect to the first housing and support a second area of the flexible display module. The third housing may be configured to accommodate the second housing and be coupled to the second housing. The hook assembly may be connected to the first housing. The hook assembly may include a block, a hook, and a lock. The block may be disposed in the second housing. The hook may be positioned in the block so as to be linearly movable with respect to the block. The lock may be positioned in the block so as to be linearly movable in a direction perpendicular to the movement direction of the hook with respect to the block. In a first state where the second housing is slid out with respect to the first housing by a first distance, the hook may be inserted into a hook fastening groove provided on the first housing. In a second state where the second housing is further slid out with respect to the first housing by a second distance in the first state, the hook may be separated from the hook fastening groove, and the lock may be fastened to a recess provided on the hook so as to fix the position of the hook.

Advantageous Effects of Invention

A slidable electronic device including a flexible display, according to various embodiments of the disclosure, may distribute an external impact while reducing the stress influence of the external impact on the flexible display and/or components related to movements thereof, thereby improving durability of the electronic device and reliability of the electronic device, the screen of which can be expanded.

Other advantageous effects obtainable or predictable from various embodiments of the disclosure may be disclosed explicitly or implicitly in the following description of embodiments of the disclosure.

BRIEF DESCRIPTION OF DRAWINGS

The above and other aspects, features and advantages of certain embodiments of the present disclosure will be more apparent from the following detailed description, taken in conjunction with the accompanying drawings, in which.

MODE FOR THE INVENTION

Hereinafter, various example embodiments of the disclosure disclosed herein will be described in greater detail with reference to the accompanying drawings.

Figure 1:
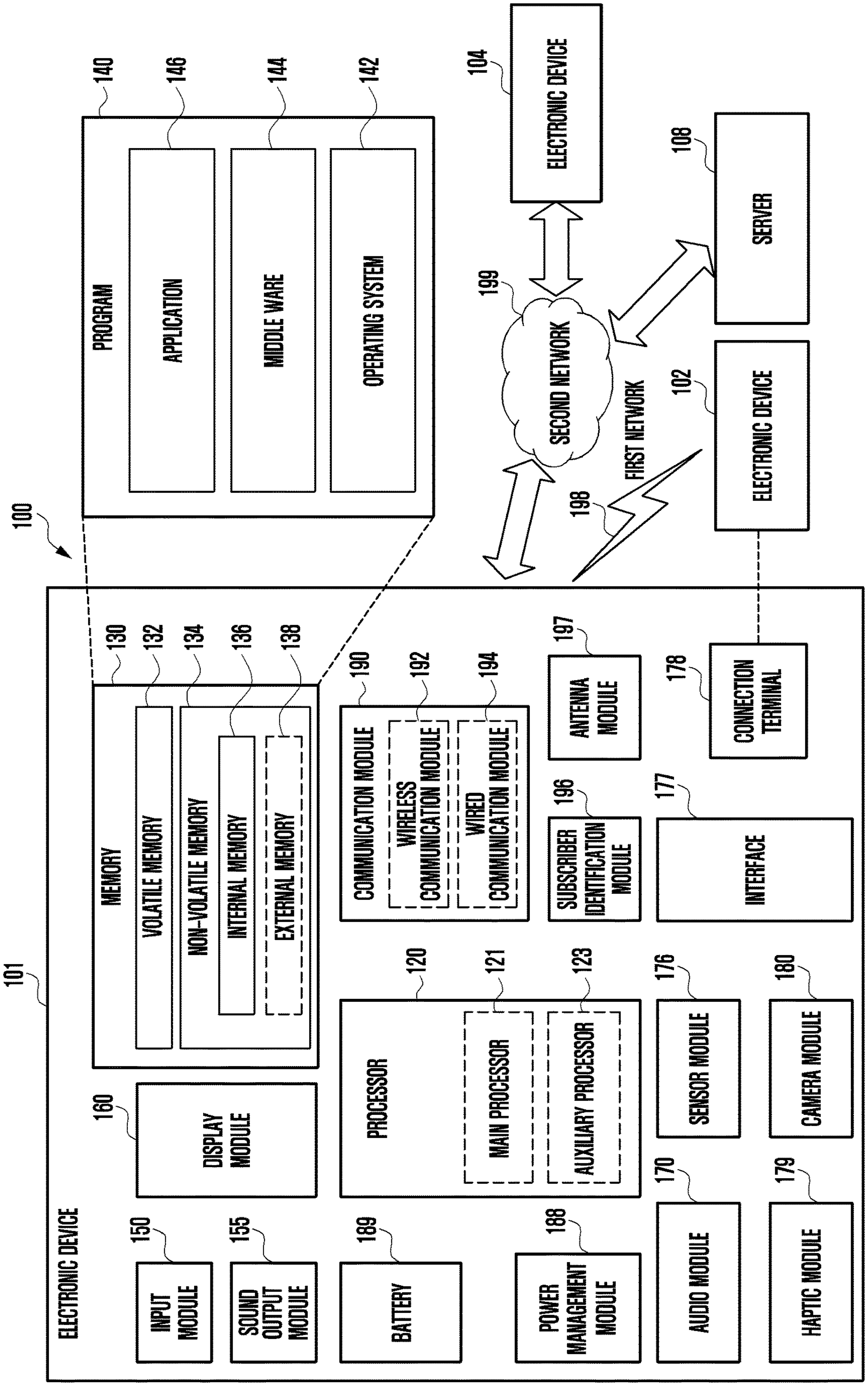
FIG. 1 is a block diagram of an electronic device in a network environment according to an embodiment of the disclosure.

FIG. 1 is a block diagram of an electronic device 101 in a network environment 100 according to an embodiment of the disclosure.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments of the disclosure, at least one (e.g., the connection terminal 178) of the components may be omitted from the electronic device 101, or one or more other components may be added in the electronic device 101. In some embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples.

In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the external electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a 5th generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mmWave band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., external the electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form a mm Wave antenna module. According to an embodiment of the disclosure, the mmWave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In another embodiment of the disclosure, the external electronic device 104 may include an internet of things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), the element may be coupled with the other element directly (e.g., wiredly), wirelessly, or via a third element.

The term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAY-STORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
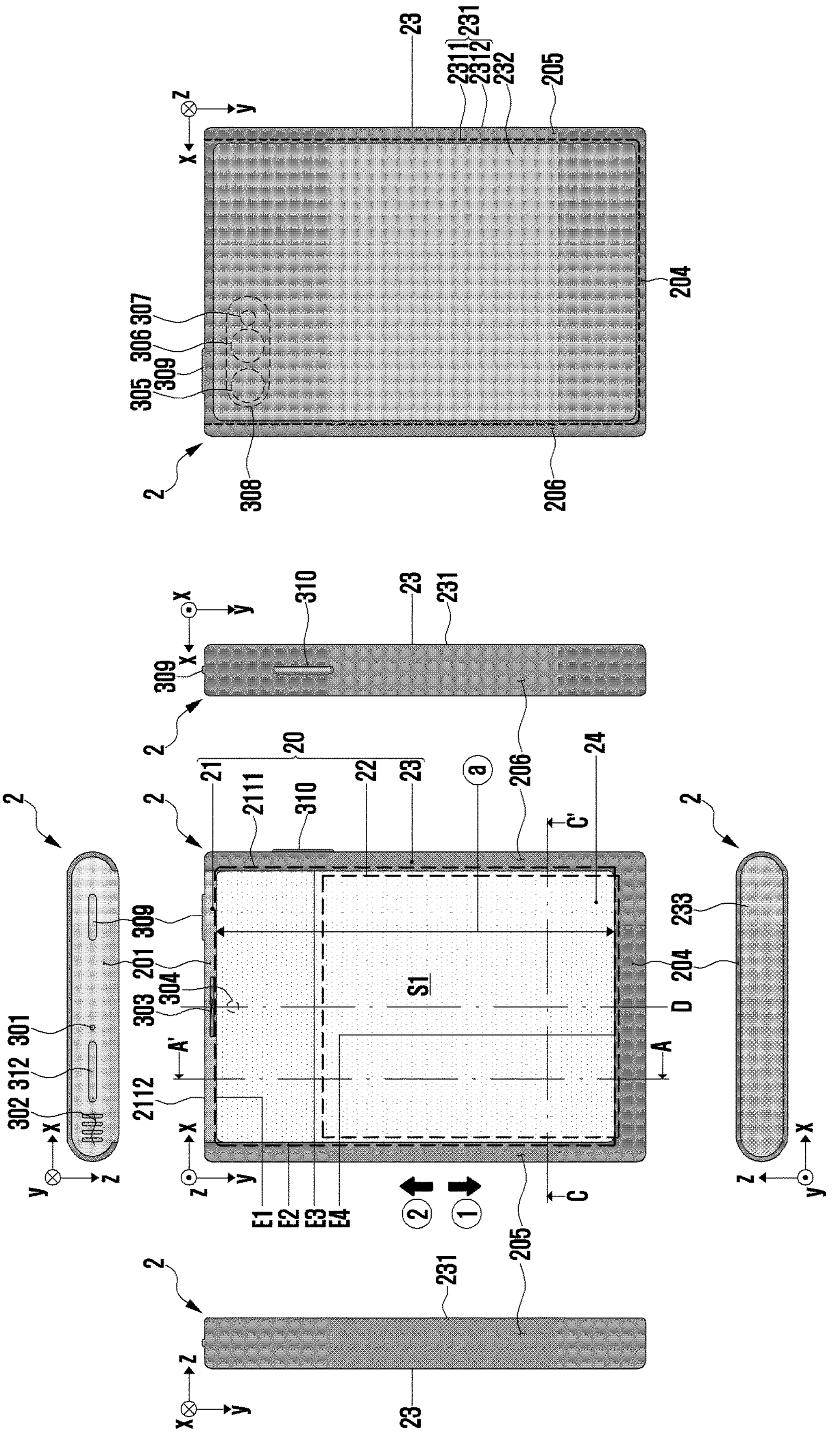
FIG. 2 is views showing a slidable electronic device in a closed state according to an embodiment of the disclosure.
Figure 3:
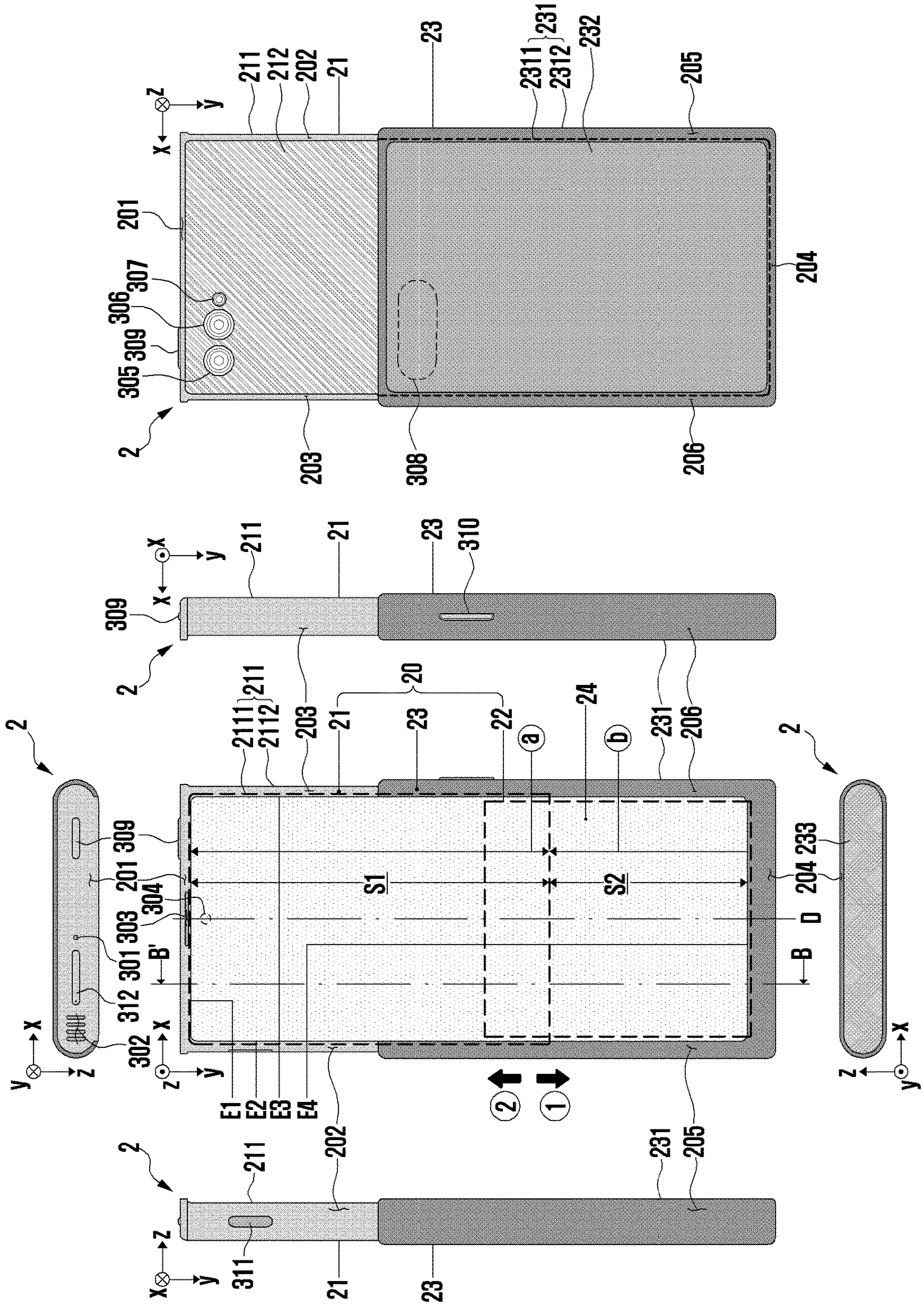
FIG. 3 is views showing a slidable electronic device in an open state according to an embodiment of the disclosure.

FIG. 2 is showing a slidable electronic device 2 in a closed state according to an embodiment of the disclosure. FIG. 3 is showing a slidable electronic device 2 in an open state according to an embodiment of the disclosure. In various embodiments of the disclosure, for the convenience of explanation, the direction (for example, the +z-axis direction), in which a screen (e.g., a display area or an active area of the flexible display module 24, which is seen from the outside) is seen, is interpreted and used as the front surface of a slidable electronic device 2, and a direction (for example, the −z-axis direction) opposite thereto is interpreted and used as the rear surface of the slidable electronic device 2.

Referring to FIGS. 2 and 3, the slidable electronic device 2 includes a slidable housing 20 and a flexible display module 24. For example, the slidable housing 20 may include a first housing (a first housing part, or a first housing structure) 21, a second housing (a second housing part, or a second housing structure) 22, and/or a third housing (a third housing part, or third housing structure) 23. The second housing 22 is connected to the first housing 21 to be slidable with respect to the first housing 21. Sliding of the second housing 22 with respect to the first housing 21 may be a change in a relative position between the first housing 21 and the second housing 22, and may be interpreted as sliding of the first housing 21 with respect to the second housing 22 or be interpreted as the mutual sliding between the first housing 21 and the second housing 22. The first housing 21 and the third housing 23 may be outer housings for substantially providing the exterior of the slidable electronic device 2, and the second housing 22 may be an inner housing positioned inside the slidable electronic device 2 to correspond to the third housing 23 and thus hidden. The third housing 23 may be coupled to the second housing 22, and be moved together with the second housing 22 in case that the second housing 22 slides with respect to the first housing 21. The slidable housing 20 may be implemented to enable mutual sliding between the first housing 21 and a housing structure including the second housing 22 and third housing 23, and a sliding structure (e.g., a sliding structure including a guide rail) for mutual stable sliding therebetween may be provided with respect to the first housing 21 and the second housing 22 or be provided with respect to the first housing 21 and the third housing 23. The flexible display module 24 may include a first area ⓐ positioned to correspond to the first housing 21, and a second area ⓑ which extends from the first area ⓐ and is positioned to correspond to the second housing 22. The first area ⓐ may be positioned in the first housing 21 and be supported by the first housing 21. The first area ⓐ may be exposed to the outside, and the slidable electronic device 2 may provide a first screen area S1 through the first area ⓐ. The second area ⓑ may be supported by the second housing 22 which is slidable with respect to the first housing 21. In case that the second housing 22 slides with respect to the first housing 21 in a first direction ① (e.g., the +y-axis direction), at least a part of the second area ⓑ may be withdrawn from a space between the second housing 22 and the third housing 23 to the outside (a position on the slidable electronic device 2, which is seen from the outside) and thus be seen therefrom. In case that the second housing 22 slides with respect to the first housing 21 in a second direction ② (e.g., the −y-axis direction) opposite to the a first direction ①, at least a part of the second area ⓑ may be inserted into the space between the second housing 22 and the third housing 23 and thus be hidden. The slidable electronic device 2 may provide a screen area obtained by adding a second screen area (or a second display area) S2 to the first screen area (or the first display area) S1 through at least a part of the second area ⓑ, which is withdrawn to the outside. The proportion of a portion, which is withdrawn to the outside, of the second area ⓑ, and the size of a screen corresponding to the portion may be changed according to a position or a distance to or by which the second housing 22 has slid with respect to the first housing 21. FIG. 2 illustrates the slidable electronic device 2 in a state where the screen is not expanded, and FIG. 3 illustrates the slidable electronic device 2 in a state where the screen is expanded. The state where the screen is not expanded may be a state where the second housing 22 is not moved with respect to the first housing 21 in the first direction ①, and may be referred to as a "closed state" of the slidable electronic device 2. The state where the screen is expanded may be a state where the second housing 22 is no longer moved in the first direction ①, that is, maximally moved, and may be referred to as an "open state" of the slidable electronic device 2. In various embodiments, the open state may include a fully open state (see FIG. 3) or an intermediate state. The intermediate state may indicate a state between a closed state (see FIG. 2) and a fully open state. The case where the second housing 22 is at least partially moved with respect to the first housing 21 in the first direction ① may be referred to as a "slide-out" of the second housing 22 or the flexible display module 24. The case where the second housing 22 is at least partially moved with respect to the first housing 21 in the second direction ② opposite to the first direction ① may be referred to as a "slide-in" of the second housing 22 or the flexible display module 24. At the time of sliding of the second housing 22 with respect to the first housing 21, in order for the second housing to change direction and then be movable in case that the second area ⓑ are withdrawn from the space between the second housing 22 and the third housing 23 to the outside or inserted into the space between the second housing 22 and third housing 23 from the outside, the second area ⓑ may be disposed to have a bending part. The second area ⓑ may be referred to as other terms such as a "bendable area" or a "bendable section". In the slidable electronic device 2 for providing an expandable screen in response to mutual sliding between the first housing 21 and the second housing 22, the flexible display module 24 (or a flexible display) may be referred to as other terms such as an "expandable display", a "slidable display", or a "slide-out display". The slidable electronic device 2, which provides an expandable screen in response to mutual sliding between the first housing 21 and the second housing 22, may be referred to as other terms such as a "stretchable electronic device" or a "rollable electronic device".

According to an embodiment, in an open state (see FIG. 3) of the slidable electronic device 2, a screen including the first screen area S1 provided by the first area ⓐ of the flexible display module 24 and the second screen area S2 provided by the second area ⓑ of the flexible display module 24 may be provided in a substantially flat-surface shape. The direction, in which the front surface of the slidable electronic device 2 is oriented, may be a direction in which the screen having a flat-surface shape is oriented. The first area ⓐ of the flexible display module 24 may be disposed in the first housing 21 to be substantially flat, and the first area ⓐ may provide the first screen area S1 which corresponds thereto and has a flat-surface. The second area ⓑ of the flexible display module 24 may be disposed to have a bending part. The bending part may be a portion of the second area ⓑ, which is disposed and maintained in a bended shape, so that the second area ⓑ is changed in a direction different from that of the first area ⓐ and then moved, at the time of sliding of the second housing 22 with respect to the first housing 21. According to the position or the distance to or by which the second housing 22 has slid with respect to the first housing 21, the portions for providing the bending part of the second area ⓑ may be different, but the shape of the bending part may be provided substantially the same. The size of the portion between the bending part of the second area ⓑ and the first area ⓐ may increase in case that the second housing 22 slides out, and decrease in case that the second housing 22 slides in. In an open state of the slidable electronic device 2, the second screen area S2 may be provided through the portion between the bending part of the second area ⓑ and the first area ⓐ. A part between the bending part of the second area ⓑ and the first area ⓐ may be disposed substantially flat in a form of being smoothly connected to the first area ⓐ without lifting. In an embodiment, the slidable electronic device 2 may include a tension device which allows the portion between the bending part of the second area ⓑ and the first area ⓐ to be disposed substantially flat while preventing the lifting phenomenon due to the elasticity of the flexible display module 24, in an open state of the slidable electronic device 2.

According to an embodiment, the screen of the slidable electronic device 2 may be provided in a rectangular shape, and for example, may include a first edge E1, a second edge E2, a third edge E3, and a boundary E4 with the bending part of the second area ⓑ. When seen from above the screen, the first edge E1 may be positioned to be spaced apart from the boundary E4 with the bending part in the second direction ② (e.g., the slide-in direction), and be substantially parallel to the boundary E4 with the bending part. The second edge E2 may extend from one end of the first edge E1 to the boundary E4 with the bending part, and may be substantially perpendicular to the first edge E1. The third edge E3 may extend from the other end of the first edge E1 to the boundary E4 with the bending part, and may be substantially parallel to the second edge E2. In case that the second housing 22 slides out, due to the expansion of the screen, the distance, in which the boundary E4 with the bending part is spaced apart from the first edge E1 in the first direction ①, may increase, and the second edge E2 and the third edge E3 may become long.

According to an embodiment, the first housing 21 may include a first frame (a first frame structure, a first framework, or a first case) 211, and/or a first cover 212 disposed in the first frame 211. The first frame 211 may include a first support part 2111 and a first side wall part (a first bezel, a first side wall bezel, or a first side wall bezel structure) 2112 connected to the first support part 2111. In an embodiment, the first area ⓐ of the flexible display module 24 may be disposed in the first support part 2111, and the first support part 2111 may support the first area ⓐ. The first side wall part 2112 may include a first side wall 201, a second side wall 202, and/or a third side wall 203. The first side wall 201 may be positioned to correspond to the first edge E1 of the screen. The second side wall 202 may be positioned to correspond to the second edge E2 of the screen. The third side wall 203 may be positioned to correspond to the third edge E3 of the screen. When seen from above the front surface of the slidable electronic device 2, the second side wall 202 may extend from one end of the first side wall 201 in the first direction ① (e.g., the slide-out direction), and the third side wall 203 may extend from the other end of the first side wall 201 in the first direction ①. When seen from above the front surface of the slidable electronic device 2, the second side wall 202 and the third side wall 203 may be substantially parallel to each other, and be substantially perpendicular to the first side wall 201. The first frame 211 may be provided as an integral member or structure including a first support part 2111 and the first side wall part 2112. The first support part 2111 may be provided separately from the first side wall part 2112, and be connected to the first side wall part 2112 by using mechanical fastening such as screw fastening (or bolt fastening) or bonding including an adhesive material (or a bonding material). In some embodiments, the first support part 2111 may be defined or interpreted as a separate element from the first frame 211 or the first housing 21. The first cover 212 may be positioned at the side of the rear surface of the slidable electronic device 2, and may be referred to as terms such as a "first back cover" or a "first rear plate". For example, various electronic components such as a printed circuit board may be arranged in the first support part 2111 (or the first area ⓐ of flexible display module 24), between the first support part 2111 and the first cover 212. In an embodiment, the first cover 212 may be disposed in first side wall part 2112. For example, the first side wall part 2112 may include a first cover arrangement area provided to correspond to the edge area of the first cover 212. For example, the first cover arrangement area may be a stepped portion provided in the first side wall part 2112 so that the first cover 212 is fitted to and seated in the first side wall part 2112. For another example, the first cover arrangement area may be provided as a substantially flat-surface area (or a flat-surface part). The first cover 212 may be disposed in the first cover arrangement area by using screw fastening. For another example, the first cover 212 may be disposed in the first cover arrangement area by using snap-fits fastening (e.g., a manner in which a hook is fastened to a hook fastening part). For another example, in order to dispose the first cover 212 in the first side wall part 2112, an adhesive material (or a bonding material) may be placed between the first cover arrangement area and the edge area of the first cover 212. In some embodiments, when seen from above the rear surface of the slidable electronic device 2, the first cover arrangement area may be expanded to at least partially overlap the first cover 212. In some embodiments, the first cover arrangement area corresponding to the edge area of the first cover 212 may be provided by the first support part 2111. A part of the outer surface of the slidable electronic device 2, which is provided by the first side wall part 2112, may be smoothly connected to a part of the outer surface of the slidable electronic device 2, which is provided by the first cover 212. In some embodiments, the first cover 212 may be omitted, and the first frame 211 may be provided in a shape further including a portion corresponding to the first cover 212. In some embodiments, the first cover 212 may be defined or interpreted as a separate element from the first housing 21.

According to an embodiment, the third housing 23 may provide the exterior of the slidable electronic device 2 together with the first housing 21, in a movable assembly provided by a combination of the first housing 21 and the second housing 22 which are slidably connected to each other, and the flexible display module 24 drivingly disposed therein. For example, the third housing 23 may include a third frame (a third frame structure, a third framework, or a third case) 231, a second cover 232 disposed in third frame 231, and/or a third cover 233 disposed in third frame 231. The third frame 231 may be provided as an integral member or structure including a second support part (a bottom part or a bottom) (e.g., a plate) 2311 and a second side wall part 2312. For another example, the second support part 2311 may be provided separately from the second side wall part 2312, and be connected to the second side wall part 2312 by using a manner such as screw fastening (or bolt fastening). The second side wall part 2312 may extend from the edge of the second support part 2311. Due to the combination of the second support part 2311 and the second side wall part 2312, the third housing 23 may have a space capable of accommodating the first housing 21 and the second housing 22. For example, the second side wall part 2312 may include a fourth side wall 204, a fifth side wall 205, and/or a sixth side wall 206. The fourth side wall 204 may be positioned to be spaced apart from the first side wall 201 in the first direction ① (e.g., the slide-out direction) and be substantially parallel to the first side wall 201. When seen from above the front surface of the slidable electronic device 2 (e.g., when seen in the −z-axis direction), the fifth side wall 205 may be positioned to correspond to the second side wall 202 and may extend from one end of the fourth side wall 204 in the second direction ② (e.g., the slide-in direction). The sixth side wall 206 may be positioned to correspond to the third side wall 203 and may extend from the other end of the fourth side wall 204 in the second direction ②. When seen from above the front surface of the slidable electronic device 2, the fifth side wall 205 and the sixth side wall 206 may be substantially parallel to each other, and be substantially perpendicular to the fourth side wall 204. The distance in which the fourth side wall 204 is spaced apart from the first side wall 201 in the first direction ①, the area in which the fifth side wall 205 covers the second side wall 202, and the area in which the sixth side wall 206 covers the third side wall 203, may increase in case that the second housing 22 slides in, and may decrease in case that the second housing 22 slides out. In an embodiment, the second cover 232 may be positioned at the side of the rear surface of the slidable electronic device 2, and may be referred to as terms such as a “second back cover” or a “second rear plate”. The second support part 2311 may include a third surface substantially facing the front surface of the slidable electronic device 2, and a fourth surface substantially facing the rear surface of the slidable electronic device 2. The second cover 232 may be disposed on the fourth surface of the second support part 2311. The fourth surface of the second support part 2311 may include a seat structure for the second cover 232. For example, the seat structure may include a recess which allows the second cover 232 to be stably disposed in the second support part 2311 without shaking, and the second cover 232 may be inserted into the recess. The second cover 232 may be coupled to the second support part 2311 by using screw fastening. For another example, the second cover 232 may be coupled to the second support part 2311 by using snap-fits fastening. For another example, the second cover 232 may be coupled to the second support part 2311 by using an adhesive material (a bonding material). A part of the outer surface of the slidable electronic device 2, which is provided by the second support part 2311, may be smoothly connected to a part of the outer surface of the slidable electronic device 2, which is provided by the second cover 232. When seen from above the rear surface of the slidable electronic device 2 (e.g., when seen in the +z-axis direction), the overlapping area between the first cover 212 and the second cover 232 (or a second support part 2311) may increase in case that the second housing 22 slides out, and may decrease in case that the second housing 22 slides in. In some embodiments, the second cover 232 may be omitted, and the second support part 2311 may be provided in a shape further including a portion corresponding to the second cover 232. In some embodiments, the second cover 232 may be defined or interpreted as a separate element from the third housing 23. In an embodiment, the third cover 233 may be disposed in the fourth side wall 204 and may be referred to as a “side cover”. A part of the outer surface of the slidable electronic device 2, which is provided by the fourth side wall 204, may be smoothly connected to a part of the outer surface of the slidable electronic device 2, which is provided by the third cover 233. In some embodiments, the third cover 233 may be omitted, and the second side wall part 2312 may be provided in a shape further including a portion corresponding to the third cover 233.

According to various embodiments, the second cover 232 may be disposed in the second side wall part 2312. For example, the second side wall part 2312 may include a second cover arrangement area provided to correspond to the edge area of the second cover 232. For example, the second cover arrangement area may be a stepped portion provided in the second side wall part 2312 so that the second cover 232 is fitted to and seated in the second side wall part 2312. For another example, the second cover arrangement area may be provided as a substantially flat-surface area (or a flat-surface part). The second cover 232 may be disposed in the second cover arrangement area by using screw fastening. For another example, the second cover 232 may be disposed in the second cover arrangement area by using snap-fits fastening. For another example, in order to dispose the second cover 232 in the second side wall part 2312, an adhesive material (or a bonding material) may be placed between the second cover arrangement area and the edge area of the second cover 232.

According to various embodiments, the second housing 22 may be defined or interpreted as a part of the third housing 23. In this case, a portion of the third housing 23, which includes the third frame 231, the second cover 232, and the third cover 233, may be referred to as a "cover housing", and the second housing 22 may be referred to as terms such as a "support", a "support part", a "support member", or a "sliding structure" accommodated in the third housing 23.

According to an embodiment, in a closed state (see FIG. 2) of the slidable electronic device 2, a part of the outer surface of the slidable electronic device 2 by the slidable housing 20 may be provided by the first side wall 201 and the third housing 23. For example, in a closed state of the slidable electronic device 2, the remaining parts of the first housing 21 may be covered by the third housing 23 and thus not be exposed to the outside. In a closed state of the slidable electronic device 2, a part of the outer surface of the slidable electronic device 2, which is provided by the first side wall 201, may be smoothly connected to a part of the outer surface of the slidable electronic device 2, which is provided by the third housing 23. In case that the slidable electronic device 2 switches from a closed state to an open state (see FIG. 3), a part of the outer surface of the slidable electronic device 2 by the slidable housing 20 may further include an outer surface area provided by the second side wall 202, the third side wall 203, and the first cover 212. In some embodiments, in a closed state of the slidable electronic device 2, a part of the first housing 21 may protrude with respect to the third housing 23 in the second direction ②. In this case, in a closed state of the slidable electronic device 2, a part (e.g., a part of the second side wall 202, a part of the third side wall 203, and a part of first cover 212) of the first housing 21, which protrudes with respect to the third housing 23 in the second direction ②, may provide a part of the outer surface of the slidable electronic device 2.

According to an embodiment, a combination of the first side wall part 2112 of the first housing 21 and the second side wall part 2312 of the third housing 23 may provide a bezel (a bezel structure, a screen bezel, or a screen bezel structure) for surrounding the screen. For example, when the slidable electronic device 2 in a closed state (see FIG. 2) is seen from above the screen, a combination of the first side wall 201, the fourth side wall 204, the fifth side wall 205, and the sixth wall 206 may provide a bezel for surrounding the screen. For example, when the slidable electronic device 2 in an open state (see FIG. 3) is seen from above the screen, a combination of first side wall 201, the second side wall 202, the third side wall 203, the fourth side wall 204, the fifth side wall 205, and the sixth side wall 206 may provide a bezel for surrounding the screen.

According to an embodiment, the second housing 22 (e.g., a second frame, a second frame structure, a second framework, or a second case) may include a first support surface (reference numeral "22A" in FIG. 4) facing the front surface of the slidable electronic device 2, a second support surface (reference numeral "22B" in FIG. 4) corresponding to the bending part of the second area ⓑ included in the flexible display module 24, and a third support surface facing the rear surface of the slidable electronic device 2. The first support surface and the second support surface may support the second area ⓑ of the flexible display module 24. In some embodiments, the second housing 22 may be an element for supporting the second area ⓑ of the flexible display module 24, and be referred to as various terms such as a "display support body", a "display support member", a "display support structure", a "display support plate", or a "display support board". A part of the second area ⓑ, which provides the second screen area S2, may be supported by the first support surface. The second support surface may face the bending part of the second area ⓑ, and may include a curved-surface corresponding to the bending part of the second area ⓑ. The second support surface may support the bending part of the second area ⓑ. In an embodiment, various electronic components such as a battery may be disposed on the third support surface. The bending part of the second area ⓑ may be positioned between the second support surface and the fourth side wall 204 of the third housing 23. In an embodiment, one surface of the fourth side wall 204, which faces the bending part of the second area ⓑ, may include a curved-surface corresponding to the bending part of the second area ⓑ. In case that the second housing 22 slides out, at least a part of the second area ⓑ may be withdrawn from the space between the second housing 22 and the third housing 23 to the outside (e.g., a position at which the slidable electronic device 2 is seen to the outside), through a curved shape space between the fourth side wall 204 and the second support surface. In case that the second housing 22 slides in, at least a part of the second area ⓑ may be inserted into the space between the second housing 22 and the third housing 23 from the outside, through the curved shape space between the fourth side wall 204 and the second support surface.

According to various embodiments, when seen from above the rear surface of the slidable electronic device 2 in a state (e.g., the closed state in FIG. 2) where the second area ⓑ of the flexible display module 24 is at least partially inserted into the space between the second housing 22 and the third housing (23), an additional screen, in which a part of the second area ⓑ is seen through the first cover 212 of the first housing 21, may be provided. In this case, an area of the third housing 23 may be provided transparently or translucently to correspond to the additional screen. In some embodiments, in case that there is a member positioned between the second support part 2311 and at least a part of the second area ⓑ in a closed state of the slidable electronic device 2, an area of the member, which corresponds to the additional screen, may include an opening or be provided transparently or translucently.

According to an embodiment, at least a part of the first housing 21, at least a part of the second housing 22, or at least a part of the third housing 23 may include a metal material and/or a non-metal material. For example, the first housing 21 or the third housing 23 may include at least one conductive structure including a metal material, and at least one nod-conductive structure which includes a non-metal material and is connected to the at least one conductive structure. For example, the metal material included in the first housing 21, the second housing 22, or the third housing 23 may be various materials such as magnesium, a magnesium alloy, aluminum, an aluminum alloy, a zinc alloy, a copper alloy, titanium, an amorphous alloy, a metal-ceramic composite material (e.g., cermet), or stainless steel (STS). The non-metal material included in the first housing 21, the second housing 22, or the third housing 23 may be various materials such as ceramic or polymer. In some embodiments, the first housing 21 and the third housing 23 may include the same metal material or non-metal material. In some embodiments, the first housing 21 and the third housing 23 may include different metal materials or non-metal materials.

According to an embodiment, at least one conductive part (or conductive area) included in the first housing 21 or the third housing 23 may be electrically connected to a wireless communication circuit (e.g., the wireless communication module 192 in FIG. 1) included in the slidable electronic device 2 so as to be used as an antenna radiator.

According to an embodiment, a sliding structure, which enables the second housing 22 to slide with respect to the first housing 21, may include a sliding drive part capable of providing a driving force for sliding the second housing 22 with respect to the first housing 21 from an electrical signal. For example, the sliding drive part may include a motor and at least one gear drivingly connected to the motor. In case that a signal is generated through an input module included in the slidable electronic device 2, the sliding drive part may provide a driving force which enables the slidable electronic device 2 to be switched between a closed state (see FIG. 2) and an open state (see FIG. 3). For example, in case that a signal is generated through a hardware button or a software button provided through the screen, the slidable electronic device 2 may be switched from a closed state to an open state or from an open state to a closed state. For another example, in case that a signal is generated from various sensors such as a pressure sensor, the slidable electronic device 2 may be switched from a closed state to an open state or from an open state to a closed state. In case that the slidable electronic device 2 is carried or gripped by hand, a squeeze gesture, in which a part (e.g., the palm of the hand or the finger) of the hand presses a part within a designated section of the slidable electronic device 2, may be detected through a sensor, and in response thereto, the slidable electronic device 2 may be switched from a closed state to an open state or from an open state to a closed state. The sliding drive part is not limited to the motor, and for example, may include various actuators such as a solenoid or a hydraulic cylinder. For example, the solenoid may include a coil and a plunger positioned to correspond to the coil, and be configured to generate a mechanical movement of the plunger in case that a current is supplied to the coil.

According to an embodiment, the slidable electronic device 2 may include at least one among one or more audio modules (e.g., the audio module 170 in FIG. 1), one or more sensor modules (e.g., the sensor module 176 in FIG. 1), one or more camera modules (e.g., the camera module 180 in FIG. 1), one or more light-emitting modules, one or more input modules (e.g., the input module 150 in FIG. 1), and/or one or more connection terminal modules (e.g., the interface 177 or the connection terminal 178 in FIG. 1). In some embodiments, at least one of the elements may be omitted from the slidable electronic device 2, or other elements may be additionally included therein. The position or number of elements may be various.

For example, any one among one or more audio modules may include a microphone positioned inside the slidable electronic device 2 and a microphone hole 301 provided through the outer surface of the slidable electronic device 2 to correspond to the microphone. In the illustrated example, a microphone hole 301 may be provided through the first side wall 201. The position or number of an audio module associated with a microphone is not limited to the illustrated example, and may be various.

For example, any one among one or more audio modules may include a first speaker for multimedia playback (or recording and playback) positioned inside the slidable electronic device 2, and a first speaker hole 302 provided through the outer surface of the slidable electronic device 2 to correspond to the first speaker. For example, any one among one or more audio modules may include a second speaker for calling (e.g., a receiver for calling) positioned inside the slidable electronic device 2, and a second speaker hole 303 (e.g., a receiver hole) provided through the outer surface of the slidable electronic device 2 to correspond to the second speaker. In the illustrated example, the first speaker hole 302 and the second speaker hole 303 may be provided in the first side wall 201. The position or number of audio modules associated with a speaker may be various. In some embodiments, the microphone hole and the speaker hole may be implemented as one hole. In some embodiments, an audio module associated with the speaker may include a piezo speaker in which a speaker hole is omitted.

For example, one or more sensor modules may generate an electrical signal or a data value corresponding to an internal operation state of the slidable electronic device 2 or an external environmental state. In an embodiment, any one among the one or more sensor modules may include an optical sensor positioned in the inner space of the housing 20 to correspond to the screen. When seen from above the front surface of the slidable electronic device 2 (e.g., when seen in the −z-axis direction), the optical sensor may be disposed to overlap at least a part of the screen. In this case, the sensing function of the optical sensor may be performed while the optical sensor or the position of the optical sensor is not visually distinguished (or exposed). For example, the optical sensor may include a proximity sensor or an illuminance sensor. In an embodiment, the optical sensor may be positioned on the rear surface of the first area ⓐ or below or beneath the first area ⓐ included in the flexible display module 24, and the optical sensor or the position of the optical sensor may not be visually distinguished (or exposed). In some embodiments, the optical sensor may be positioned to be aligned with a recess provided on the rear surface of the first area ⓐ or be at least partially inserted into the recess. An area of the first area ⓐ, which at least partially overlaps the optical sensor, may include a different pixel structure and/or wire structure compared to other areas. For example, an area of the first area ⓐ, which at least partially overlaps the optical sensor, may have a different pixel density compared to other areas. The pixel structure and/or wire structure formed in a part of the first area ⓐ, which at least partially overlaps the optical sensor, may reduce light loss, between the outside and the optical sensor. For another example, multiple pixels may not be arranged in an area of the first area ⓐ, which at least partially overlaps the optical sensor.

According to various embodiments, the optical sensor may be positioned to be aligned with an opening provided in the first area ⓐ of the flexible display module 24 or be at least partially inserted into the opening. External light may reach the optical sensor through a transparent cover and the opening provided in the first area ⓐ. The transparent cover may function to protect the flexible display module 24, and for example, may include a flexible plate or a flexible film such as a plastic film (e.g., a polyimide film) or ultra-thin glass (UTG).

According to various embodiments, the disclosure is not limited to an optical sensor such as a proximity sensor or an illuminance sensor, and various other sensors may be positioned on the rear surface of the first area ⓐ or below the first area ⓐ of the flexible display module 24, or may be positioned to correspond to the opening provided in the first area ⓐ. For example, an optical, an electrostatic, or an ultrasonic type biometric sensor (e.g., fingerprint sensor) may be positioned on the rear surface of the first area ⓐ or below the first area a) of the flexible display module 24, or may be positioned to correspond to the opening provided in the first area ⓐ. In various embodiments, the slidable electronic device 2 may include various other sensors (e.g., a gesture sensor, a gyro sensor, a barometric pressure sensor, a magnetic sensor, an acceleration sensor, a grip sensor, a color sensor, an infrared (IR) sensor, a temperature sensor, or a humidity sensor) in addition thereto, and the position thereof may be various.

According to an embodiment, one or more camera modules may include one lens or multiple lenses, an image sensor, and/or an image signal processor. For example, any one among one or more camera modules may include a first camera module 304 (e.g., a front camera module) positioned to correspond to the front surface of the slidable electronic device 2. In an embodiment, the first camera module 304 may be positioned in the inner space of the housing 20 to correspond to the screen. When seen from above the front surface of the slidable electronic device 2 (e.g., when seen in the −z-axis direction), the first camera module 304 may be disposed to overlap at least a part of the screen. In this case, the photographing function of the first camera module 304 may be performed while the first camera module 304 or the position of the first camera module 304 is not visually distinguished (or exposed). In an embodiment, the first camera module 304 may be positioned on the rear surface of the first area ⓐ or below or beneath the first area ⓐ included in the flexible display module 24, and the first camera module 304 or the position of the first camera module 304 may not be visually distinguished (or exposed). In some embodiments, the first camera module 304 may be positioned to be aligned with a recess provided on the rear surface of the first area ⓐ or be at least partially inserted into the recess. For example, the first camera module 304 may include a hidden display rear camera (e.g., an under-display camera (UDC)). An area of the first area ⓐ, which at least partially overlaps the first camera module 304, may include a different pixel structure and/or wire structure compared to other areas. For example, an area of the first area ⓐ, which at least partially overlaps the first camera module 304, may have a different pixel density compared to other areas. The pixel structure and/or wire structure formed in a part of the first area ⓐ, which at least partially overlaps the first camera module 304, may reduce light loss, between the outside and the first camera module 304. For another example, multiple pixels may not be arranged in an area of the first area a, which at least partially overlaps the first camera module 304.

According to various embodiments, the first camera module 304 may be positioned to be aligned with an opening provided in the first area ⓐ of the flexible display module 24 or be at least partially inserted into the opening. External light may reach the first camera module 304 through a transparent cover (e.g., a polyimide film or ultra-thin glass) for protecting the flexible display module 24 from the outside and the opening provided in the first area ⓐ. The opening of the first area ⓐ, which is aligned or overlapped with the first camera module 304, may be provided in a through-hole shape or a notch shape. In some embodiments, when seen from above the front surface of the slidable electronic device 2, the first camera module 304 may be positioned to correspond to a camera hole provided through the fourth side wall 204. In various embodiments, the slidable electronic device 2 may include a light-emitting module (e.g., a light emitting diode (LED), an IR LED, or a xenon lamp) capable of providing state information of the slidable electronic device 2 in the form of light. In some embodiments, the light-emitting module may provide a light source operating in association with an operation of the first camera module 304.

According to an embodiment, the slidable electronic device 2 may include a second camera module 305, a third camera module 306, and/or a light-emitting module 307 (e.g., a flash) which are positioned in the first housing 21 to correspond to the first cover 212. The first cover 212 may include a first opening (e.g., a first camera hole) provided to correspond to the second camera module 305 (e.g., a first rear camera module), a second opening (e.g., a second camera hole) provided to correspond to the third camera module 306 (e.g., a second rear camera module), and/or a third opening (e.g., a flash hole) provided to correspond to the light-emitting module 307. The second camera module 305 may be positioned in the first housing 21 to correspond to the first opening. The third camera module 306 may be positioned in the first housing 21 to correspond to the second opening. The light-emitting module 307 may be positioned in the first housing 21 to correspond to the third opening. In an open state of the slidable electronic device 2 (see FIG. 3), when seen from above the rear surface of the slidable electronic device 2 (e.g., when seen in the +z-axis direction), the second camera module 305, the third camera module 306, and the light-emitting module 307 may not overlap a part of the third housing 23, which includes the second support part 2311 and the second cover 232, and may be exposed to the outside. In an embodiment, in a closed state (see FIG. 2) of the slidable electronic device 2, when seen from above the rear surface of the slidable electronic device 2, a part of the third housing 23, which includes the second support part 2311 and second cover 232, may overlap the second camera module 305, the third camera module 306, and the light-emitting module 307. A part of the third housing 23, which includes the second support part 2311 and second cover 232, may include the second camera module 305, the third camera module 306, and a light-transmitting area 308 corresponding to the light-emitting module 307. The light-transmitting area 308 may overlap the second camera module 305, the third camera module 306, and the light-emitting module 307 in a closed state of the slidable electronic device 2. In a closed state of the slidable electronic device 2, external light may reach the second camera module 305 or the third camera module 306 through the light-transmitting area 308. In a closed state of the slidable electronic device 2, light output from the light-emitting module 307 may travel to the outside of the slidable electronic device 2 through the light-transmitting area 308. In an embodiment, the light-emitting module 307 may include a light source for the second camera module 305 and/or the third camera module 306. For example, the light-emitting module 307 may include an LED or a xenon lamp. In some embodiments, a part of the third housing 23, which includes the second support part 2311 and the second cover 232, may also include a through-hole-shaped or a notch-shaped opening in place of the light-transmitting area 308. The number or the position of a rear camera module or a light-emitting module positioned in the first housing 21 to correspond to the first cover 212 is not limited to the illustrated example, and may be various. For another example, the second camera module 305 or the third camera module 306 may be omitted. In an embodiment, the second camera module 305 and the third camera module 306 may have different properties (e.g., angles of view) or functions. Although a dual camera module is illustrated, the disclosure is not limited thereto, and an example (e.g., a triple camera module) including more camera modules may be provided. Two or more camera modules (e.g., rear camera modules) may have different properties (e.g., angles of view) or functions. The two or more camera modules may provide different angles of view (or lenses having different angles of view), and the slidable electronic device 2 may be configured such that a corresponding camera module is selectively used based on a selection of a user related to an angle of view. Any one among the two or more camera modules may include a wide-angle camera module, a telephoto camera module, a color camera module, a monochrome camera module, or an infrared (IR) camera (e.g., a time of flight (TOF) camera or a structured light camera) module. In some embodiments, the IR camera module may also be operated as at least a part of a sensor module.

According to an embodiment, one or more input modules may include a first key input device 309 or a second key input device 310. In the illustrated example, the first key input device 309 may be positioned on the first side wall 201, and the second key input device 310 may be positioned on the sixth side wall 206. The position or the number of the input modules is not limited to the illustrated example, and may be various. In some embodiments, the slidable electronic device 2 may not include a part or all of the key input devices, and a key input device not included therein may be implemented with a soft key by using the screen. In some embodiments, the input module or the key input device may include at least one sensor module.

For example, any one among one or more connection terminal modules (connector modules or interface terminal modules) may include a connector (or an interface terminal) positioned inside the slidable electronic device 2, and a connector hole 311 formed through the outer surface of the slidable electronic device 2 to correspond to the connector. In the illustrated example, the connector hole 311 may be provided through the second side wall 202. The position or the number of the connection terminal modules may be various. The slidable electronic device 2 may transmit and/or receive power and/or data to and/or from an external electronic device electrically connected to the connector. In an embodiment, the connector may include a USB connector or an HDMI connector. In various embodiments, any one among the one or more connection terminal modules may include an audio connector (e.g., a headphone connector or an earphone connector) positioned inside the slidable electronic device 2, and a connector hole provided through the outer surface of the slidable electronic device 2 to correspond to the audio connector. In various embodiments, any one among the one or more connection terminal modules may include a memory card connector positioned inside the slidable electronic device 2, and a connector hole formed through the outer surface of the slidable electronic device 2 to correspond to the memory card connector. In the illustrated example, a memory card connector may be positioned inside the slidable electronic device 2 to correspond to the first side wall 201, and the connector hole may be covered by a detachable cover 312.

Figure 4:
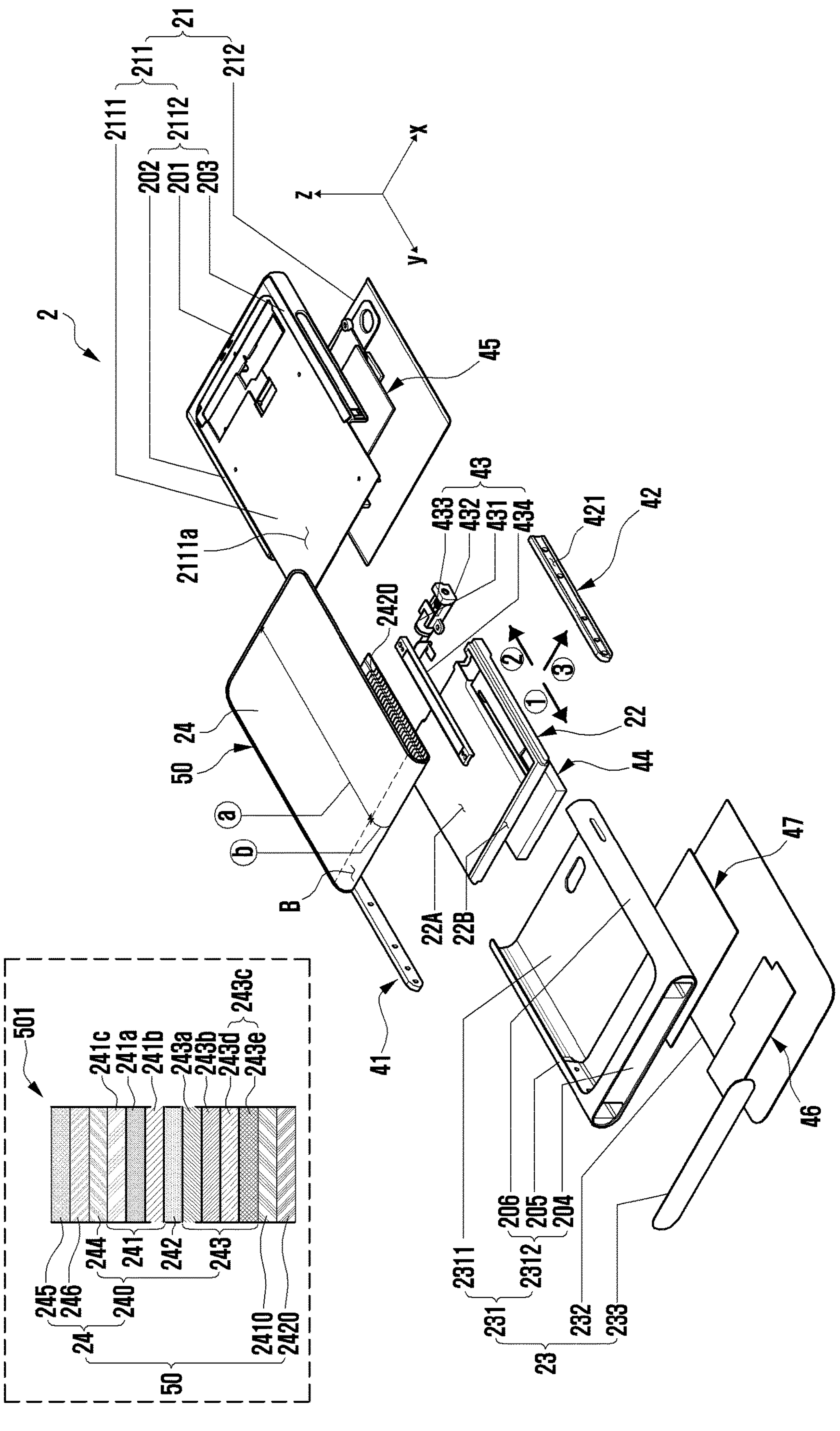
FIG. 4 is an exploded perspective view of a slidable electronic device according to an embodiment of the disclosure.
Figure 5:
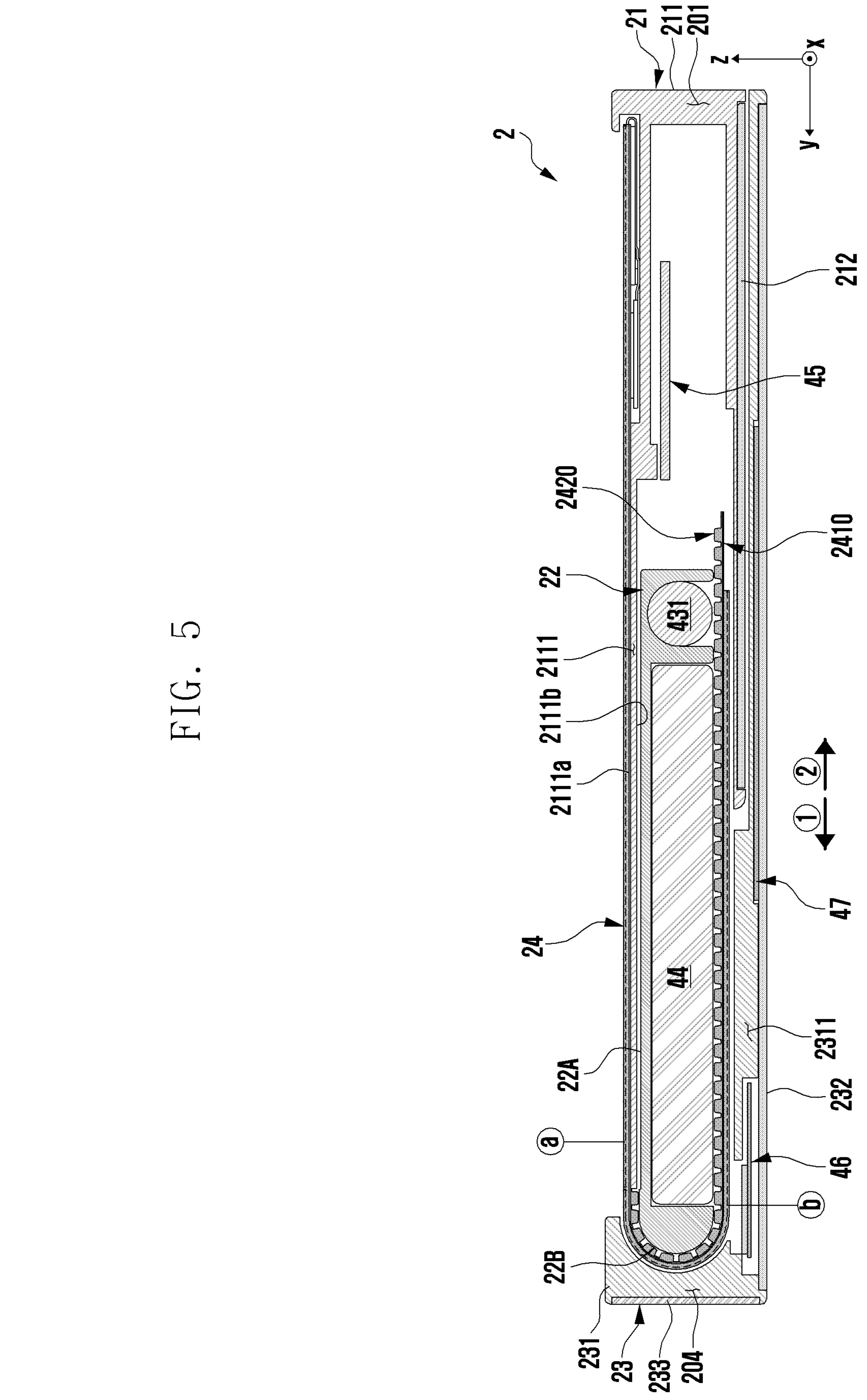
FIG. 5 is a cross-sectional view of a slidable electronic device cut along line A-A' in FIG. 2 according to an embodiment of the disclosure.
Figure 6:
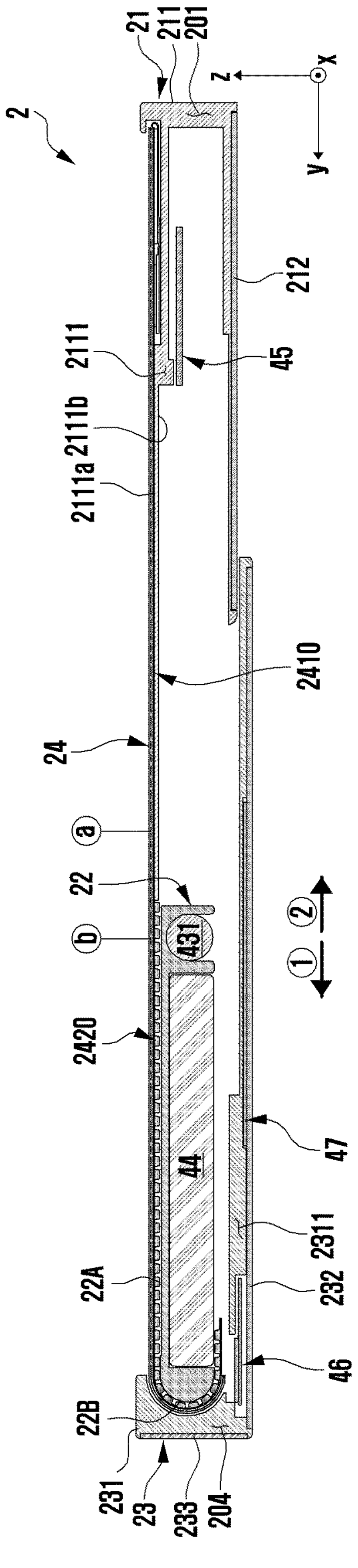
FIG. 6 is a cross-sectional view of a slidable electronic device cut along line B-B' in FIG. 3 according to an embodiment of the disclosure.
Figure 7:
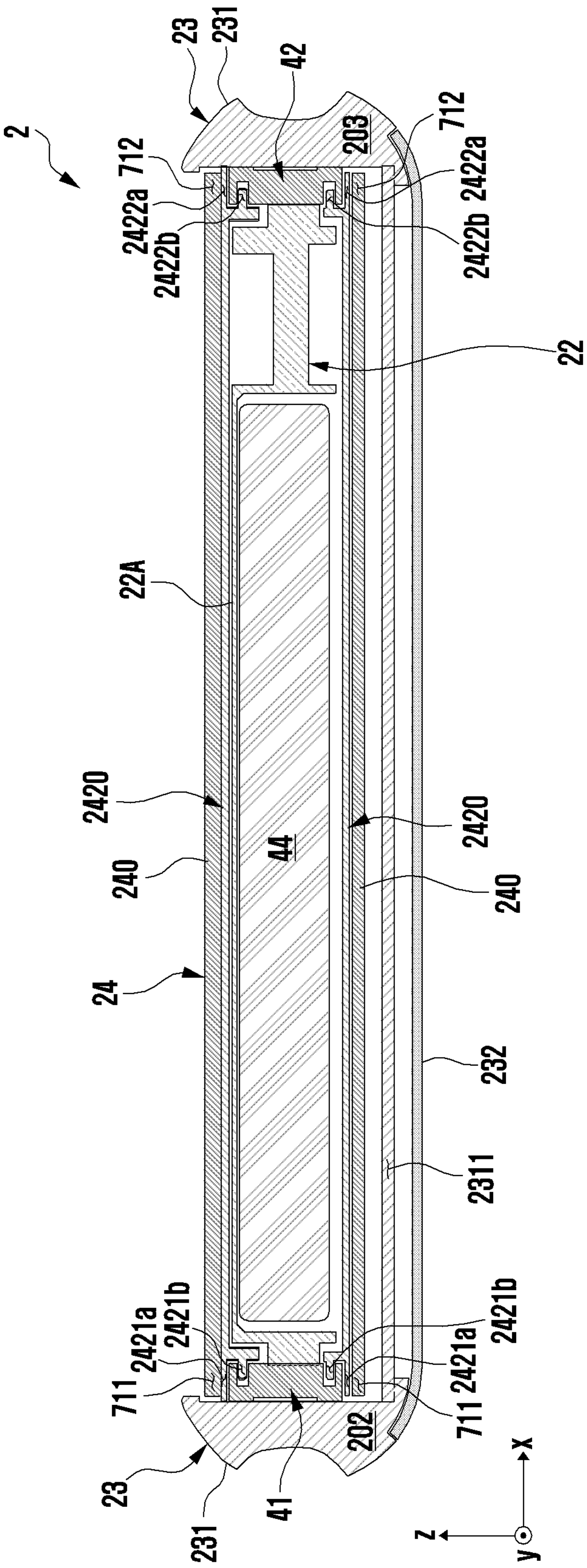
FIG. 7 is a cross-sectional view of a slidable electronic device cut along line C-C' in FIG. 2 according to an embodiment of the disclosure.

FIG. 4 is an exploded perspective view of a slidable electronic device 2 according to an embodiment of the disclosure. FIG. 5 is a cross-sectional view of a slidable electronic 2 cut along line A-A' in FIG. 2 according to an embodiment of the disclosure. FIG. 6 is a cross-sectional view of a slidable electronic 2 cut along line B-B' in FIG. 3 according to an embodiment of the disclosure. FIG. 7 is a cross-sectional view of a slidable electronic 2 cut along line C-C' in FIG. 2 according to an embodiment of the disclosure.

Referring to FIGS. 4, 5, 6, 7, and 8, the slidable electronic device 2 may include the first housing 21, the second housing 22, the third housing 23, a display assembly 50, a first guide rail 41, a second guide rail 42, a sliding drive device 43, a battery 44, a first printed circuit board 45, a second printed circuit board 46, and/or an antenna structure 47.

According to an embodiment, the first frame 211 of the first housing 21 may be provided as an integral structure including the first support part 2111 and the first side wall part 2112. The first support part 2111 of the first frame 211 may be positioned inside the slidable electronic device 2 to correspond to the first housing 21. At least a part of the first support part 2111 may include a metal material and/or a non-metal material. Electronic components or various members associated with the electronic components may be arranged in the first frame 211 or supported by the first frame 211. In an embodiment, the first area ⓐ of the flexible display module 24 may be disposed in the first support part 2111. The first support part 2111 may provide a first surface 2111*a* facing the front surface of the slidable electronic device 2, and the first area ⓐ of the flexible display module 24 may be disposed on the first surface 2111*a*. In some embodiments, the first support part 2111 may be referred to as various other terms such as a “bracket”, a “support”, an “inner support”, a “support member”, a “support structure”, or an “inner support structures”. The first support part 2111 may be defined or interpreted as a part of the first housing 21 or a separate element from the first housing 21. The first cover 212 may be disposed in the first frame 211 of the first housing 21. For example, the first cover 212 may be a plate including a first front surface facing the front surface of the slidable electronic device 2, and a first rear surface for providing at least a part of the rear surface of the slidable electronic device 2.

According to an embodiment, the second housing (or a second frame) 22 may be drivingly connected to the first housing 21 so as to be slidable with respect to the first housing 21. The second housing 22 may support the second area ⓑ of the flexible display module 24. For example, at least a part of the second housing 22 may include a metal material and/or a non-metal material.

According to an embodiment, the third housing 23 may have a space provided by a combination of the second support part 2311 and the second side wall part 2312 of the third frame 231. The second housing 22 may be positioned in the space of the third housing 23, and be coupled to the third housing 23. For example, at least a part of the third housing 23 may include a metal material and/or a non-metal material. The second cover 232 and/or the third cover 233 may be disposed in the third frame 231. For example, the second cover 232 may be a plate including a second front surface facing the front surface of the slidable electronic device 2, and a second rear surface for providing at least a part of the rear surface of the slidable electronic device 2. In some embodiments, the third cover 233 may be omitted. In this case, the second side wall part 2312 may be provided in a shape further including a portion corresponding to the third cover 233.

According to an embodiment, when seen from above the front surface of the slidable electronic device 2 (e.g., when seen in the −z-axis direction), the area, in which the first support part 2111 of the first housing 21 and the second housing 22 overlap each other, may decrease in case that the second housing 22 slides out, and increase in case that the second housing 22 slides in.

According to an embodiment, the first area ⓐ of the flexible display module 24 may be disposed in the first support part 2111 of the first housing 21. For example, the first area ⓐ of the flexible display module 24 may be disposed in the first support part 2111 by using a thermal-reactive adhesive material (or a thermal-reactive bonding material), a photo-reactive adhesive material (or a photo-reactive bonding material), a general adhesive (or a general glue), a double-sided tape, or an organic adhesive material (or an organic bonding material). In some embodiments, the first area ⓐ of the flexible display module 24 may be inserted into the first frame 211 in the first direction ① in a sliding manner to be disposed in a recess provided on the first surface 2111*a* of the first support part 2111. The first area ⓐ of the flexible display module 24 may be disposed in the first housing 21, and thus in case that the second housing 22 slides out, the second area ⓑ of the flexible display module 24 may be withdrawn from the space between the second housing 22 and the third housing 23 to the outside (e.g., a position of the slidable electronic device 2, which is seen to the outside).

According to an embodiment, the second housing 22 may include a first support surface 22A and a second support surface 22B for supporting the second area ⓑ of the flexible display module 24. The first support surface 22A may include a flat-surface area. When seen from above the front surface of the slidable electronic device 2 (e.g., when seen in the −z-axis direction), an area, in which the first support surface 22A faces the first support part 2111 of the first housing 21, may decrease in case that the second housing 22 slides out, and increase in case that the second housing 22 slides in. In a closed state (see FIG. 2) or an open state (see FIG. 3) of the slidable electronic device (2) or at the time of sliding of the second housing 22 with respect to the first housing 21, at least part of the first support surface 22A, which faces and overlaps the first support part 2111 of the first housing 21, may support the first support part 2111 of the first housing 21. In an open state of the slidable electronic device 2 or at the time of sliding of the second housing 22 with respect to the first housing 21, the first support surface 22A may support a part of the second area ⓑ of the flexible display module 24, which provides the screen. In case that the second housing 22 slides out, the area of a part of the first support surface 22A, which is not covered by the first support part 2111 of the first housing 21 and thus supports the second area ⓑ of the flexible display module 24, may increase. In an embodiment, the second support surface 22B may include a curved-surface area (or a support area having a curved-surface). The second support surface 22B may be positioned to correspond to the fourth side wall 204 of the third housing 23. The second support surface 22B may support a bending part B of the second area ⓑ of the flexible display module 24. The bending part B of the flexible display module 24 may be a portion of the second area ⓑ, which is disposed and maintained in a bended shape, so that the second area ⓑ is changed in a direction and then moved in case that the second housing 22 slides with respect to the first housing 21. In case that the second housing 22 slides out, due to the relative position between the first housing 21 coupled to the first area ⓐ and the second housing 22 corresponding to the second area b, at least a part of the second area ⓑ may be withdrawn from the inside of the slidable electronic device 2 to the outside through a curved shape space between the fourth side wall 204 and the second support surface 22B of the second housing 22. In case that the second housing 22 slides in, due to the relative position between the first housing 21 coupled to the first area ⓐ and the second housing 22 corresponding to the second area ⓑ, at least a part of the second area ⓑ may be inserted into the inside of the slidable electronic device 2 through the curved shape space between the fourth side wall 204 and the second support surface 22B of the second housing 22.

According to various embodiments, a rotating member such as a roller or a pulley may be positioned in place of a portion of the second housing 22, which provides the second support surface 22B. For example, one end and the other end of a rotating shaft associated with the rotating member may be rotatably coupled to the second housing 22 or the third housing 23. In some embodiments, the rotating member may be interpreted as a curved-surface member, a curved-surface support member, or a curved-surface support structure, which is rotatably implemented based on friction with a display support structure (or a display support plate) 2420 (e.g., a multi-bar structure).

According to an embodiment, referring to the cross-sectional view 501 of the display assembly 50, the display assembly 50 may include the flexible display module 24, a support sheet 2410, and/or a display support structure 2420.

According to an embodiment, the flexible display module 24 may include a flexible display 240, a transparent cover 245, and/or an optical transparent adhesive member (or an optical transparent bonding member) 246. For example, the flexible display 240 may be coupled to the transparent cover 245 by using the optical transparent adhesive member 246 (e.g., optical clear adhesive (OCA), optical clear resin (OCR), or super view resin (SVR)). The transparent cover 245 (e.g., a window) may cover the flexible display 240 to protect the flexible display 240 from the outside. The transparent cover 245 may be implemented in the form of a thin film (e.g., a thin film layer) having flexibility. For example, the transparent cover 245 may include a plastic film (e.g., a polyimide film) or thin film glass (e.g., ultra-thin glass). In some embodiments, the transparent cover 245 may include multiple layers. For example, the transparent cover 245 may have a form in which various coating layers are arranged on a plastic film or thin film glass. For example, the transparent cover 245 may have a form in which a coating layer or at least one protective layer including a polymer material (e.g., polyester (PET), polyimide (PI), or thermoplastic polyurethane (TPU)) is disposed on a plastic film or thin film glass. In some embodiments, the transparent cover 245 and the optical transparent adhesive member 246 may be defined or interpreted as a part of the flexible display 240. For example, the flexible display 240 may include a display panel 241, a base film 242, a lower panel 243, or an optical layer 244. The display panel 241 may be positioned between the optical layer 244 and the base film 242. The base film 242 may be positioned between the display panel 241 and the lower panel 243. The optical layer 244 may be positioned between the optical transparent adhesive member 246 and the display panel 241. An adhesive material (or an adhesive member) or a bonding material (or a bonding member) made of various polymers may be arranged between the display panel 241 and the base film 242, between the base film 242 and the lower panel 243, and/or between the display panel 241 and the optical layer 244. For example, the display panel 241 may include a light-emitting layer 241*a*, a thin film transistor (TFT) film (or a TFT substrate) 241*b*, and/or an encapsulation (e.g., a thin-film encapsulation (TFE)) 241*c*. For example, the light-emitting layer 241*a* may include multiple pixels implemented by a light-emitting element such as an organic light-emitting diodes (OLED) or a micro-LED. The light-emitting layer 241*a* may be disposed on the TFT film 241*b* through organic evaporation. The TFT film 241*b* may be positioned between the light-emitting layer 241*a* and the base film 242. The TFT film 241*b* may indicate a film structure in which at least one TFT is disposed on a flexible substrate (e.g., a PI film) through a series of processes such as deposition, patterning, and/or etching. The at least one TFT may be configured such that a pixel is turned on or off or the brightness of a pixel is adjusted by controlling current for a light-emitting element of the light-emitting layer 241*a*. For example, the at least one TFT may be implemented with an amorphous silicon (a-Si) TFT, a liquid crystalline polymer (LCP) TFT, a low-temperature polycrystalline oxide (LTPO) TFT, or a low-temperature polycrystalline silicon (LTPS) TFT. In an embodiment, the display panel 241 may include a storage capacitor, and the storage capacitor may maintain a voltage signal to a pixel, may maintain voltage applied to a pixel within one frame, or may reduce a gate voltage change caused by leakage current during light-emitting time. The storage capacitor may maintain voltage applied to a pixel at predetermined time interval by a routine (e.g., initialization or data write) for controlling the at least one TFT. In an embodiment, the display panel 241 may be implemented based on an OLED, and the encapsulation 241*c* may cover the light-emitting layer 241*a*. An organic material and an electrode for emitting light in an OLED may react very sensitively to oxygen and/or moisture, and thus may lose the light-emitting property thereof. In order to reduce or prevent same, the encapsulation 241*c* may seal the light emitting layer 241*a* so that oxygen and/or moisture does not permeate into the OLED. The base film 242 may include a flexible film formed of plastic or polymer such as polyimide or polyester (PET). The base film 242 may function to support and protect the display panel 241. In some embodiments, the base film 242 may be referred to as a protective film, a back film, or a back plate. The lower panel 243 may include multiple layers for various functions. Various polymer adhesive members (or bonding members) (not shown) may be arranged between the multiple layers included in the lower panel 243. For example, the lower panel 243 may include a light-blocking layer 243*a*, a buffer layer 243*b*, and/or a lower layer 243*c*. The light-blocking layer 243*a* may be positioned between the base film 242 and the buffer layer 243*b*. The buffer layer 243*b* may be positioned between the light-blocking layer 243*a* and the lower layer 243*c*. The light-blocking layer 243*a* may block at least a part of light having been incident from the outside. For example, the light-blocking layer 243*a* may include an embossed layer. The embossed layer may be a black layer including a bumpy pattern. The buffer layer 243*b* may alleviate external impact applied to the flexible display 240. For example, the buffer layer 243*b* may include a sponge layer or a cushion layer. The lower layer 243*c* may spread, disperse, or dissipate heat generated in the slidable electronic device 2 or the flexible display 240. The lower layer 243*c* may absorb or shield electromagnetic waves. The lower layer 243*c* may alleviate external impact applied to the slidable electronic device 2 or the flexible display 240. For example, the lower layer 243*c* may include a composite sheet 243*d* or a copper sheet 243*e*. In an embodiment, the composite sheet 243*d* may be a sheet formed by combining and processing sheets or layers having different properties. For example, the composite sheet 243*d* may include at least one of polyimide or graphite. The composite sheet 243*d* may be replaced with a single sheet including one material (e.g., polyimide or graphite). The composite sheet 243*d* may be positioned between the buffer layer 243*b* and the copper sheet 243*e*. The copper sheet 243*e* may be replaced with various other metal sheets. In some embodiments, at least a part of the lower layer 243*c* may be a conductive member (e.g., a metal plate), may help to reinforce rigidity of the slidable electronic device 2, and may be used to shield ambient noise and dissipate heat emitted from a heat dissipating component (e.g., a display drive circuit) (e.g., a display drive integrated circuit (DDI)) therearound. For example, the conductive member may include at least one of copper (CU), aluminum (Al), stainless steel (SUS), or a CLAD (e.g., a lamination member in which SUS and Al are alternately arranged). The lower panel 243*c* may include various layers for other various functions. In some embodiments (not shown), at least one additional polymer layer (e.g., a layer including PI, PET, or TPU) may be disposed on the rear surface of the display panel 241 in addition to the base film 242. In some embodiments, at least one of multiple layers (e.g., the light-blocking layer 243*a*, the buffer layer 243*b*, the composite sheet 243*d*, and the conductive sheet 243*e*) included in the lower panel 243 may be omitted. In some embodiments, the arrangement order of the multiple layers included in the lower panel 243 is not limited to the illustrated embodiment, and may be variously changed. For example, the optical layer 244 may include a polarizing layer (or a polarizer) or a retardation layer (or retarder). The polarizing layer and the retardation layer may improve outdoor visibility of a screen. For example, the optical layer 244 may selectively transmit light which is generated from a light source of the display panel 241 and vibrates in a predetermined direction. In some embodiments, one layer, in which the polarizing layer and the retardation layer are combined, may be provided, and the one layer may be interpreted as a "circular polarizing layer". The optical transparent adhesive member 246 may be positioned between the transparent cover 245 and the optical layer 244. In some embodiments, the polarizing layer (or a circular polarizing layer) may be omitted, and in this case, a black pixel define layer (PDL) and/or a color filter may be provided to replace the polarizing layer. The slidable electronic device 2 may include a touch detection circuit (e.g., a touch sensor) (not shown). The touch detection circuit may be implemented with a transparent conductive layer (or film) based on various conductive materials such as indium tin oxide (ITO). In an embodiment, the touch detection circuit may be disposed between the transparent cover 245 and the optical layer 244 (e.g., an add-on type). In another embodiment, the touch detection circuit may be disposed between the optical layer 244 and the display panel 241 (e.g., an on-cell type). In another embodiment, the display panel 241 may include a touch detection circuit or a touch detection function (e.g., an in-cell type). In some embodiments, the display panel 241 may be based on an OLED, and may include the encapsulation 241*c* positioned between the light-emitting layer 241*a* and the optical layer 244. The encapsulation 241*c* may perform a function of a pixel protective layer for protecting multiple pixels the light-emitting layer 241*a*. In an embodiment (not shown), the flexible display 240 may include a conductive pattern such as a metal mesh (e.g., an aluminum metal mesh), as a touch detection circuit disposed on the encapsulation 241*c*, between the encapsulation 241*c* and the optical layer 244. For example, in response to the bending of the flexible display 240, the metal mesh may have durability greater than a transparent conductive layer implemented with an ITO. In some embodiments, the flexible display 240 may further include a pressure sensor (not shown) capable of measuring the intensity (pressure) of a touch. Multiple layers included in the display panel 241 or the lower panel 243, the lamination structure thereof, or the lamination order thereof may be various. According to the type of provision or the trend of convergence, the flexible display 240 may be implemented by omitting a part of elements or adding other elements.

According to an embodiment, a support sheet (a support plate or a support layer) 2410 may be disposed on the rear surface of the flexible display module 24. The rear surface of the flexible display module 24 may indicate a surface positioned opposite to a surface of the display panel 241 which includes multiple pixels and from which light is emitted. For example, the support sheet 2410 may cover at least a part of the lower panel 243 of the flexible display module 24, and be disposed on (e.g., attached to) the rear surface of the lower panel 243. The support sheet 2410 may be coupled to the lower panel 243 by using an adhesive material or a bonding material. The support sheet 2410 may be positioned between the lower panel 243 and the display support structure 2420, and the display support structure 2420 may be coupled to the support sheet 2410. The display support structure 2420 may be coupled to the support sheet 2410 by using an adhesive material or a bonding material. For example, an adhesive material (or a bonding material) between the flexible display 240 and the support sheet 2410, and/or an adhesive material (or a bonding material) between the support sheet 2410 and the display support structure 2420 may include a thermal-reactive adhesive material (or a thermal-reactive bonding material), a photo-reactive adhesive material (or a photo-reactive bonding material), a general adhesive (or a general glue), or a double-sided tape. For another example, the adhesive material (or the bonding material) may include various polymers such as triazine thiol, dithio-pyrimidine, or silane-based compounds, or an organic adhesive material (or an organic bonding material) such as sealant. The support sheet 2410 may contribute to durability (e.g., rigidity reinforcement) of the flexible display module 24. The support sheet 2410 may reduce the influence of load or stress, which may occur in sliding of the second housing 22 with respect to the first housing 21, on the flexible display module 24. The support sheet 2410 may reduce or prevent damage of the flexible display module 24 due to the force delivered in case that the second housing 22 slides with respect to the first housing 21. In an embodiment, the support sheet 2410 may include a metal material. For example, the support sheet 2410 may include stainless steel. The support sheet 2410 may include various other metal materials. In some embodiments, the support sheet 2410 may include engineering plastic.

According to an embodiment, the support sheet 2410 may include a lattice structure which at least partially overlaps the second area ⓑ of the flexible display module 24. For example, the lattice structure may include multiple openings (or slits) passing between one surface of the support sheet 2410, which faces the display support structure 2420, and the other surface of the support sheet 2410, which faces the lower panel 243 of the flexible display module 24. The lattice structure may indicate a pattern structure in which multiple openings are regularly arranged. The multiple openings may be periodically formed, may have substantially the same shape, and may be repeatedly arranged at predetermined interval. The lattice structure may contribute to the flexibility of the second area ⓑ, and the second area ⓑ may be more flexible than the first area ⓐ due to the lattice structure. In some embodiments, the lattice structure including multiple openings may be referred to as other terms such as an "opening pattern", a "hole pattern", or a "lattice pattern". In some embodiments, the support sheet 2410 may include a recess pattern (not shown) including multiple recesses in place of the lattice structure. For example, the recess pattern may indicate a pattern structure in which multiple recesses having a dented shape are regularly arranged, wherein the multiple recesses are formed on a surface of the support sheet 2410, which faces the display support structure 2420, or a surface of the support sheet 2410, which faces the lower panel 243 of the flexible display module 24. In some embodiments, the lattice structure or the recess pattern may extend to the first area ⓐ of the flexible display module 24. In some embodiments, the support sheet 2410 including the lattice structure or the recess pattern, or a conductive member corresponding thereto may also be formed of multiple layers. The support sheet 2410 may reduce or prevent a phenomenon in which elements (e.g., the display support structure 2420) positioned inside the slidable electronic device 2 are seen from the outside of the slidable electronic device 2 through the flexible display module 24. Although the lattice structure of the support sheet 2410, which corresponds to the second area ⓑ of the flexible display module 24, includes multiple openings, it may be possible to transmit light at a level which enables the display support structure 2420 to be substantially invisible through the flexible display module 24.

According to various embodiments, the support sheet 2410 may reduce electromagnetic interference (EMI) on the flexible display module 24. In some embodiments, the support sheet 2410 may spread or disperse heat emitted from a heat dissipation component (e.g., a display drive circuit such as a DDI or a DDI chip).

According to an embodiment, the display support structure (or a display support member) 2420 may be disposed on or coupled to the support sheet 2410. In case that the support sheet 2410 is omitted, the display support structure 2420 may be disposed on or coupled to the rear surface of the flexible display module 24. The display support structure 2420 may be positioned between the second area ⓑ of the flexible display module 24 and the first support surface 22A of the second housing 22 so as to support the second area ⓑ. In case that the second housing 22 slides out, the area of a part of the first support surface 22A of the second housing 22, which is not covered by the first support part 2111 of the first housing 21 and thus supports the display support structure 2420, may increase. In case that the second housing 22 slides in, the area of a part of the first support surface 22A of the second housing 22, which is not covered by the first support part 2111 of the first housing 21 and thus supports the display support structure 2420, may decrease. The display support structure 2420 may support the bending part B of the flexible display module 24, between the bending part B of the flexible display module 24 and the second support surface 22B of the second housing 22. In case that the second housing 22 slides out or slides in, the second housing 22 and the display support structure 2420 may move while rubbing against each other.

According to an embodiment, the display support structure 2420 may reduce the phenomenon, in which the screen (see FIG. 2 or 3) is lifted, due to the elasticity of the flexible display module 24 and/or the elasticity of the support sheet 2410, and thus may contribute to providing a smooth screen. The display support structure 2420 may support the second area (so that the second area ⓑ of the flexible display module 24 is not lifted due to the elasticity of the flexible display module 24 and/or the elasticity of the support sheet 2410, and thus may contribute to maintaining a form in which the second area ⓑ and the first area ⓐ are smoothly connected. The display support structure 2420 may support the second area ⓑ so that the second area ⓑ of the flexible display module 24 is maintained in a form of being smoothly connected to the first area ⓐ of the flexible display module 24. The display support structure 2420 may contribute to a smooth movement of the flexible display module 24 in case that the second housing 22 slides with respect to the first housing 21. For example, in case that the second housing 22 slides with respect to the first housing 21, the display support structure 2420 may contribute so that the second area b) of the flexible display module 24 is movable while maintaining a form of being smoothly connected to the first area ⓐ of the flexible display module 24.

According to an embodiment, the display support structure 2420 may include a multi-bar structure (or a multi-bar or a multi-bar assembly). For example, the multi-bar structure may include multiple support bars extending in the third direction ③ orthogonal to the first direction ① (e.g., the slide-out direction) and orthogonal to the direction in which the front surface of the slidable electronic device is oriented. The multi-bar structure may include a form in which multiple support bars are arranged on the other surface opposite to one surface of the display support structure 2420, which faces the second area ⓑ of the flexible display module 24. The multi-bar structure may have flexibility due to portions between the multiple support bars, which have a relatively thin thickness. In some embodiments, the multi-bar structure may be provided without a portion for connecting two support bars adjacent to each other. The multi-bar structure may also be referred to another term such as a "flexible track". The display support structure 2420 may include a metal material such as stainless steel and/or a non-metal material such as a polymer. Although the support sheet 2410 corresponding to the second area ⓑ of the flexible display module 24 provides a lattice structure including multiple openings, compared to a comparative example in which the support sheet 2410 is omitted, it may be possible to reduce or prevent a phenomenon in which the multiple support bars of the multi-bar structure protrude through the flexible display module 24 and thus are seen.

According to various embodiments, the display support structure 2420 may function as a support sheet 2410, and in this case, the support sheet 2410 may be omitted.

According to various embodiments, the support sheet 2410 may be defined or interpreted as a display support structure different from the display support structure 2420.

According to various embodiments, the support sheet 2410 may be defined or interpreted as a part of the display support structure 2420.

According to an embodiment, in order to reduce the frictional force between a display support surface (e.g., the first support surface 22A and the second support surface 22B) of the second housing 22 and the display support structure 2420, a lubricant (e.g., grease) may be placed (e.g., applied) between the display support surface of the second housing 22 and the display support structure 2420. In some embodiments, the display support surface of the second housing 22 or the surface of the display support structure 2420 may be formed with a lubricating material (e.g., coating using various lubricating materials such as Teflon).

According to an embodiment, the first guide rail 41 and the second guide rail 42 may guide a movement of the display support structure 2420. The first guide rail 41 may include a first rail part on which one side part of the display support structure 2420 is positioned and which guides the movement thereof. The second guide rail 42 may include a second rail part on which the other side part of the display support structure 2420 is positioned and which guides the movement thereof. For example, in case that the second housing 22 slides with respect to the first housing 21, the first rail part and the second rail part may include a recess for providing a pattern corresponding to a movement path of the display assembly 50. The first guide rail 41 may be positioned between the second housing 22 and the fifth side wall 205 of the third housing 23, and may be disposed in the second housing 22 by using a manner such as screw fastening. The second guide rail 42 may be positioned between the second housing 22 and the sixth side wall 206 of the third housing 23, and may be disposed in the second housing 22 by using a manner such as screw fastening. The first guide rail 41 may be coupled to the fifth side wall 205 of the third housing 23 by using a manner such as screw fastening. The second guide rail 42 may be coupled to the sixth side wall 206 of the third housing 23 by using a manner such as screw fastening.

In an embodiment, referring to FIG. 7, the multiple support bars included in the display support structure 2420 may include a first edge support part 2421*a* for supporting a first edge area (or a first rim area) 711 of the flexible display module 24, which is positioned to correspond to the first guide rail 41. The multiple support bars may include a first pin 2421*b* which extends from the first edge support part 2421*a* and is inserted into the first rail part of the first guide rail 41. The multiple support bars may include a second edge support part 2422*a* for supporting a second edge area (or a second rim area) 712 of the flexible display module 24, which is positioned to correspond to the second guide rail 42. The multiple support bars may include a second pin 2422*b* which extends from the second edge support part 2422*a* and is inserted into the second rail part of the second guide rail 42. In some embodiments, all the metal members or non-metal members including the first edge support part 2421*a* and the first pin 2421*b*, and all the metal members or non-metal members including the second edge support part 2422*a* and the second pin 2422*b* may be separately provided and then coupled to the support bar.

According to various embodiments, the fifth side wall 205 of the third housing 23 may be implemented to include a first guide rail, and in this case, the first guide rail 41 may be omitted. The sixth side wall 206 of the third housing 23 may be implemented to include a second guide rail, and in this case, the second guide rail 42 may be omitted.

According to an embodiment, the sliding drive device 43 may include a motor assembly 431, a bracket (or a motor bracket) 432, a cylindrical gear (a circular gear or a round gear) 433, and/or a linear gear (or a linear gear structure) 434.

According to an embodiment, the motor assembly 431 may provide power (or a driving force) for sliding of the second housing 22 with respect to the first housing 21. The motor assembly 431 may be disposed in the second housing 22. For example, the motor assembly 431 may be disposed on a surface of the second housing 22, which faces the rear surface of the slidable electronic device 2. The motor assembly 431 may provide power for sliding of the second housing 22 with respect to the first housing 21. In case that the second housing 22 slides with respect to the first housing 21 by the power provided by the motor assembly 431, there may be a relative position change between the first guide rail 41 and one side of the display support structure 2420, which is positioned on the first guide rail 41, and a relative position change between the second guide rail 42 and the other side of the display support structure 2420, which is positioned on the second guide rail 42. The flexible display assembly 50 may be coupled to the first support part 2111 of the first housing 21. Therefore, the relative position change between the first housing 21 and the second housing 22, the relative position change between the first guide rail 41 and one side of the display support structure 2420, and the relative position change between the second guide rail 42 and the other side of the display support structure 2420 may act as a force for moving a portion of the display support structure 2420, at which the second area ⓑ of the flexible display module 24 is disposed.

According to an embodiment, the motor assembly 431 may include a motor and a gear structure drivingly connected to the motor. For example, the motor may include a step motor. The motor may be implemented in various other types, and the configuration thereof is not limited. For example, the gear structure may drivingly connect the motor and the cylindrical gear 433, between the motor and the cylindrical gear 433. The gear structure may be connected to a first rotating shaft (a first shaft or an input shaft), and may include a second rotating shaft (a second shaft or an output shaft) connected to the cylindrical gear 433. The first rotating shaft and the second rotating shaft may be substantially parallel to the third direction ③. The rotation center line of the first rotating shaft and the rotation center line of the second rotating shaft may coincide substantially. In some embodiments, the rotation center line of the first rotating shaft and the rotation center line of the second rotating shaft may be parallel to each other while being spaced apart from each other. In some embodiments, the first rotating shaft and the second rotating shaft may not be parallel to each other, and corresponding thereto, the motor assembly 431 may be modified and positioned differently from the illustrated example. For example, the first rotating shaft and the second rotating shaft may be orthogonal to (or intersect) each other, and the gear structure may be implemented to transfer power or motion from the first rotating shaft to the second rotating shaft by using a conical gear (e.g., a bevel gear). In an embodiment, the gear structure may include reduction gears. For example, the gear structure may be configured such that the second rotating shaft rotates at a slower rotational speed or lower revolutions per minute than the first rotating shaft. The gear structure may increase the torque of the second rotating shaft by reducing the power of the first rotating shaft. The gear structure (e.g., reduction gears) may increase torque while reducing the speed of the second rotating axis compared to the first rotating axis, and thus may contribute to stable sliding of the second housing 22 with respect to the first housing 21. The power for sliding the second housing 22 with respect to the first housing 21 may be output from the second rotating shaft, and the second rotating shaft may be defined or interpreted as a rotating shaft, a drive shaft, or a power transmission shaft of the motor assembly 431. In some embodiments, the cylindrical gear 433 may be defined or interpreted as a part of the gear structure. In some embodiments, the motor may be implemented in an integral form including the gear structure. In some embodiments, the gear structure may be omitted, and in this case, the first rotating shaft of the motor may be connected to the cylindrical gear 433.

According to an embodiment, the motor assembly 431 may be disposed in (or connected to) the second housing 22 by using the bracket 432. The bracket 432 may contribute to positioning the motor assembly 431 in the second housing 22 stably. The bracket 432 may contribute to durability of the motor assembly 431. In an embodiment, the bracket 432 may be coupled to the gear structure of the motor assembly 431, and be coupled to the second housing 22 by using screw fastening. For example, the cylindrical gear 433 may be accommodated in the bracket 432, and a rotating shaft of the cylindrical gear 433 may be rotatably supported by the bracket 432. The bracket 432 may be an element for stably positioning the motor assembly 431 in the second housing 22, and be referred to as various other terms such as a "connection structure", a "connection member", a "motor assembly support member", a "motor assembly support structure", a "motor assembly bracket", or a "frame".

According to an embodiment, the cylindrical gear 433 may include a rotating body having a circular cylinder shape or a disc shape, and multiple gear teeth formed along the circumference of the rotating body. The linear gear 434 may be a gear structure in which multiple gear teeth are linearly arranged in the first direction ① (e.g., the slide-out direction). For example, the linear gear 434 may be a plate shape including one surface including multiple gear teeth, and the other surface positioned opposite to the one surface. The linear gear 434 may be disposed in the first support part 2111 of the first housing 21. The linear gear 434 may be disposed on the second surface **2111*b* of the first support part 2111 by using various manners such as screw fastening or bonding. The cylindrical gear 433 and the linear gear 434 may be in an engaged state with each other. The cylindrical gear 433 may perform a rotational motion by the second rotating shaft of the motor assembly 431, and the linear gear 434 engaged with the cylindrical gear 433 may perform a linear motion. The rotational motion of the cylindrical gear 433 may be converted into a linear motion of the linear gear 434 so as to provide the mutual sliding between the first housing 21 coupled to the linear gear 434 and the second housing 22 coupled to the motor assembly 431. When seen from above the front surface of the slidable electronic device 2 (e.g., when seen in the −z-axis direction), the area, in which the second housing 22 covers the first support part 2111 of the first housing 21 and the linear gear 434 disposed on the first support part 2111, may decrease in case that the second housing 22 slides out, and may increase in case that the second housing 22 slides in. In some embodiments, the cylindrical gear 433 may be referred to as a "pinion" or a "pinion gear", and the linear gear 434 may be referred to as a "rack" or a "rack gear". The cylindrical gear 433 and the linear gear 434 may be formed of a material (e.g., metal or engineering plastic) which has stiffness or proof stress and is not substantially deformed in response to the force acting on the mutual sliding between the first housing 21 and the second housing 22**.

According to various embodiments, the first support part 2111 of the first housing 21 may be provided in an integral form including the linear gear 434.

According to an embodiment, in order to reduce motion transfer loss or power transmission loss, a lubricant (e.g., grease) may be placed between the cylindrical gear 433 and the linear gear 434 so as to secure a smooth movement between the cylindrical gear 433 and the linear gear 434 and/or durability. In some embodiments, the cylindrical gear 433 and/or linear gear 434 may be coated with a lubricating material (e.g., coating using various lubricating materials such as Teflon coating) to reduce motion friction.

According to various embodiments, by using bracket 432, the motor assembly 431 and the cylindrical gear 433 may be disposed in the first support part 2111 of the first housing 21, and the linear gear 434 may be disposed in the second housing 22.

According to an embodiment, the slidable electronic device 2 may include a motor drive circuit (e.g., a motor controller or a motor driver) electrically connected to the motor assembly 431. The motor drive circuit may control the motor assembly 431, based on a control signal received from a processor (e.g., the processor 120 in FIG. 1), and thus, the rotation direction, rotation angle, rotation amount, rotation speed, rotation acceleration, or rotation angular velocity of the cylindrical gear 433 drivingly connected to the motor assembly 431 may be adjusted. In an embodiment, the motor drive circuit may include a motor encoder for detecting a drive state of the motor. For example, the motor encoder may include a disc plate coupled to the rotating shaft of the motor, and a detector capable of detecting the rotation direction, rotation angle, rotation amount, rotation speed, rotation acceleration, or rotation angular velocity of the rotating shaft through electronically recognizable scales and marks formed on the disc. The processor may control the motor drive circuit, based on instructions stored in a memory (e.g., the memory 130 in FIG. 1), which are related to the mutual sliding between the first housing 21 and the second housing 22.

In case that the slidable electronic device 2 is switched from a closed state (see FIG. 2) to an open state (see FIG. 3) or from an open state to a closed state, in case that the sliding speed (or the moving speed) of the second housing 22 with respect to the first housing 21 is not equal to zero at the timing at which the state switch is completed, there may occur a collision phenomenon in which the first housing 21 and the second housing 22, which relatively move, interact strongly for a relatively short time period. The collision phenomenon makes it difficult to provide a smooth sliding motion to a user, and the impact caused by the collision may cause damage to elements (or drive elements) included in the sliding drive device 43. In an embodiment, the slidable electronic device 2 may control the motor drive circuit to control the rotation speed of the cylindrical gear 433 and thus to reduce the collision phenomenon. In case that the slidable electronic device 2 is switched from a closed state to an open state or from an open state to a closed state, the rotation speed of the cylindrical gear 433 may be controlled such that the second housing stops at the timing at which the state switch is completed while the sliding speed of the second housing 22 with respect to the first housing 21 is reduced.

According to an embodiment, the slidable electronic device 2 may include a sliding structure for stable and smooth mutual sliding between the first housing 21 and the second housing 22. For example, the sliding structure may include a linear motion (LM) guide for connecting the first housing 21 and the second housing 22. Through the LM guide, the second housing 22 may be linearly moved in the first direction ① or the second direction ②, naturally and smoothly with respect to the first housing 21. For example, the LM guide may include a rail, a block, and/or a bearing. The rail may have a bar shape extending from a first end to a second end thereof in a direction (e.g., the first direction ① in which the second housing 22 slides with respect to the first housing 21. The rail and the block may be slidably coupled to each other. The bearing is placed between the rail and the block to reduce friction between the rail and the block. For example, the bearing may include multiple bearing balls and a retainer. In some embodiments, the block may be provided in a form including the bearing. In an embodiment, although not illustrated, the slidable electronic device 2 may include a first LM guide and a second LM guide. A first end of the rail of the first LM guide may be coupled to the second side wall 202 of the first housing 21, and the block of the first LM guide may be disposed on (or coupled to) one surface of the second housing (or a second frame) 22, which corresponds to the first guide rail 41. The first guide rail 41 may include a first recess provided to correspond to the rail of the first LM guide. In case that the second housing 22 coupled to the block of the first LM guide slides out or slides in with respect to the first housing 21 coupled to the rail, the first recess may prevent the first guide rail and the rail of the first LM guide from interfering with each other. A first end of the rail of the second LM guide may be coupled to the third side wall 203 of the first housing 21, and the block of the second LM guide may be disposed on (or coupled to) one surface of the second housing 22, which corresponds to the second guide rail 42. When seen from above the rear surface of the slidable electronic device 2 (e.g., when seen in the +z-axis direction), the first LM guide and the second LM guide may be symmetrically arranged with reference to a center line D (see FIGS. 2 and 3) of the slidable electronic device 2. When seen from above the screen (e.g., when seen in the −z-axis direction), the center line D of the slidable electronic device 2 may be positioned between the second edge E2 and the third edge E3 of the screen, and may be an imaginary straight line positioned at a distance which is substantially the same as those of the second edge E2 and the third edge E3. The second guide rail 42 may include a second recess 421 provided to correspond to the rail of the second LM guide. In case that the second housing 22 coupled to the block of the second LM guide slides out or slides in with respect to the first housing 21 coupled to the rail, the second recess 421 may prevent the second guide rail and the rail of the second LM guide from interfering with each other. According to a relative position between first housing 21 and the second housing 22, the degree to which the rail of the first LM guide is positioned in the first recess of the first guide rail 41, and the degree to which the rail of the second LM guide is positioned in the second recess 421 of the second guide rail 42, may be changed.

According to various embodiments, the rail of the LM guide may be coupled to the first support part 2111 of the first housing 21.

According to various embodiments, the rail of the LM guide may be coupled to the second housing (or a second frame) 22, and the block of the LM guide may be coupled to the first frame 211 of the first housing 21.

The structure for smooth mutual sliding between the first housing 21 and the second housing 22 may be provided in various other manners. The inner space of the slidable electronic device 2 may increase in case that the second housing 22 slides out, and may decrease in case that the second housing 22 slides in. Elements accommodated in the inner space of the slidable electronic device 2 may be positioned so as not to interfere with mutual sliding between the first housing 21 and the second housing 22.

According to an embodiment, the slidable electronic device 2 may include a tension device for making sliding of the second housing 22 with respect to the first housing 21 perform naturally and smoothly. The tension device may enable the movement or force between drive elements related to sliding of the second housing 22 with respect to the first housing 21 to be smoothly transferred so as to perform natural and smooth sliding. The tension device may enable the slidable electronic device 2 to slide naturally and smoothly so as to reduce influence by stress on the drive elements, thereby reducing or preventing damage thereof.

According to an embodiment, the battery 44 may be positioned between the second housing (or a second frame) 22 and the second support part 2311 of the third housing 23. The battery 44 may be disposed in the second housing 22. For example, one side of the second housing 22, which faces the rear surface of the slidable electronic device 2, may provide a battery seat structure. For example, the battery seat structure may include a fitting structure or a recess structure which allows the battery 44 to be stably positioned in the second housing 22. The battery 44 may be a device for supplying power to at least one element of the slidable electronic device 2, and for example, may include a non-rechargeable primary cell, a rechargeable secondary cell, or a fuel cell.

According to various embodiments, the slidable electronic device 2 may further include an additional battery disposed in the first housing 21.

According to an embodiment, the first printed circuit board 45 may be positioned between the first support part 2111 and the first cover 212 of the first housing 21. The first printed circuit board 45 may be disposed in the first support part 2111 of the first housing 21. One surface of the first support part 2111, which faces the rear surface of the slidable electronic device 2, may provide a substrate seat structure. The substrate seat structure may include a fitting structure or a recess structure which allows the first printed circuit board 45 to be stably positioned in the first support part 2111. The first printed circuit board 45 may be disposed on the substrate seat structure by using various manners such as screw fastening. Various electronic components (e.g., a part of the elements in FIG. 1) may be arranged on the first printed circuit board 45. Various elements, which are electrically connected to the first printed circuit board 45, may be arranged in the first housing 21. For example, elements such as the second camera module 305 or the third camera module 306 may be disposed in the first support part 2111, between the first support part 2111 and the first cover 212.

According to an embodiment, the second printed circuit board 46 may be positioned between the second support part 2311 and the second cover 232 of the third housing 23. The second printed circuit board 46 may be disposed in the second support part 2311 of the third housing 23. A surface of the second support part 2311, which faces the second cover 232, may include a substrate seat structure. The substrate seat structure may include a fitting structure or a recess structure which allows the second printed circuit board 46 to be stably positioned in the second support part 2311. The second printed circuit board 46 may be disposed in the substrate seat structure by using various manners such as bonding or screw fastening. Various electronic components (e.g., a part of the elements in FIG. 1) may be arranged on the second printed circuit board 46. For example, the first printed circuit board 45 or the second printed circuit board 46 may include a printed circuit board (PCB), a flexible PCB (FPCB), or a rigid-flexible PCB (RFPCB). The second printed circuit board 46 may be electrically connected to the first printed circuit board 45 by using an electrical connection member. For example, the first printed circuit board 45 may be electrically connected to the second printed circuit board 46 through a flexible RF cable (FRC).

According to an embodiment, the antenna structure 47 may be positioned between the second support part 2311 and the second cover 232 of the third housing 23. The antenna structure 47 may be disposed in the second support part 2311 of the third housing 23 or be disposed in the second cover 232. The position of the antenna structure 47 is not limited thereto and may be various. For example, the antenna structure 47 may be implemented in the form of a film such as an FPCB. The antenna structure 47 may include at least one conductive pattern used as a loop type radiator. For example, the at least one conductive pattern may include a planar helical conductive pattern (e.g., a planar coil or a pattern coil). In an embodiment, at least one conductive pattern included in the antenna structure 47 may be electrically connected to a wireless communication circuit (e.g., the wireless communication module 192 in FIG. 1) disposed on the first printed circuit board 45 or the second printed circuit board 46. For example, the at least one conductive pattern may be utilized for short-range wireless communication such as near field communication (NFC). For another example, the at least one conductive pattern may be utilized for magnetic secure transmission (MST) for transmitting and/or receiving a magnetic signal. In some embodiments, at least one conductive pattern included in the antenna structure 47 may be electrically connected to a power transmission/reception circuit disposed on the first printed circuit board 45 or the second printed circuit board 46. The power transmission/reception circuit may wirelessly receive power from an external electronic device or wirelessly transmit power to the external electronic device, by using the at least one conductive pattern. The power transmission/reception circuit may include a power management module, and for example, may include a power management integrated circuit (PMIC) or a charger integrated circuit (IC). The power transmission/reception circuit may charge the battery 44 by using power wirelessly received using the conductive pattern.

According to various embodiments, a processor (e.g., the processor 120 in FIG. 1) electrically connected to a wireless communication circuit (e.g., the wireless communication module 192 in FIG. 1) may perform positioning function (e.g., angle of arrival (AOA)) for a signal source (e.g., a responder, a transmitter, or a Tx (transmitter) device) by using the antenna structure 47. The processor may simultaneously perform positioning (AOA) for measuring an angle, and positioning (ranging) for measuring a distance. In an embodiment, the processor may identify (or estimate) the distance between the slidable electronic device 2 and the signal source by using at least one antenna element (e.g., a first antenna element, a second antenna element, and/or a third antenna element) included in the antenna structure 47. In an embodiment, the processor may identify (or estimate) a reception angle (e.g., the direction of a signal) of a signal with respect to a set axis of the slidable electronic device 2 by using at least one of a difference in the arrival time of a response message for a request message through at least two antenna elements included in the antenna structure 47, and an arrival distance difference or a phase difference between received signals. The slidable electronic device 2 may support a location positioning function by using the bandwidth of a broadband (e.g., an ultra-wide band (UWB)). For example, the UWB may be a technology which conforms to the international standard of IEEE 802.15.4, and may be a technology for communicating using the bandwidth of a broadband. In an embodiment, the processor may identify or estimate a position of a signal source (e.g., a responder, a transmitter, or a Tx device) with respect to the slidable electronic device 2 (e.g., an initiator, a receiver, or a receiver (Rx) device) by using the phase difference between the signals received through the multiple antenna elements included in the antenna structure 47. The antenna structure 47 may be provided as a printed circuit board (e.g., a flexible printed circuit board (FPCB)), and for example, may be a patch antenna including multiple patches (e.g., a first antenna element, a second antenna element, and a third antenna element).

Figure 8:
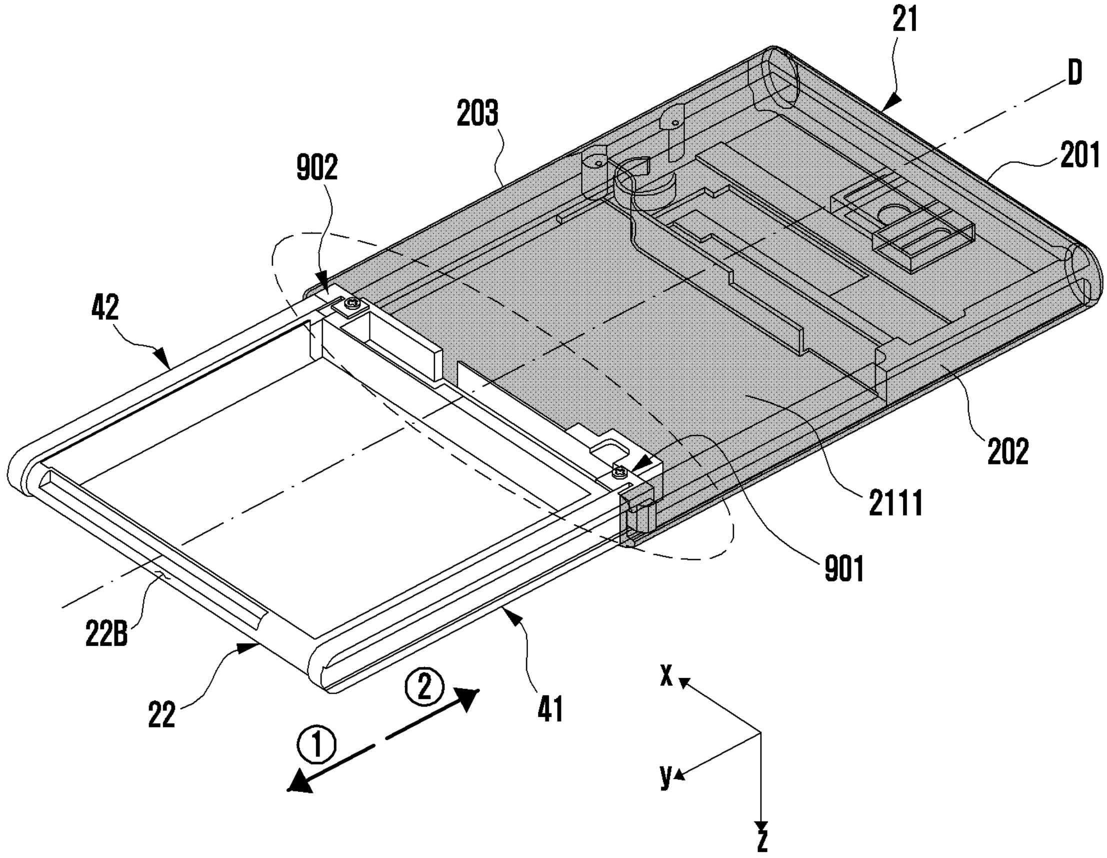
FIG. 8 is a perspective view showing a first housing, a second housing, a first guide rail, a second guide rail, a first hook assembly, and a second hook assembly according to an embodiment of the disclosure.

FIG. 8 is a perspective view showing a first housing 21, a second housing 22, a first guide rail 41, a second guide rail 42, a first hook assembly 901, and a second hook assembly 902 according to an embodiment of the disclosure.

Referring to FIG. 8, a first hook assembly 901 and a second hook assembly 902 may be disposed in the second housing 22. The first hook assembly 901 may be disposed in the second housing 22 so as to correspond to the second side wall 202 of the first housing 21 in an open state of the slidable electronic device 2 (see FIG. 3). For example, the second side wall 202 may extend in the first direction ① (e.g., the slide-out direction) from one end connected to the first side wall 201 to the other end, and the first hook assembly 901 may be positioned at the other end of the second side wall 202 or positioned to correspond to the vicinity thereof. The second hook assembly 902 may be disposed in the second housing 22 so as to correspond to the third side wall 203 of the first housing 21 in an open state of the slidable electronic device 2. For example, the third side wall 203 may extend in the first direction ① from one end connected to the first side wall 201 to the other end, and the second hook assembly 902 may be positioned at the other end of the third side wall 203 or positioned to correspond to around the other end of the third side wall. In an embodiment, when seen from above the rear surface of the slidable electronic device 2 (e.g., when seen in the +z-axis direction), the first hook assembly 901 and the second hook assembly 902 may be symmetrically disposed with respect to the center line D of the slidable electronic device 2. Referring to FIGS. 2 and 3, when seen from above the screen (e.g., when seen in the −z-axis direction), the center line D of the slidable electronic device 2 may be positioned between the second edge E2 and the third edge E3 of the screen, and be an imaginary straight line positioned at a distance which is substantially the same as those of the second edge E2 and the third edge E3.

Figure 9:
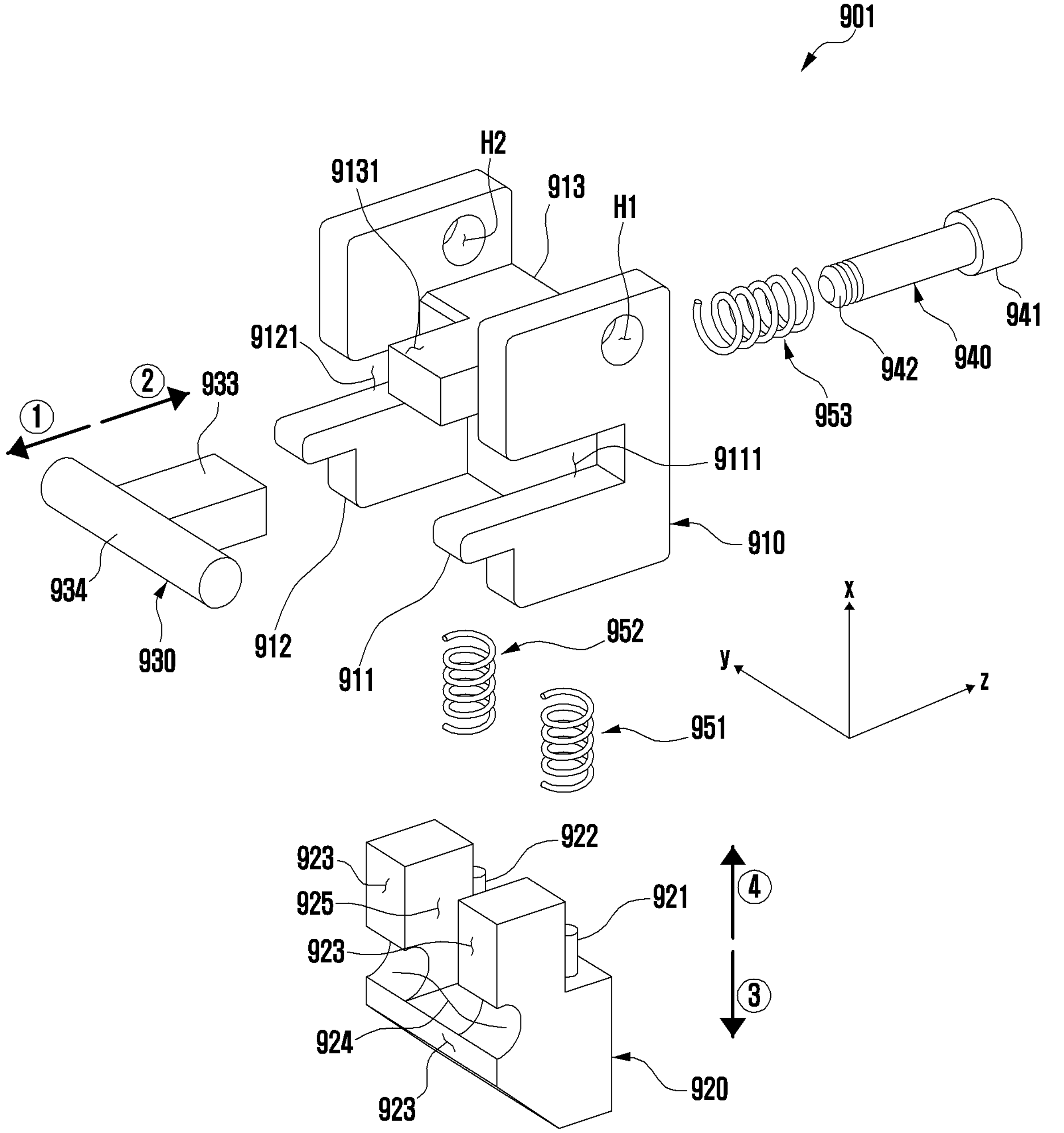
FIGS. 9 and 10 are exploded perspective views of a first hook assembly according to an embodiment of the disclosure.
Figure 10:
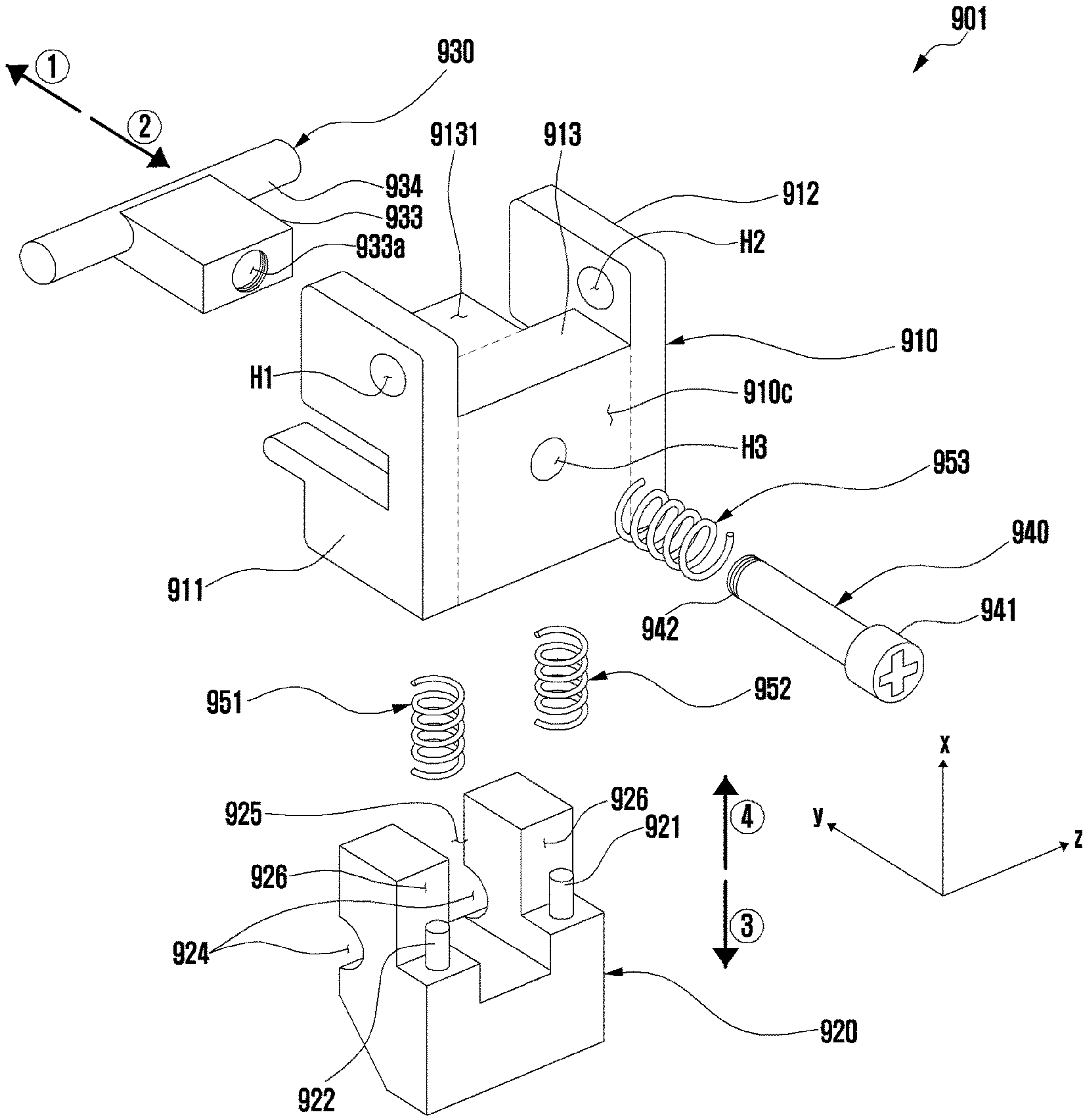

FIGS. 9 and 10 are exploded perspective views of a first hook assembly 901 according to an embodiment of the disclosure.

Referring to FIGS. 9 and 10, in an embodiment, the first hook assembly 901 includes a block 910, a hook 920, a lock 930, a shaft (or a pin) 940, a first compression spring 951, a second compression spring 952, and/or a third compression spring 953.

According to an embodiment, the block 910 may be a support (or a base) in which the hook 920, the lock 930, the shaft 940, the first compression spring 951, the second compression spring 952, and the third compression spring 953 are arranged. The hook 920 may be disposed in the block 910 to be movable (e.g., a translational motion) with respect to the block 910 in the third direction ③ or the fourth direction ④ opposite to the third direction ③. The third direction ③ may be a direction perpendicular to a direction in which the front surface of the slidable electronic device 2 is oriented, and perpendicular to the first direction ①, and may be a direction from the third side wall 203 (see FIG. 8) to the second side wall 202. The first compression spring 951 and the second compression spring 952 positioned between the block 910 and the hook 920 may elastically support the hook 920 with respect to the block 910, and in case that the hook 920 moves, may elastically support the movement thereof. The lock 930 and the shaft 940 may be connected to each other. The lock 930 and the shaft 940 may be disposed in the block 910 to be movable (e.g., a translational motion) with respect to the block 910 in the first direction ① or the second direction ② opposite to the first direction ①. The third compression spring 953 may elastically support the lock 930 and the shaft 940 with respect to the block 910, and may elastically support movements of the lock 930 and the shaft 940. A compression spring for the hook 920, or a compression spring for the lock 930 and the shaft 940 is not limited to the illustrated example, and may be provided in various numbers. Various other elastic members may be provided to replace a compression spring for the hook 920 or a compression spring for the lock 930 and the shaft 940.

According to an embodiment, the block 910 may be coupled to the second housing 22 by a screw. In case that the second housing 22 slides with respect to the first housing 21, the first hook assembly 901 may be moved together with the second housing 22.

According to an embodiment, the block 910 may include a first portion 911 having a plate shape including a first screw hole H1, a second portion 912 having a plate shape including a second screw hole (H2), and a third portion 913 between the first portion 911 and the second portion 912. The first portion 911 may be positioned to be spaced apart from the second portion 912 in a direction (e.g., the +z-axis direction) in which the rear surface of the slidable electronic device 2 is oriented. The first portion 911 may be positioned to be close to the rear surface of the front surface and the rear surface of the slidable electronic device 2, and the second portion 912 may be positioned to be close to the front surface of the front surface and the rear surface of the slidable electronic device 2. The first portion 911 and the second portion 912 may be symmetrically provided with reference to the third portion 913. The block 910 may have both sides provided in a symmetrical shape with reference to a symmetrical reference surface between the first portion 911 and the second portion 912. A part of the second housing 22 may be inserted into a space between the first portion 911, the second portion 912, and the third portion 913, and may be coupled to the block 910 by using a first screw corresponding to the first screw hole H1 and a second screw corresponding to the second screw hole H2.

According to an embodiment, according to the relative position between the hook 920 and the block 910, when seen from above the rear surface of the slidable electronic device 2 (e.g., when seen in the +z-axis direction), the hook 920 may not substantially protrude or may minimally protrude from the block 910 in the third direction ③. According to the relative position between the hook 920 and the block 910, a part of the hook 920 may protrude with respect to the block 910 in the third direction ③. For example, a part of the hook 920 may be positioned between the first portion 911 and the second portion 912 of the block 910, and when seen from above the rear surface of the slidable electronic device 2, the remaining parts of the hook 920 may protrude with respect to the block 910 in the third direction ③.

According to an embodiment, the hook 920 may include a first protrusion 921 corresponding to the first compression spring 951 and a second protrusion 922 corresponding to the second compression spring 952. The first protrusion 921 and the second protrusion 922 may extend from one surface of the hook 920, which supports the first compression spring 951. The first compression spring 951 may be fitted around the first protrusion 921, and the first protrusion 921 may prevent the first compression spring 951 from being separated from the position on the hook 920. The second compression spring 952 may be fitted around the second protrusion 922, and the second protrusion 922 may prevent the second compression spring 952 from being separated from the position on the hook 920. In some embodiments, although not illustrated, the block 910 may further include a third protrusion and a fourth protrusion protruding from one surface of the block 910, which supports the first compression spring 951 and second compression spring 952. The first compression spring 951 may be inserted around the third protrusion from the side opposite to the first protrusion 921, and thus the third protrusion may prevent the first compression spring 951 from being separated from the position on the block 910. The second compression spring 952 may be inserted around the fourth protrusion from the side opposite to the second protrusion 922, and thus the fourth protrusion may prevent the second compression spring 952 from being separated from the position on the block 910.

According to an embodiment, the shaft 940 may extend in a first direction ① from a first end 941 to a second end 942. The shaft 940 may be positioned through a hole H3 provided through the block 910, and the second end 942 of the shaft 940 may be connected to the lock 930. The second end 942 may include male threads, and the lock 930 may include a screw fastening part (e.g., a boss) 933*a* including female threads capable of being screw-fastened to the second end 942. The third compression spring 953 may allow the shaft 940 to extend therethrough, and may be positioned between the block 910 and the first end 941 of the shaft 940. One end of the third compression spring 953 may be supported by the first end 941 of the shaft 940, and the other end of the third compression spring 953 may be supported by one surface 910*c* of the block 910, which is provided with the hole H3. The one surface 910*c* of the block 910, which supports the third compression spring 953, may be a flat surface substantially oriented in the second direction ②. A part of the shaft 940, which extends from the first end 941 in the first direction ① and includes the second end 942, may be positioned through the third compression spring 953, and may have a diameter smaller than the first end 941. The hole H3 may support the movement of the shaft 940 so that the shaft is substantially moved (e.g., a translational motion) in the first direction ① or the second direction ②.

According to an embodiment, the hook 920 may include a guide surface 923. The guide surface 923 may include a flat surface substantially oriented in the first direction ①, and a curved-surface formed by a recess 924 provided in a dented shape in a second direction ②. When seen from above the rear surface of the slidable electronic device 2 (e.g., when seen in the +z-axis direction), the recess 924 may include a curved-surface which is concave in the second direction ②. The lock 930 may include a slider 934 corresponding to the guide surface 923 of the hook 920, and an extension part 933 which extends from the slider 934 in the second direction ② and is connected to the second end 942 of the shaft 940. The slider 934 may include a curved-surface capable of being fitted into the recess 924 of the guide surface 923. The slider 934 may have a bar shape extending in a direction (e.g., the direction in which the front surface or the rear surface of the slidable electronic device 2 is oriented) orthogonal to the first direction ① and orthogonal to the third direction ③. The extension part 933 may include a screw fastening part (e.g., a boss) 933*a* including female threads capable of being screw-fastened to the second end 942 of the shaft 940. According to the relative positions between the block 910 and the lock 930 and the shaft 940 and hook the 920, the slider 934 may be positioned in the recess 924 of the hook 920, or may face and be in contact with an area outside the recess 924 on the guide surface 923 of the hook 920.

According to an embodiment, in order not to interfere with the movement of slider 934, the first portion 911 of the block 910 may provide a groove 9111 corresponding to the slider 934, and the second portion 912 of the block 910 may provide a second groove 9121 corresponding to the slider 934. The first groove 9111 and the second groove 9121 may be recesses having a dented shape in the second direction ②.

According to an embodiment, the hook 920 may include an opening 925 so as not to interfere with the extension part 933 of the lock 930. For example, the opening 925 may be formed to penetrate between the guide surface 923 and a surface 926 (e.g., a surface facing the first protrusion 921 and the second protrusion 922) opposite to the guide surface 923, and may have a dented shape in the third direction ③.

According to an embodiment, the third portion 913 of the block 910 may include an insert 9131 extending to the opening 925 of the hook 920. The insert 9131 may support the hook 920 so that the hook 920 is stably moved together with the first portion 911 and the second portion 912 of the block 910.

According to an embodiment, the block 910, the hook 920, the lock 930, the shaft 940, the first compression spring 951, the second compression spring 952, or the third compression spring 953 may include a metal material which allows the hook 920, the lock 930, and the shaft 940 to secure rigidity capable of contributing to the translational motion thereof. In some embodiments, the block 910, the hook 920, or the lock 930, and the shaft 940 may include polymer such as engineering plastic which has stiffness or proof stress and is not substantially deformed in an operation of the first hook assembly 901.

According to an embodiment, in order to reduce friction between elements included in the first hook assembly 901, a lubricating material such as Teflon may be placed (e.g., coated) on the friction surface between the two elements.

According to an embodiment, in order to reduce friction between elements included in the first hook assembly 901, a rotating member such as a bearing or a roller may be disposed between the two elements.

Although not illustrated, the second hook assembly 902 may be provided substantially the same as or similar to the first hook assembly 901.

Figure 11:
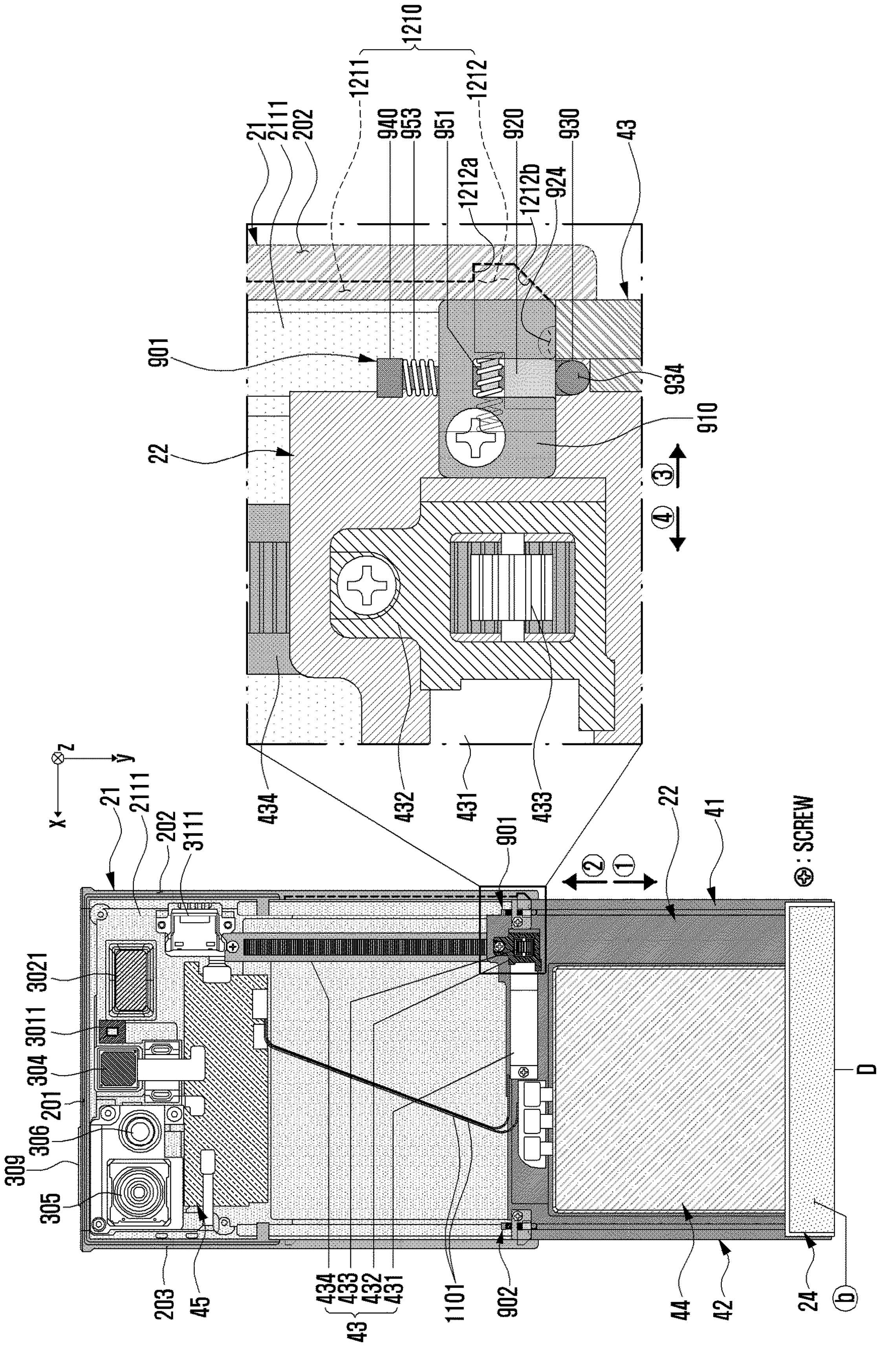
FIG. 11 is a view showing a slidable electronic device in an open state according to an embodiment of the disclosure.
Figure 12:
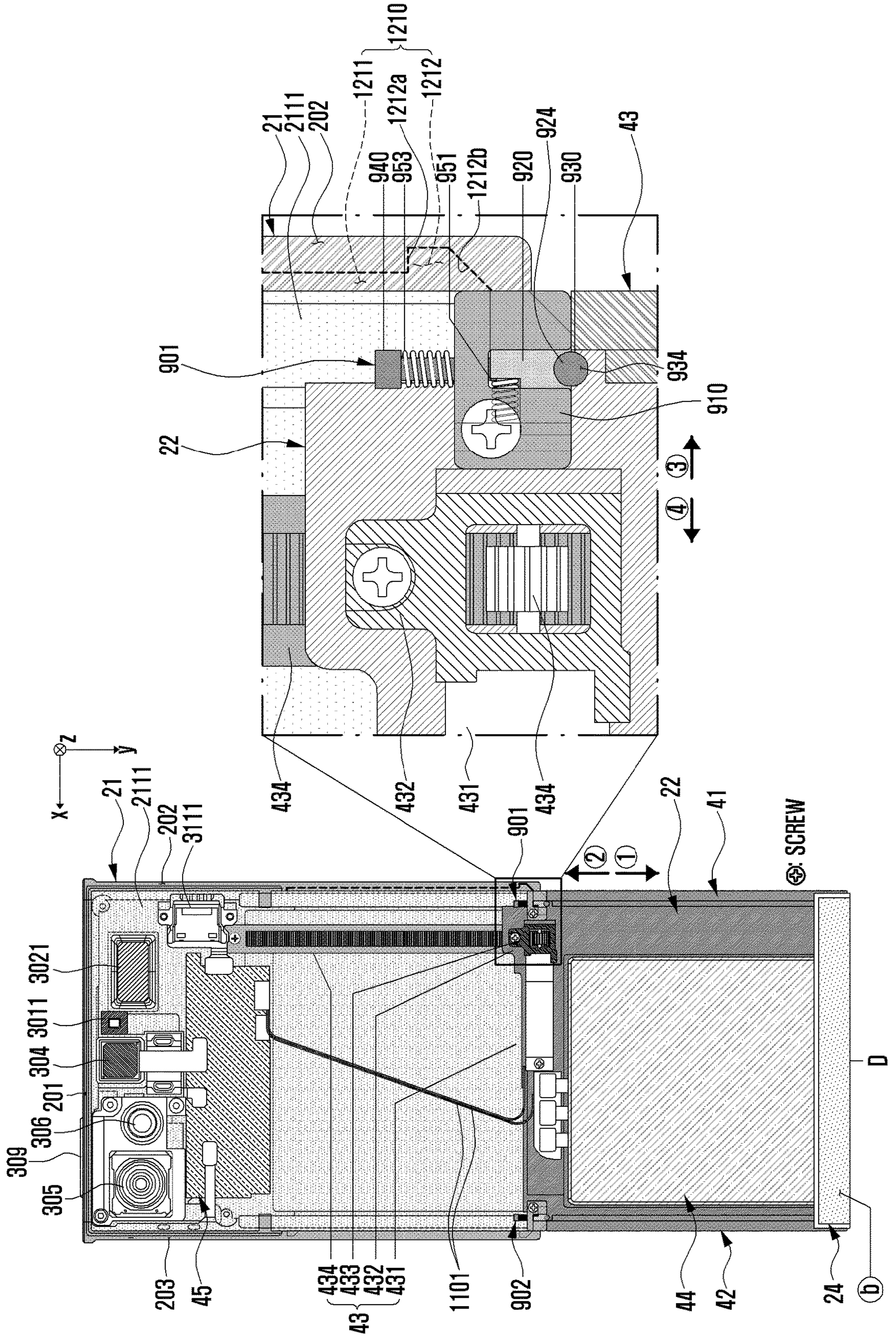
FIG. 12 is a view showing a slidable electronic device in an additional open state according to an embodiment of the disclosure.
Figure 13:
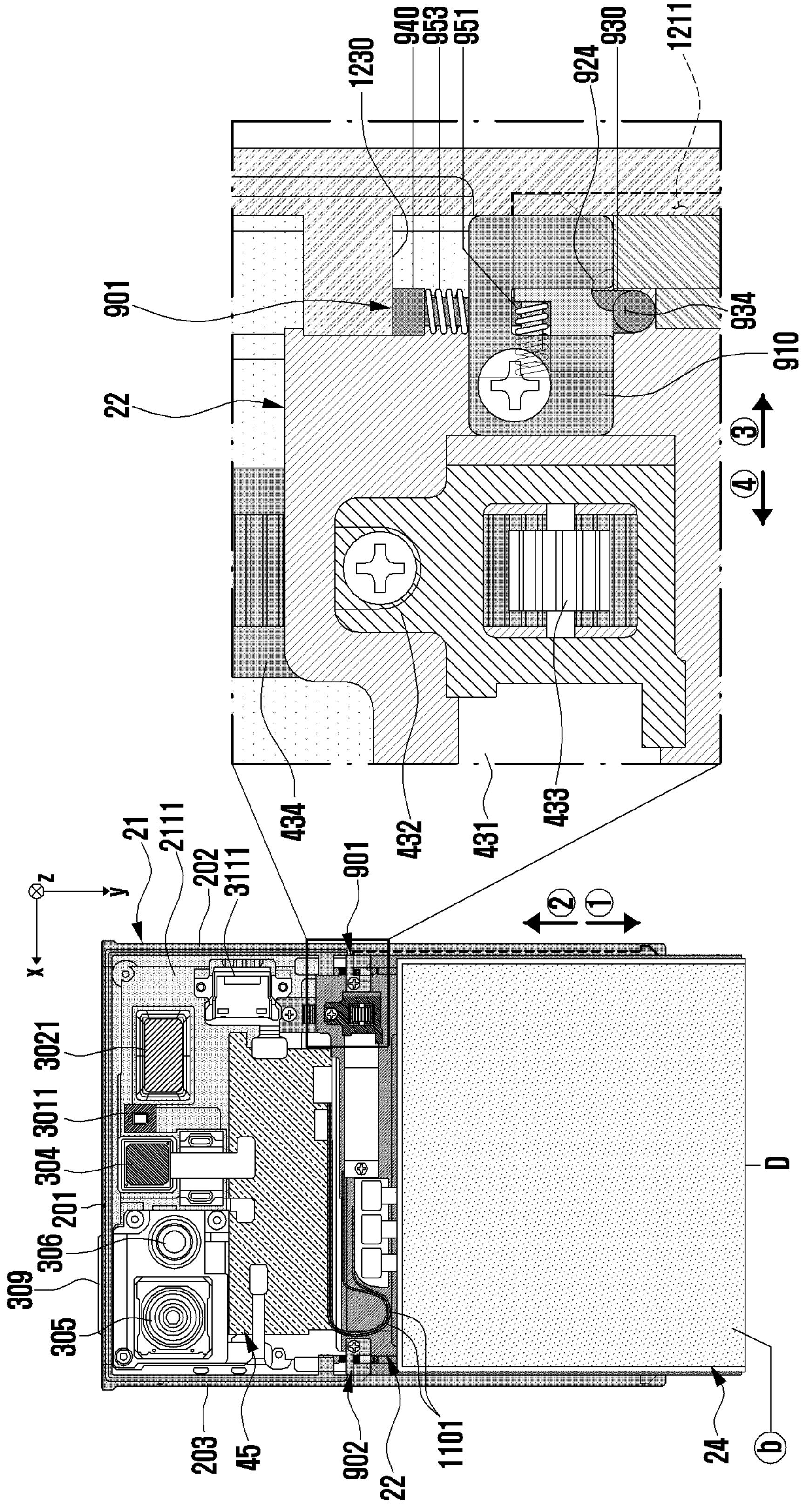
FIG. 13 is a view showing a slidable electronic device in a closed state according to an embodiment of the disclosure.
Figure 14:
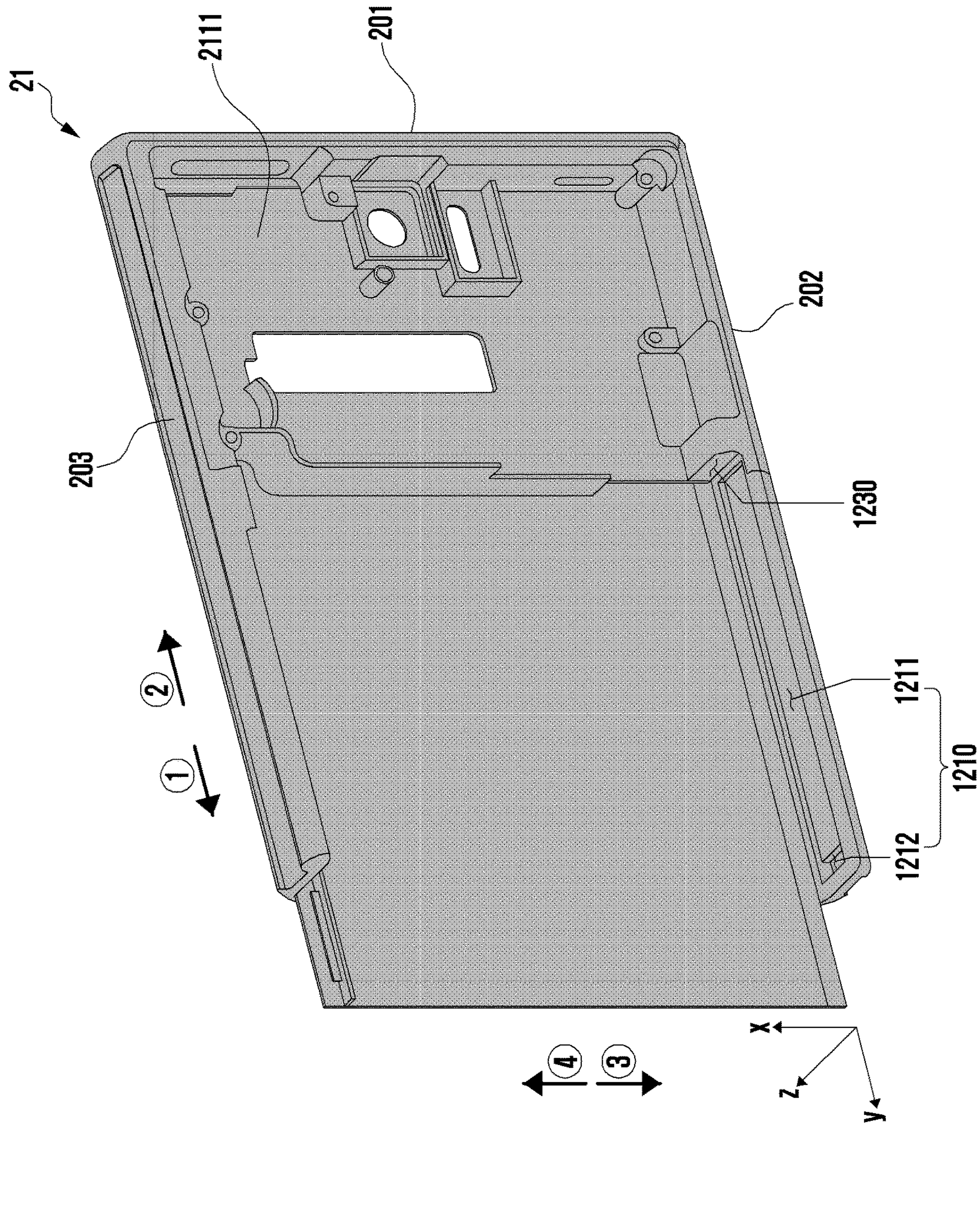
FIG. 14 is a perspective view of a first housing according to an embodiment.
Figure 15:
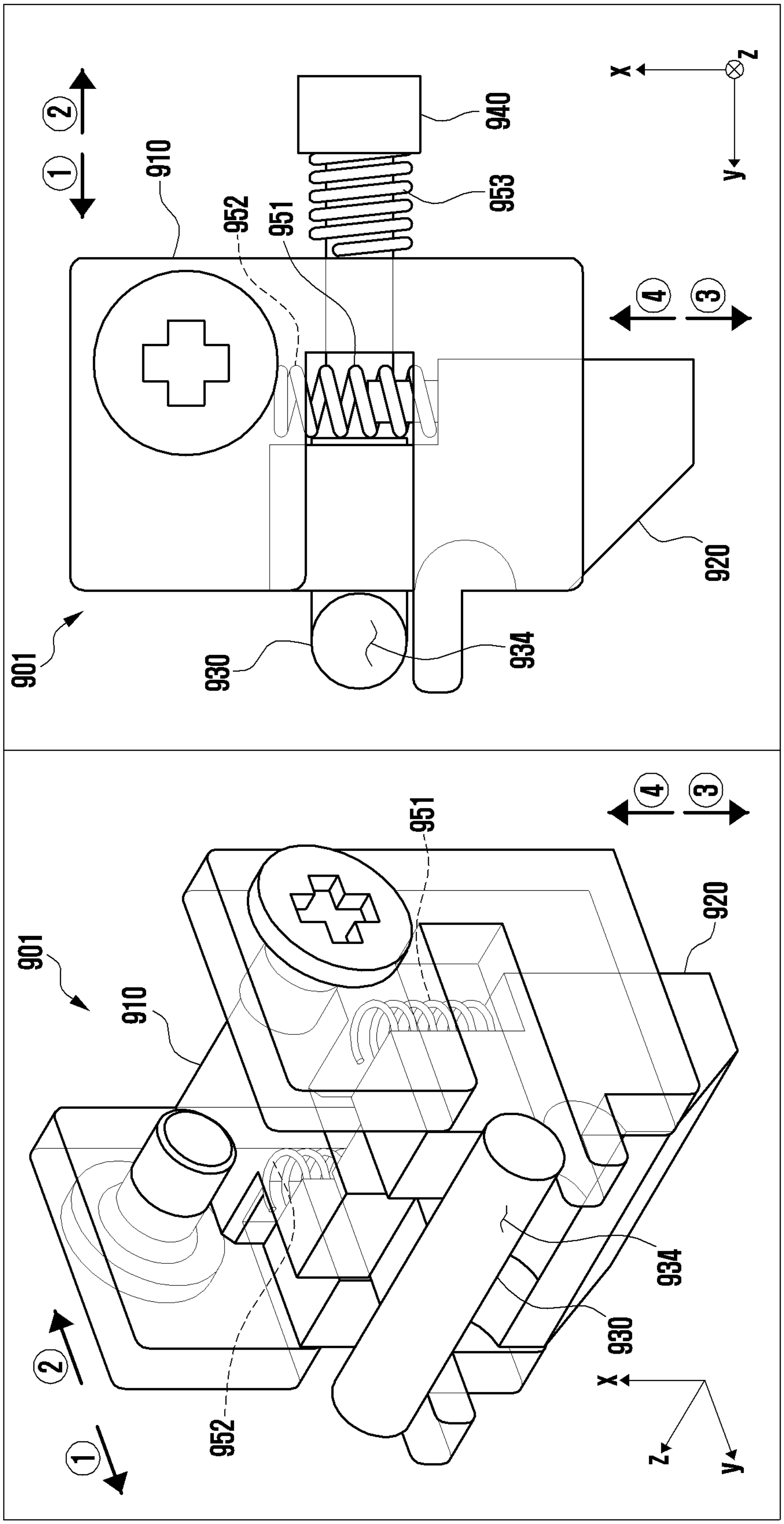
FIG. 15 is views showing a first hook assembly in an open state of a slidable electronic device according to an embodiment of the disclosure.
Figure 16:
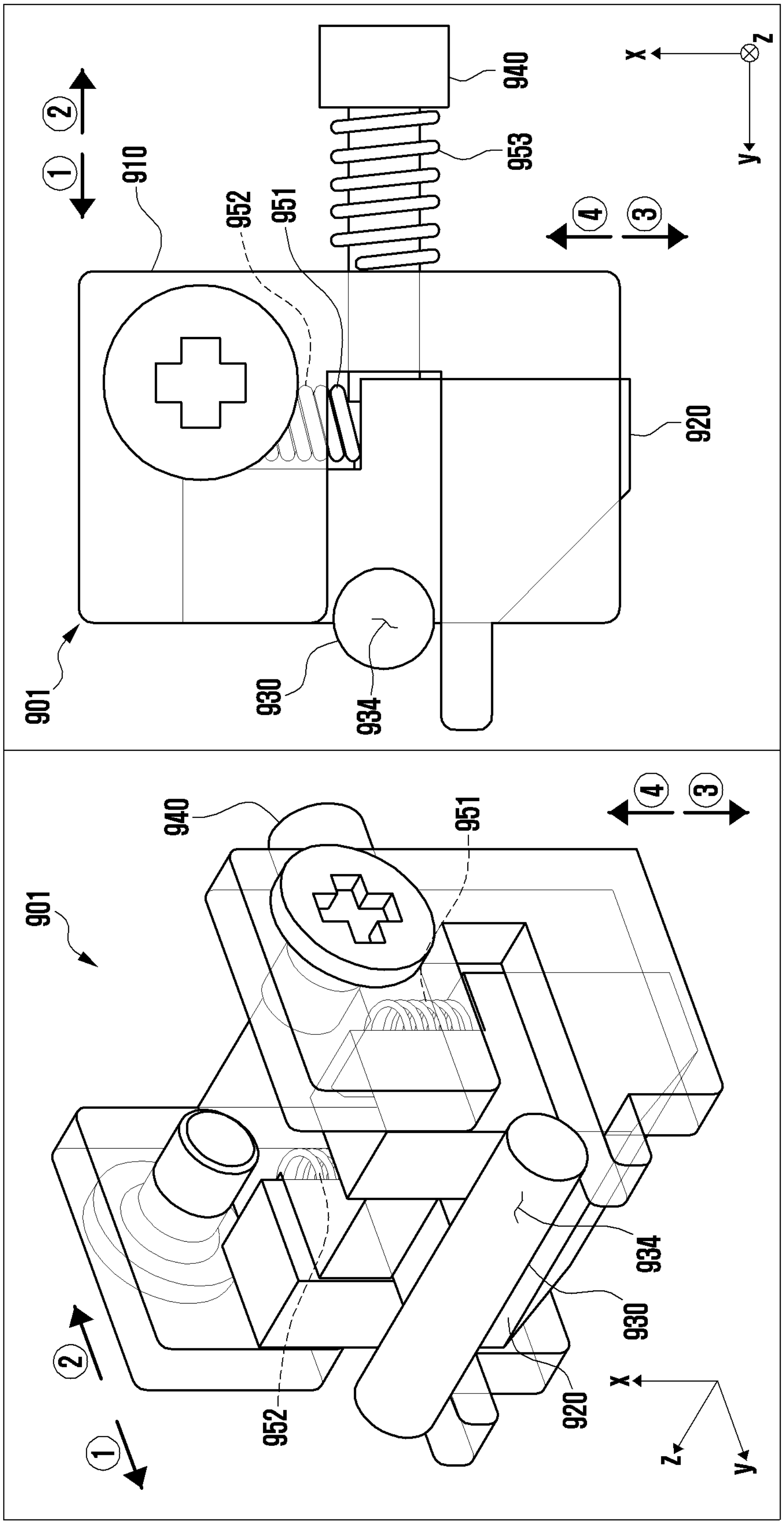
FIG. 16 is views showing a first hook assembly in an additional open state of a slidable electronic device according to an embodiment of the disclosure.
Figure 17:
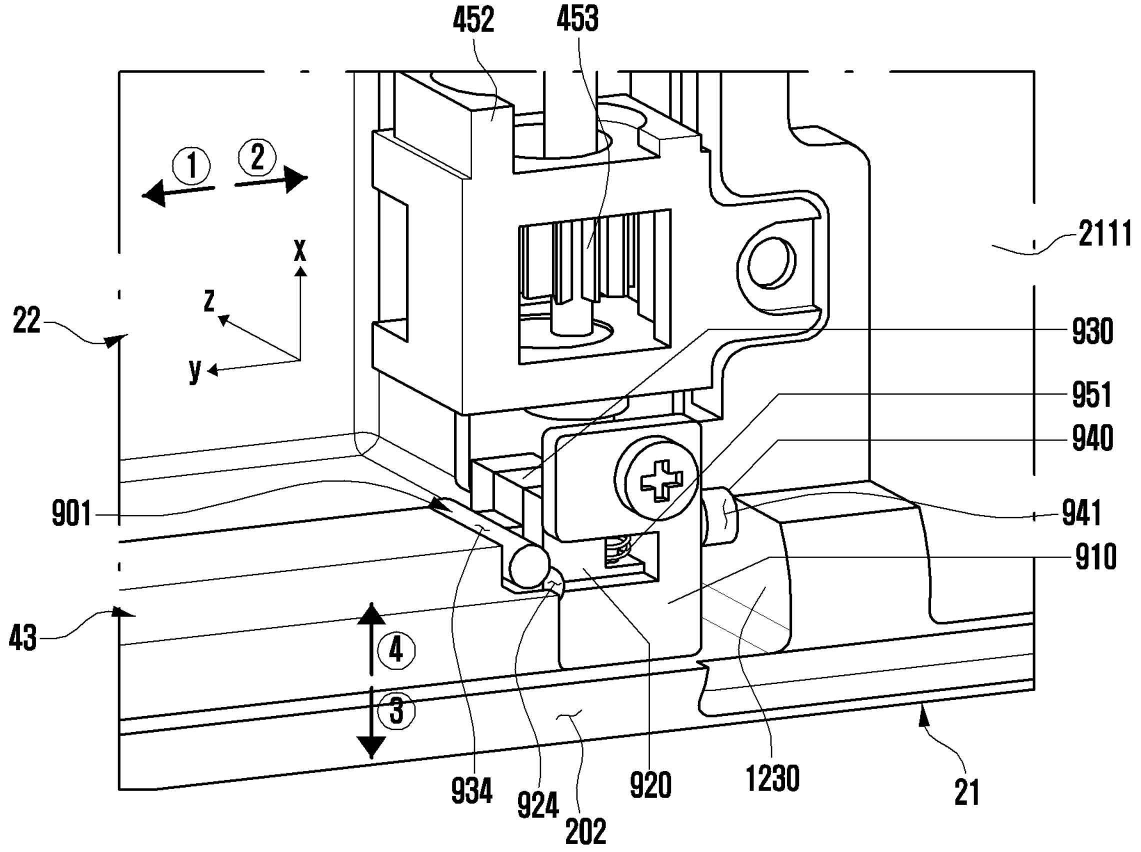
FIG. 17 is a partial perspective view of a slidable electronic device in a closed state according to an embodiment of the disclosure.

FIG. 11 is a view showing a slidable electronic device 2 in an open state according to an embodiment of the disclosure. FIG. 12 is a view showing a slidable electronic device 2 in an additional open state according to an embodiment of the disclosure. FIG. 13 is a view showing a slidable electronic device 2 in a closed state according to an embodiment of the disclosure. FIG. 14 is a perspective view of a first housing 21 according to an embodiment of the disclosure. FIG. 15 is views showing a first hook assembly 901 in an open state of a slidable electronic device 2 according to an embodiment of the disclosure. FIG. 16 is views showing a first hook assembly 901 in an additional open state of a slidable electronic device 2 according to an embodiment of the disclosure. FIG. 17 is a partial perspective view of a slidable electronic device 2 in a closed state according to an embodiment of the disclosure.

Referring to FIGS. 11, 12, and 13, the slidable electronic device 2 may include the first housing 21, the second housing 22, the first guide rail 41, the second guide rail 42, the display assembly 50, the sliding drive device 43, the battery 44, the first printed circuit board 45, the first hook assembly 901, and/or the second hook assembly 902.

According to an embodiment, the first printed circuit board 45, a microphone 3011 (e.g., a microphone corresponding to the microphone hole 301 in FIG. 2), the first camera module 304, the second camera module 305, the third camera module 306, a speaker (or a speaker module) 3021 (e.g., a first speaker corresponding to the first speaker hole 302 in FIG. 2), or a connector (3111) (e.g., a connector corresponding to the connector hole 311 in FIG. 3) may be arranged in the first support part 2111 of the first housing 21.

According to an embodiment, the motor assembly 431, the bracket 432, and the cylindrical gear 433 may be positioned in the second housing 22, and the linear gear 434 may be positioned in the first support part 2111. In some embodiments, the motor assembly 431, the bracket 432, and the cylindrical gear 433 may be arranged in the first support part 2111 of the first housing 21, and the linear gear 434 may be positioned in the second housing 22.

According to an embodiment, the slidable electronic device 2 may include at least one element positioned in the first housing 21, and an electrical connection member 1101 for electrically connecting at least one element positioned in the second housing 22. For example, the electrical connection member 1101 may include a flexible printed circuit board (FPCB). The flexible printed circuit board may be disposed to be bent according to a relative position between the first housing 21 and the second housing 22 in case that the second housing 22 slides with respect to the first housing 21.

According to an embodiment, when seen from above the rear surface of the slidable electronic device 2 (e.g., when seen in the −z-axis direction), the motor assembly 431, the bracket 432, and the cylindrical gear 433 of the sliding drive device 43 may be at least partially positioned between the first hook assembly 901 and the second hook assembly 902.

Referring to FIGS. 11 and 15, in an open state of the slidable electronic device 2, the slider 934 of the lock 930 may be positioned to face and be in contact with an area outside the recess 924 on the guide surface 923 (see FIG. 9) of the hook 920. In an open state of the slidable electronic device 2, a part of the hook 920 may be supported by the elasticity of the first compression spring 951 and the second compression spring 952, and thus may protrude with respect to the block 910 in the third direction ③. The second side wall 202 of the first housing 21 may include a groove 1210 provided to correspond to the first hook assembly 901. Referring to FIG. 14, the groove 1210 may be a recess having a dented shape on the second side wall 202 in the third direction ③. For example, the groove 1210 may be provided in a shape extending in the first direction ① along the movement path of the first hook assembly 901 which moves together with the second housing 22 at the time of mutual sliding between the first housing 21 and the second housing 22. The groove 1210 may include a guide groove 1211 and a hook fastening groove (or a hook fastening part) 1212 connected to the guide groove 1211. The second side wall 202 may extend in the first direction ① from one end connected to the first side wall 201 to the other end thereof, and the hook fastening groove 1212 may be positioned at the other end of the second side wall 202 or positioned to correspond to the vicinity thereof. The guide groove 1211 may be provided to have a depth shallower than the hook fastening groove 1212 in the third direction ③. In case that the slidable electronic device 2 is switched from an open state to a closed state, the hook 920 may become a state of being movable in the third direction ③ due to the elasticity of the first compression spring 951 and the second compression spring 952 and thus be inserted into the guide groove 1211, and the guide groove 1211 may support the hook 920 so as to limit the distance in which the hook 920 is movable with respect to the block 910 in the third direction ③. While the slidable electronic device 2 is switched from a closed state to a state shortly before an open state, the hook 920 may have a position moved on the guide groove 1211 in a state of being inserted into the guide groove 1211. While the slidable electronic device 2 is switched from a closed state to a state shortly before an open state, the guide groove 1211 may prevent the second side wall 202 from interfering with the hook 920 having a position relatively moved with respect to the second side wall 202. While the slidable electronic device 2 is switched from a closed state to a state shortly before an open state, the guide groove 1211 may support the hook 920 in the fourth direction ④ against the elasticity of the first compression spring 951 and the second compression spring 952 so that the relative position, which is provided in the closed state of the slidable electronic device 2, between the block 910 and the hook 920 is maintained. In some embodiments, a surface of the second side wall 202, which is oriented in the fourth direction ④ to correspond to the hook 920, may be provided in a substantially flat-surface shape to replace the guide groove 1211, and in this case, the groove 1210 may be substantially interpreted as a hook fastening groove 1212. In an open state of the slidable electronic device 2, the slider 934 may be positioned to face and be in contact with an area outside the recess 924 on the guide surface 923 (see FIG. 9) of the hook 920, and thus the hook 920 may be placed in a movable state in the third direction ③ by the elasticity of the first compression spring 951 and the second compression spring 952. In an open state of the slidable electronic device 2, a part of the hook 920, which protrudes with respect to the block 910 in the third direction ③, may be inserted into the hook fastening groove 1212. In some embodiments, an opening, to which the hook 920 can be fastened, may also be provided to replace the hook fastening groove 1212. In an open state of the slidable electronic device 2, the first compression spring 951 and the second compression spring 952 may be in a compressed state or a substantially uncompressed state. Since a part of the hook 920, which protrudes with respect to the block 910 in the third direction ③, is inserted into the hook fastening groove 1212, it may be difficult that the second housing 22 moves with respect to the first housing 21 in the second direction ②. Although not illustrated, the third side wall 203 of the first housing 21 may include a groove provided to correspond to the second hook assembly 902 (see FIG. 8). The groove provided on the third side wall 203 may be provided to correspond to the second hook assembly 902 (see FIG. 8) so as to be substantially the same as the groove 1210 corresponding to the first hook assembly 901. In case that external impact (e.g., impact due to the falling of the slidable electronic device 2) is applied to the slidable electronic device 2 in an open state, a force to move the second housing 22 with respect to the first housing 21 in the second direction ② (e.g., the slide-in direction), or a force to move the first housing 21 with respect to the second housing 22 in the first direction ① may be generated. In an open state of the slidable electronic device 2, since a part of the hook 920, which protrudes with respect to the block 910 in the third direction ③, is inserted into the hook fastening groove 1212, it may be difficult that the second housing 22 moves with respect to the first housing 21 in the second direction ②, and it may be difficult that the first housing 21 moves with respect to the second housing 22 in the first direction ①. Even in case that external impact is applied to the slidable electronic device 2 in an open state, external impact may be dispersed or absorbed into the first housing 21 and the second housing 22 through the first hook assembly 901 and the second hook assembly 902. Due to this, it may be possible to reduce stress influence by external impact on a drive element such as a flexible display module 24 and a sliding drive device 43 (e.g., the motor assembly 431) drivingly connected to the flexible display module 24, thereby reducing the possibility of damage thereof.

Referring to FIGS. 12 and 16, in an embodiment, the slidable electronic device 2 may be in an additional open state. The additional open state may be a ready state for the switching when the slidable electronic device 2 is switched from an open state (see FIG. 3) to a closed state (see FIG. 2). The additional open state may be provided in case that the slidable electronic device 2 is switched from an open state to a closed state. The additional open state of the slidable electronic device 2 may be a state in which the second housing 22 is further moved with respect to the first housing 21 in the first direction ① (e.g., the slide-out direction) compared to an open state of the slidable electronic device 2. An open state of the slidable electronic device 2 may be defined or interpreted as a first state in which the second housing 22 is slid out with respect to the first housing 21 by a first distance. The additional open state of the slidable electronic device 2 may be defined or interpreted as a second state in which the second housing 22 is further slid out with respect to the first housing 21 from the first state by a second distance. In case that the slidable electronic device 2 is switched from an open state to the additional open state, the fastening between the hook 920 and the hook fastening groove 1212 may be released, and thus, a state, in which the second housing 22 can slide in with respect to the first housing 21, may be provided. In the additional open state of the slidable electronic device 2, the slider 934 of the lock 930 may be positioned in the recess 924 of the hook 920. In the additional open state of the slidable electronic device 2, the slider 934 may act as an engagement part which prevents the hook 920 from moving in the third direction ③ against the elasticity of the first compression spring 951 and the second compression spring 952. In the additional open state of the slidable electronic device 2, the hook 920 may be positioned relative to the block 910 so as not to be engaged with the hook fastening groove 1212. For example, in the additional open state of the slidable electronic device 2, the hook 920 may not substantially protrude with respect to the block 910 in the third direction ③, or may be positioned so as not to be fastened to the hook fastening groove 1212 even though protruding. In the additional open state of the slidable electronic device 2, the first compression spring 951 and the second compression spring 952 may be in a more compressed state compared to an open state of the slidable electronic device 2. In the additional open state of the slidable electronic device 2, the lock 930 and the shaft 940 may be retreated and then positioned in the second direction ②, compared to an open state of the slidable electronic device 2. In the additional open state of the slidable electronic device 2, the second compression spring 952 may be in a less compressed state or a substantially uncompressed state, compared to an open state of the slidable electronic device 2.

According to an embodiment, a surface of the hook fastening groove 1212 may include a first inner surface 1212*a* and a second inner surface 1212*b*. The second inner surface 1212*b* may be positioned to be spaced apart from the first inner surface 1212*a* in the second direction ②. The second inner surface 1212*b* may be positioned to face the first inner surface 1212*a*. In an open state of the slidable electronic device 2, the first inner surface 1212*a* may interfere so that the hook 920 does not move in the second direction ②. The second inner surface 1212*b* may be provided as an inclination surface. In case that the slidable electronic device 2 is switched from an open state to the additional open state, due to a driving force provided from the sliding drive device 43, the second housing 22, in which the first hook assembly 901 is disposed, may be moved with respect to the first housing 21 in the first direction ① by a designated distance. Due to an interaction between the hook 920 and the inclination surface of the second inner surface 1212*b*, the linear motion, in which the second housing 22 is moved with respect to the first housing 21 in the first direction ①, may be converted into a linear motion in which the hook 920 is moved in the fourth direction ④. The hook 920 may be moved in the fourth direction ④, the lock (930) and the shaft 940 may be retreated in the second direction ② due to the elasticity of the third compression spring 953, and due to this, the slider 934 may be inserted into the recess 924 of the hook 920. In the additional open state of the slidable electronic device 2, the second area ⓑ of the flexible display module 24 may be further withdrawn compared to an open state of the slidable electronic device 2, but the withdrawn amount (e.g., an amount corresponding to about 1 mm to about 2 mm in the first direction ① when seen from above the front surface of the slidable electronic device 2) may be substantially difficult for a user to perceive.

Referring to FIGS. 13 and 17, in case that the slidable electronic device 2 is switched from the additional open state to a closed state (see FIG. 2), due to a driving force provided from the sliding drive device 43, the second housing 22 may be moved with respect to the first housing 21 in the second direction ②. Until the slidable electronic device 2 reaches a closed state from the additional open state, the first hook assembly 901 may be maintained in an operation state which is the same as the additional open state of the slidable electronic device 2.

According to an embodiment, the first housing 21 may provide a support wall (or a support surface) 1230 corresponding to the first end 941 of the shaft 940. The support wall 1230 may become close to the first end 941 of the shaft 940 so as to press the first end 941 in case that the slidable electronic device 2 is switched from an open state to a closed state. For example, the support wall 1230 may extend from the first support part 2111 or the second side wall 202, or be provided by a part included in the first support part 2111 or the second side wall 202. When the slidable electronic device 2 is switched from the additional open state to a closed state, the lock 930 and the shaft 940 may be moved with respect to the block 910 in the first direction ① by a designated distance due to the pressing by the support wall 1230. In case that the slider 934 of the lock 930 is positioned so as not to be aligned with the recess 924 in the outside the recess 924 of the hook 920, the hook 920 may be moved in the third direction ③ by the elasticity of the first compression spring 951 and the second compression spring 952. The hook 920 may be inserted into the guide groove 1211, and the guide groove 1211 may support the hook 920 to limit a distance in which the hook 920 is movable with respect to the block 910 in the third direction ③. The guide groove 1211 may be provided to have a depth shallower than the hook fastening groove 1212 in the third direction ③, and thus the hook 920 may protrude less with respect to the block 910 in the third direction ③, compared to an open state of the slidable electronic device 2. The slider 934 of the lock 930 may be positioned to be supported by an area outside the recess 924 on the guide surface 923 (see FIG. 9) of the hook 920. In a closed state of the slidable electronic device 2, the first compression spring 951 and the second compression spring 952 (see FIGS. 9 and 10) may be compressed less compared to that in the additional open state of the slidable electronic device 2. In a closed state of the slidable electronic device 2, the third compression spring 953 may be more compressed compared to that in the additional open state of the slidable electronic device 2. In a closed state of the slidable electronic device 2, the fastening between the slider 934 of the lock 930 and the recess 924 of the hook 920 may be released. The slider 934 of the lock 930 may be supported by an area outside the recess 924 on the guide surface 923 of the hook 920, and thus when the hook 920 is aligned with the hook fastening groove 1212 in case that the slidable electronic device 2 switches from a closed state to an open state, the hook 920 may be moved in the third direction ③ by the elasticity of the first compression spring 951 and the second compression spring 952 and thus be fastened to the hook fastening groove 1212.

Figure 18:
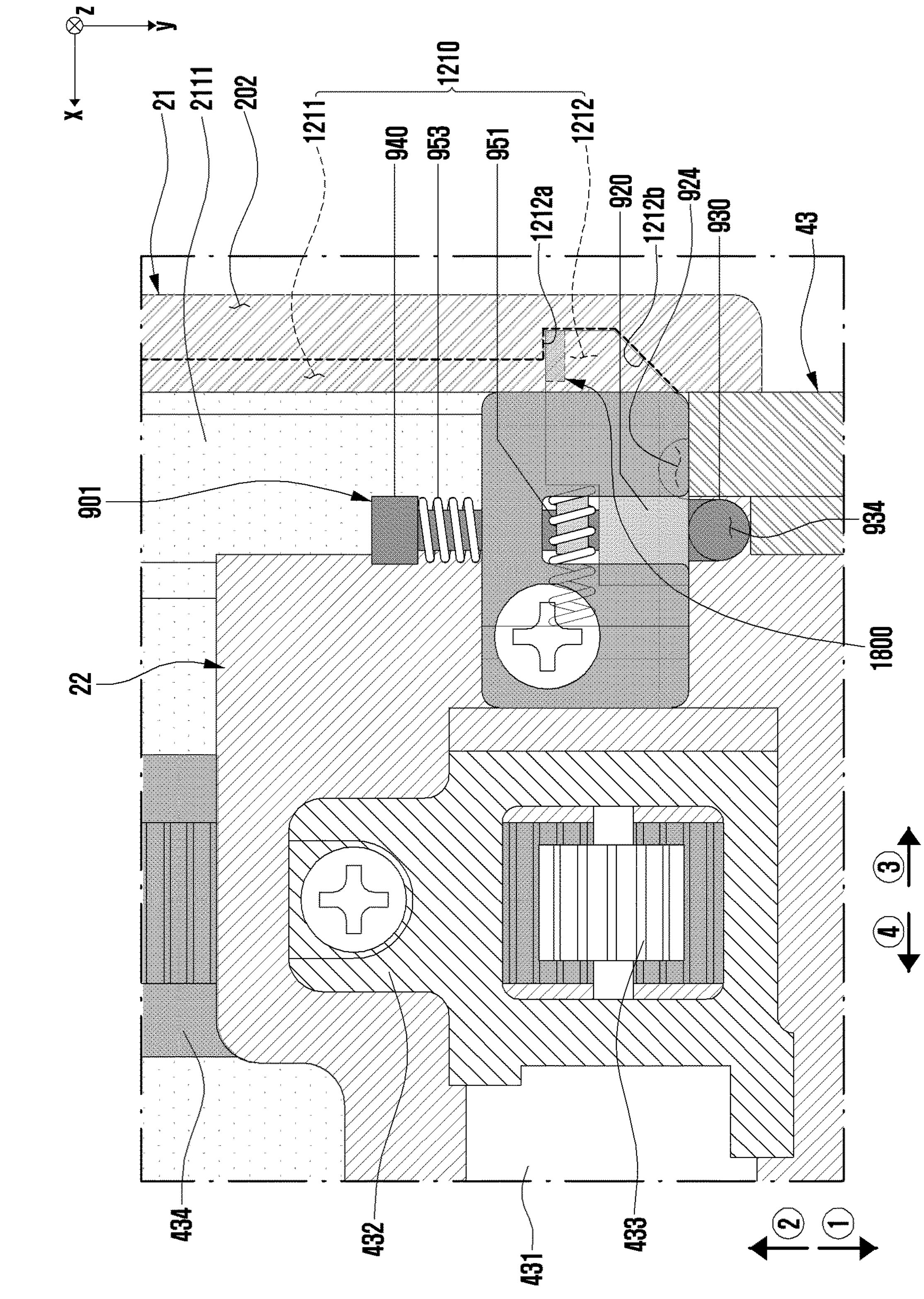
FIG. 18 is a view showing a part of a slidable electronic device in an open state according to various embodiments of the disclosure.

FIG. 18 is a view showing a part of a slidable electronic device 2 in an open state according to various embodiments of the disclosure.

Referring to FIG. 18, in an embodiment, the first hook assembly 901 may further include an impact mitigation structure capable of mitigating or absorbing external impact (e.g., impact due to the falling of the slidable electronic device 2). For example, the impact mitigation structure may include an elastic body (or, an elastic member or a flexible member) 1800 positioned between the hook 920 and the first housing 21. The elastic body 1800 may be at least partially positioned between the hook 920 and a portion of the first housing 21, which has an interference relationship with the hook 920. In an embodiment, the elastic body 1800 may be disposed on (e.g., attached to) the hook 920 to face the first inner surface 1212*a* of the hook fastening groove 1212. In some embodiments, the elastic body 1800 may be disposed in a recess provided on the hook 920. In some embodiments, the elastic body 1800 may be interpreted as a part of the hook 920, and the elastic body 1800, which is a part of hook 920, may be positioned to correspond to a portion (e.g., the first inner surface 1212*a* of the hook fastening groove 1212) of the first housing 21, which has an interference relationship with the hook 920. The elastic body 1800 may include silicone, rubber, sponge, or foam tape, but is not limited thereto, and may include various elastic materials, flexible materials, or buffer materials. The second hook assembly 902 may include an elastic body provided in substantially the same manner as that of the first hook assembly 901. Due to the external impact applied to the slidable electronic device 2 in an open state, in case that there occurs a force to move the second housing 22 with respect to the first housing 21 in the second direction ② (e.g., the slide-in direction), or a force to move the first housing 21 with respect to the second housing 22 in the first direction ①, the elastic body 1800 of the first hook assembly 901 and the elastic body of the second hook assembly 902 may mitigate external impact and the force. The elastic body 1800 of the first hook assembly 901 and the elastic body of the second hook assembly 902 may mitigate the external impact applied in an open state of the slidable electronic device 2 so as to reduce the stress influence by external impact on a drive element such as the flexible display module 24 and the sliding drive device 43 (e.g., the motor assembly 431) drivingly connected to the flexible display module 24.

According to various embodiments, the disclosure is not limited to the illustrated example in which a part of the hook 920, which corresponds to the first inner surface 1212*a* of the hook fastening groove 1212, is implemented as the elastic body 1800, and the entire hook 920 may be implemented as a material (e.g., an elastic member, a flexible member, or a buffer member) capable of mitigating external impact.

According to various embodiments, the elastic body 1800 may be disposed on (e.g., attached to) the first inner surface 1212*a* of the hook fastening groove 1212. In some embodiments, the elastic body 1800 may be interpreted as a part for providing the first inner surface 1212*a* of the first housing 21.

According to various embodiments, the elastic body 1800 may be provided in a form including an elastic structure, such as a spring, capable of buffering or absorbing external impact by using elastic deformation.

Figure 19:
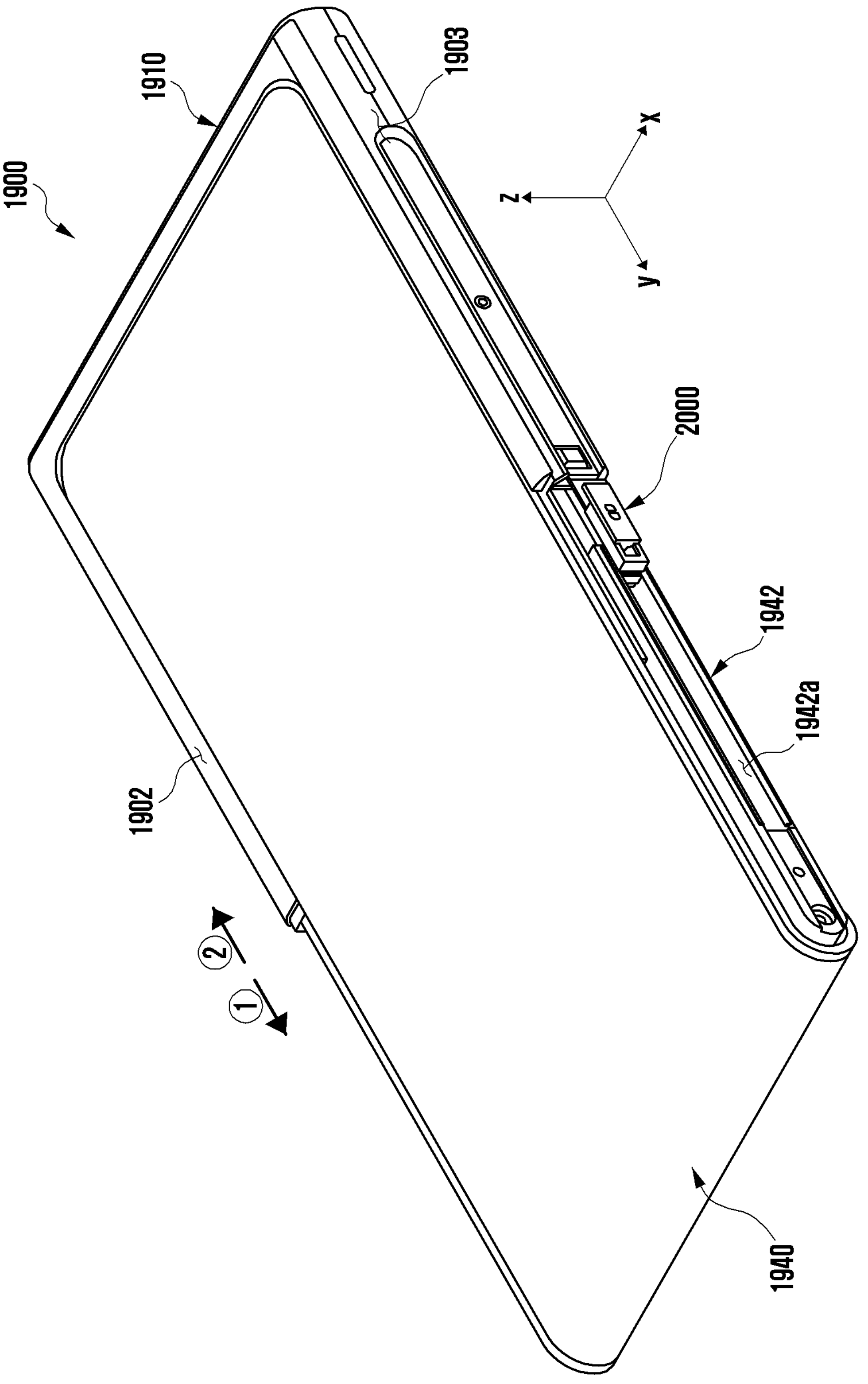
FIG. 19 is a perspective view of a slidable electronic device according to various embodiments of the disclosure.
Figure 20:
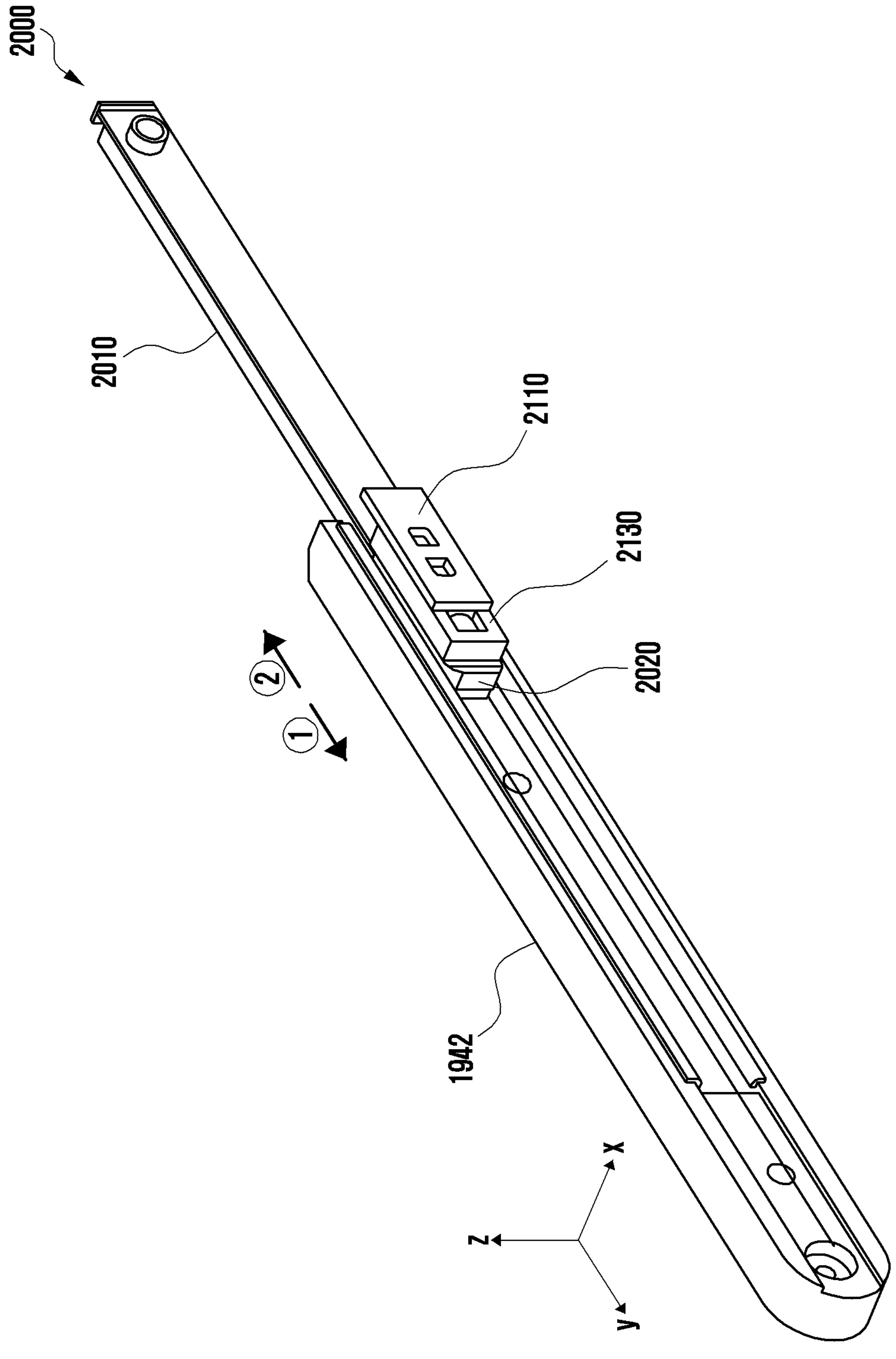
FIG. 20 is a perspective view of a second sliding device included in a slidable electronic device according to various embodiments of the disclosure.
Figure 21:
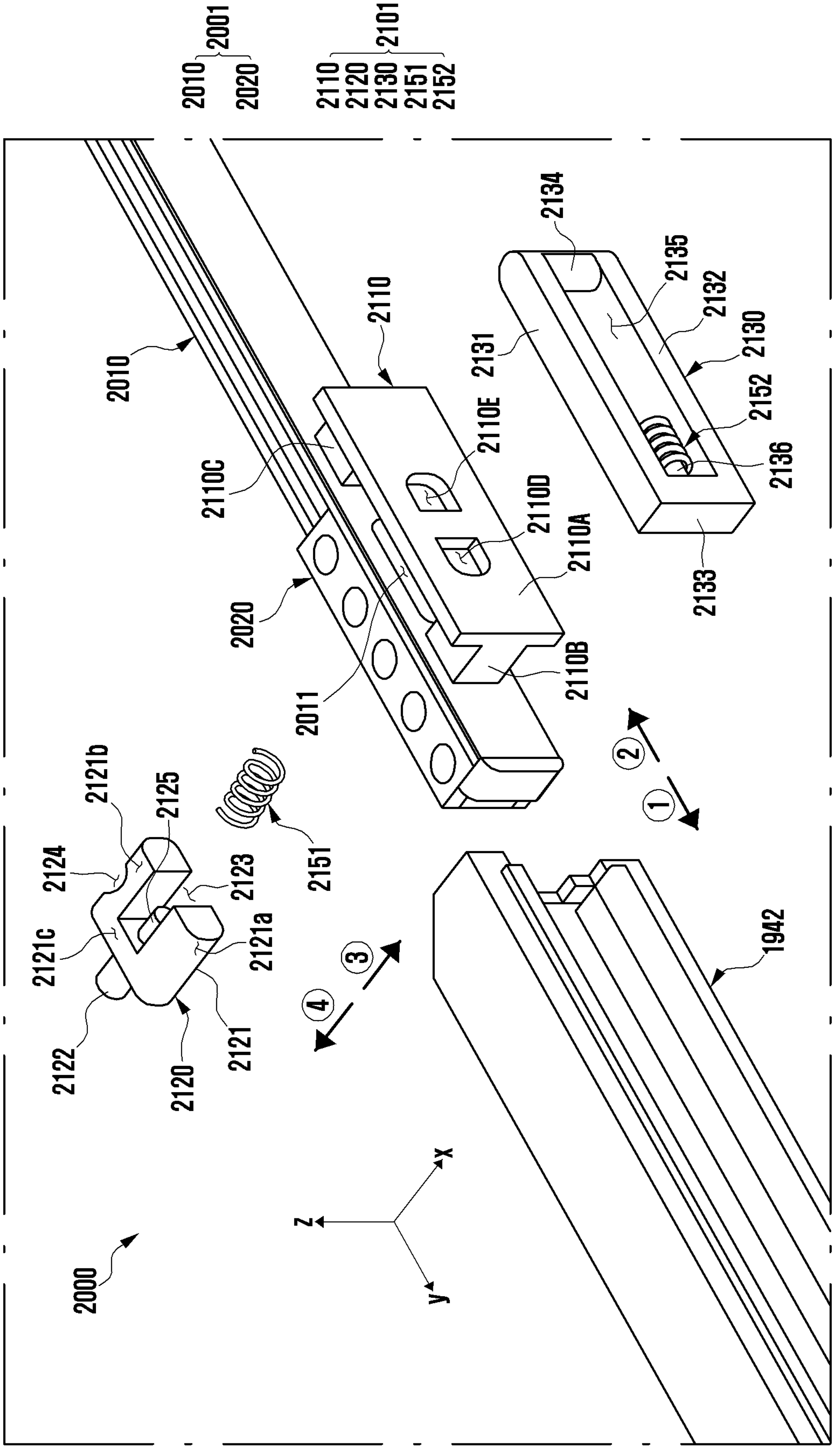
FIG. 21 is an exploded perspective view of a second sliding device according to various embodiments of the disclosure.

FIG. 19 is a perspective view of a slidable electronic device 1900 according to various embodiments of the disclosure. FIG. 20 is a perspective view of a second sliding device 2000 included in a slidable electronic device 1900 according to various embodiments of the disclosure. FIG. 21 is an exploded perspective view of a second sliding device 2000 according to various embodiments of the disclosure.

Referring to FIGS. 19, 20, and 21, a slidable electronic device 1900 may include a first housing 1910 (e.g., the first housing 21 in FIG. 4), a second housing (e.g., the second housing 22 in FIG. 4), a display assembly 1940 (e.g., the display assembly 50 in FIG. 4), a first guide rail (e.g., the first guide rail 41 in FIG. 4), a second guide rail 1942 (e.g., the second guide rail 42 in FIG. 4), a first sliding device, and/or a second sliding device 2000.

According to an embodiment, the first sliding device and the second sliding device 2000 may allow the second housing (e.g., the second housing 22 in FIG. 4) to stably slide with respect to the first housing 1910. The first sliding device may be connected to a second side wall 1902 (e.g., the second side wall 202 in FIG. 4) and the first guide rail (e.g., the first guide rail 41 in FIG. 4). The second sliding device 2000 may be connected to a third side wall 1903 (e.g., the third side wall 203 in FIG. 4) and the second guide rail 1942 (e.g., the second guide rail 42 in FIG. 4). Although not illustrated, the first sliding device may be substantially the same as or similar to the second sliding device 2000 positioned to correspond to the second guide rail 1942. In an embodiment, the second sliding device 2000 may include a rail (or a guide rail) 2010, a first block (or a guide block) 2020, a second block 2110, a hook 2120, a lock 2130, and a first compression spring 2151, and/or a second compression spring 2152.

According to an embodiment, the second sliding device 2000 may include an LM guide 2001 provided by a combination of the rail 2010 and the first block 2020. The LM guide 2001 may connect the first housing 1910 and the second housing so that the first housing 1910 and the second housing slide mutually. Through the LM guide 2001, the second housing may be linearly moved with respect to the first housing 1910 in the first direction ① (e.g., the slide-out direction) or the second direction ② (e.g., the slide-in direction) naturally and smoothly. The rail 2010 may have a bar shape extending in the first direction ① or the second direction ②. The rail 2010 and the first block 2020 may be slidably coupled to each other. The rail 2010 may be coupled to the third side wall 1903 (e.g., the third side wall 203 in FIG. 4) of the first housing 1910. The first block 2020 may be coupled to the second housing or the second guide rail

1942. A bearing may be placed between the rail 2010 and the first block 2020, and the bearing may reduce friction between the rail 2010 and the first block 2020. For example, the bearing may include multiple bearing balls and a retainer. The second guide rail 1942 may include a recess 1942*a* provided to correspond to the rail 2010. In case that the second housing coupled to the first block 2020 slides out or slides in with respect to the first housing 1910 coupled the rail 2010, the recess 1942*a* may prevent the second guide rail 1942 and the rail 2010 from interfering with each other. According to a relative position between the first housing 1910 and the second housing, the degree, to which the rail 2010 is positioned in the recess 1942*a* of the second guide rail 1942, may be changed.

According to an embodiment, the second sliding device 2000 may include a hook assembly 2101 provided by a combination of the second block 2110, the hook 2120, the lock 2130, the first compression spring 2151, and the second compression spring 2152. The hook assembly 2101 may reduce stress influence in which external impact applied to the slidable electronic device 1900 in an open state (see FIG. 3) affects the display assembly 1940 and other elements (e.g., the sliding drive device 43 in FIG. 4) drivingly connected to the display assembly 1940.

According to an embodiment, the second block 2110 of the hook assembly 2101 may be coupled to the rail 2010 of the LM guide 2001 by using various manners such as screw fastening or bonding. In some embodiments, the rail 2010 and the second block 2110 may be integrally formed and may include the same material (e.g., metal). The second block 2110 may be a support (or a base) in which the hook 2120, the lock 2130, the first compression spring 2151, and the second compression spring 2152 are arranged. The hook 2120 may be disposed in the second block 2110 to be movable (e.g., a translational motion) with respect to the second block 2110 in the third direction ③ or the fourth direction ④ opposite to the third direction ③. The third direction ③ may be a direction perpendicular to a direction in which the front surface of the slidable electronic device 1900 is oriented, and perpendicular to the first direction ①, and may be a direction from the third side wall 1903 to the second side wall 1902. The first compression spring 2151 positioned between the second block 2110 and the hook 2120 may elastically support the hook 2120 with respect to the second block 2110, and in case that the hook 2120 moves, may elastically support the movement thereof. The lock 2130 may be disposed in the second block 2110 to be movable (e.g., a translational motion) with respect to the second block 2110 in the first direction ① or the second direction ② opposite to the first direction ①. The second compression spring 2152 may elastically support the lock 2130 with respect to the second block 2110, and may elastically support a movement of the lock 2130. A compression spring for the hook 2120, or a compression spring for the lock 2130 is not limited to the illustrated example, and may be provided in various numbers. Various other elastic members may be provided to replace a compression spring for the hook 2120 or a compression spring for the lock 2130.

According to an embodiment, the second block 2110 may include a plate 2110A positioned to be spaced apart from the rail 2010, and a first extension part 2110B and a second extension part 2110C which protrude from a surface of the plate 2110A, which faces the rail 2010, and are connected to the rail 2010. The first extension part 2110B may be positioned to be spaced apart from the second extension part 2110C in the first direction ①. The second block 2110 may be provided as an integral member or structure including the plate 2110A, the first extension part 2110B, and the second extension part 2110C. The rail 2010 may extend in the first direction ① from one end connected to the third side wall 1903 of the first housing 1910 to the other end thereof, and the second block 2110 may be positioned at the other end of the rail 2010. The lock 2130 may be provided in a rectangular annular shape, and may be positioned through the first extension part 2110B of the second block 2110. The lock 2130 having a rectangular annular shape may include a first portion 2131, a second portion 2132, a third portion 2133, and a slider 2134. The first portion 2131 may be spaced apart from the second portion 2132 in a direction (e.g., the +z-axis direction) in which the front surface of the slidable electronic device 1900 is oriented. The first portion 2131 and the second portion 2132 may extend straight in the first direction ①, and may be parallel to each other. The third portion 2133 may connect one end of the first portion 2131 and one end of the second portion 2132. The slider 2134 may connect the other end of the first portion 2131 and the other end of the second portion 2132. The third portion 2133 may be spaced apart from the slider 2134 in the first direction ①. The third portion 2133 and the slider 2134 may extend straight in a direction in which the front surface of the slidable electronic device 1900 is oriented, and may be parallel to each other. The lock 2130 may provide an opening 2135 by a combination of the first portion 2131, the second portion 2132, the third portion 2133, and the slider 2134, and may include a second protrusion 2136 which extends from the third portion 2133 in the second direction ② and is positioned in the opening 2135. The second compression spring 2152 may be fitted around the second protrusion 2136 and be positioned between the third portion 2133 and the slider 2134. The second protrusion 2136 may prevent the second compression spring 2152 from being separated from the position on the lock 2130. The second compression spring 2152 may be positioned between the third portion 2133 of the lock 2130 and the first extension part 2110B of the second block 2110. One end of the second compression spring 2152 may be supported by the third portion 2133 of the lock 2130, and the other end of the second compression spring 2152 may be supported by the first extension part 2110B of the second block 2110.

According to an embodiment, the hook 2120 may be positioned in the opening 2011 provided through the rail 2010. The hook 2120 may include a pin support part 2121 which is at least partially supported by a surface of the opening 2011 and provided to be movable in the third direction ③ or the fourth direction ④ The hook 2120 may include a pin 2122 protruding and extending from one surface of the pin support part 2121, which is oriented in the fourth direction ④. The hook 2120 may include a notch-shaped opening 2123 provided in a dented shape on one surface oriented in the third direction ③. The first compression spring 2151 may be positioned in the opening 2123. The hook 2120 may include a first protrusion 2125 extending from one surface of the opening 2123, which is oriented in the third direction ③. The first compression spring 2151 may be fitted around the first protrusion 2125 positioned in the opening 2123. The first protrusion 2125 may prevent the first compression spring 2151 from being separated from the position on the hook 2120. The pin support part 2121 of hook 2120 may include a first portion 2121*a* and a second portion 2121*b* which are positioned on both sides while having the notch-shaped opening 2123 interposed therebetween, and a third portion 2121*c* to or from which the pin 2122 is connected or extends. The first portion 2121*a* may extend straight from one end of the third portion 2121_c_ in the third direction ③, and the second portion 2121_b_ may extend straight from the other end of the third portion 2121_c_ in the third direction ③. The first portion 2121_a_ and the second portion 2121_b_ may be parallel to each other, and may be substantially perpendicular to the third portion 2121_c_. The plate 2110A of the second block 2110 may include an opening 2110D corresponding to the first portion 2121_a_ and an opening 2110E corresponding to the second portion 2121_b_, so as not to interfere with a movement of the hook 2120. One end of the first compression spring 2151 may be supported by the hook 2120, and the other end of the first compression spring 2151 may be supported by an area between the two openings 2110D and 2110E of the plate 2110A of the second block 2110. The first block 2020 may be positioned so as not to interfere with a movement of the hook 2120, or may provide an opening (not shown).

According to an embodiment, the pin support part 2121 of the hook 2120 may include a recess 2124 provided in the first portion 2121_a_. The recess 2124 may be provided in a dented shape in the second direction ②, and the recess 2124 may include a concave curved-surface in the first direction ①. In case that the slider 2134 of the lock 2130 is positioned in the recess 2124 of the hook 2120, the slider 2134 may act as an engagement part which prevents the hook 2120 from moving against the elasticity of the first compression spring 2151 in the third direction ③.

Figure 22:
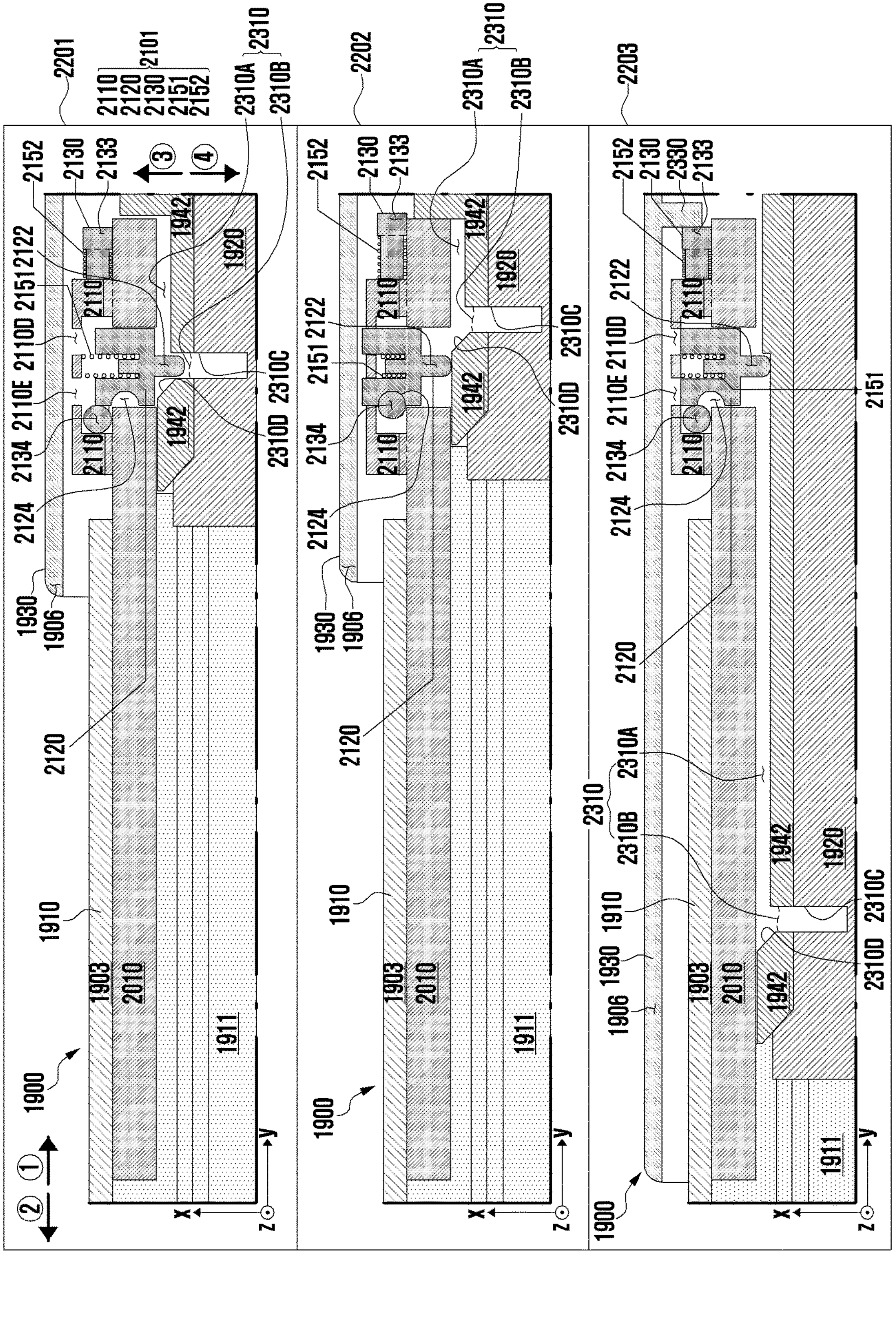
FIG. 22 is cross-sectional views showing various states of a slidable electronic device according to various embodiments of the disclosure.

FIG. 22 are cross-sectional views showing various states of a slidable electronic device 1900 according to various embodiments of the disclosure.

Referring to FIG. 22, reference numeral "2201" is a cross-sectional view of the slidable electronic device 1900 in an open state. Reference numeral 2202 is a cross-sectional view of the slidable electronic device 1900 in a half open state. Reference numeral 2203 is a cross-sectional view of the slidable electronic device 1900 in a closed state.

According to an embodiment, the slidable electronic device 1900 may include a first housing 1910 (e.g., the first housing 21 in FIG. 4), a second housing 1920 (e.g., the second housing 22 in FIG. 4), a third housing 1930 (e.g., the third housing 23 in FIG. 4), a support part 1911 (e.g., the first support part 2111 in FIG. 4), the second guide rail 1942, the rail 2010, and/or the hook assembly 2101.

According to an embodiment, the rail 2010 may be included in an LM guide, and may be disposed on the third side wall 1903 of the first housing 1910. The rail 2010 may be slidably connected to the first block 2020 (see FIG. 21) disposed in (or coupled to) the second housing 1920 or the second guide rail 1942 (e.g., the second guide rail 42 in FIG. 4). The hook assembly 2101 may be positioned in the rail 2010.

In an open state (see reference numeral "2201") of the slidable electronic device 1900, the slider 2134 of the lock 2130 may be positioned to face and be in contact with an area outside the recess 2124 of the hook 2120. In an open state of the slidable electronic device 1900, the hook 2120 may be supported by the elasticity of the first compression spring 2151, and thus may protrude with respect to the rail 2010 in the fourth direction ④. The second guide rail 1942 may include a groove 2310 provided to correspond to the hook assembly 2101. The groove 2310 may include a guide groove 2310A and a hook fastening groove (or a hook fastening part) 2312 connected to the guide groove 2310A. For example, the groove 2310 may be provided as a recess having a dented shape on one surface of the second guide rail 1942 (e.g., the second guide rail 42 in FIG. 4), which faces a sixth side wall 1906 (e.g., the sixth side wall 206 in FIG. 4) of the third housing 1930. For example, the groove 2310 may be provided in a shape extending in the first direction ① (or the second direction ② along the movement path of the hook assembly 2101 which moves together with the first housing 1910 at the time of mutual sliding between the first housing 1910 and the second housing 1920. The third side wall 1903 of the first housing 1910 may extend in the first direction ① from one end connected to a first side wall (e.g., the first side wall 201 in FIG. 4) to the other end thereof, and the hook fastening groove 2310B may be positioned at the other end of the third side wall 1903 or positioned to correspond to the vicinity thereof. The guide groove 2310A may be provided to have a depth shallower than the hook fastening groove 2310B in the third direction ③. In case that the slidable electronic device 1900 is switched from an open state to a closed state (see reference numeral "2203), the pin 2122 of the hook 2120 may become a state of being movable in the fourth direction ④ due to the elasticity of the first compression spring 2151 and thus be inserted into the guide groove 2310A, and the guide groove 2310A may support the pin 2122 of the hook 2120 so as to limit the distance in which the hook 2120 is movable with respect to the second block 2110 in the fourth direction ④. While the slidable electronic device 1900 is switched from a closed state to a state shortly before an open state, the pin 2122 of the hook 2120 may have a position moved on the guide groove 2310A in a state of being inserted into the guide groove 2310A. While the slidable electronic device 2 is switched from a closed state to a state shortly before an open state, the guide groove 2310A may prevent the second guide rail 1942 from interfering with the pin 2122 of the hook 2120 having a position relatively moved with respect to the second guide rail 1942. While the slidable electronic device 1900 is switched from a closed state to a state shortly before an open state, the guide groove 2310A may support the hook 2120 in the third direction ③ against the elasticity of the first compression spring 2151 so that the relative position, which is provided in the closed state of the slidable electronic device 1900, between the second block 2110 and the hook 2120 is maintained. In some embodiments, a surface of the second guide rail 1942, which is oriented in the third direction ③ to correspond to the pin 2122 of the hook 2120, may be provided in a substantially flat-surface shape to replace the guide groove 2310A, and in this case, the groove 2310 may be substantially interpreted as a hook fastening groove 2310B. In some embodiments, an opening, to which the pin 2122 of the hook 2120 can be fastened, may also be provided to replace the hook fastening groove 2310B. In some embodiments, the disclosure is not limited to the illustrated example, the groove 2310 may be provided by the second housing 1920. In an open state of the slidable electronic device 1900, the slider 2134 may be positioned to face and be in contact with an area outside the recess 2124 of the hook 2120, and thus the hook 2120 may be placed in a movable state in the fourth direction ④ by the elasticity of the first compression spring 2151. In an open state of the slidable electronic device 1900, the pin 2122 of the hook 2120, which protrudes with respect to the second block 2110 in the fourth direction ④, may be inserted into the hook fastening groove 2310B. In an open state of the slidable electronic device 1900, the first compression spring 2151 may be in a compressed state or a substantially uncompressed state. Since the pin 2122 of the hook 2120, which protrudes with respect to the second block 2110 in the fourth direction ④, is inserted into the hook fastening groove 2310B, it may be difficult that the second housing 1920 moves with respect to the first housing 1910 in the second direction ②. Although not illustrated, the slidable electronic device 1900 may include a first sliding device for connecting a second side wall 1902 (see FIG. 19) and a first guide rail (e.g., the first guide rail 41 in FIG. 4), and the first sliding device may include a hook assembly provided substantially the same thereas or similar thereto. In case that external impact is applied to the slidable electronic device 1900 in an open state, a force to move the second housing 1920 with respect to the first housing 1910 in the second direction ② (e.g., the slide-in direction), or a force to move the first housing 1910 with respect to the second housing 1920 in the first direction ① may be generated. In an open state of the slidable electronic device 1900, since the pin 2122 of the hook 2120 is inserted into the hook fastening groove 2310B, and thus it may be difficult that the second housing 1920 moves with respect to the first housing 1910 in the second direction ②, and it may be difficult that the first housing 1910 moves with respect to the second housing 1920 in the first direction ①. Even in case that external impact is applied to the slidable electronic device 1900 in an open state, external impact may be dispersed or absorbed into the first housing 1910 and the second housing 1920 through the hook assembly 2101. Due to this, it may be possible to reduce stress influence by external impact on a drive element such as a flexible display module (e.g., the flexible display module 24 in FIG. 4) and a sliding drive device (e.g., the sliding drive device 43 in FIG. 4) drivingly connected to the flexible display module, thereby reducing the possibility of damage thereof.

According to various embodiments, the hook assembly 2201 may further include an impact mitigation structure capable of mitigating or absorbing external impact (e.g., impact due to the falling of the slidable electronic device 1900). For example, the impact mitigation structure may include an elastic body (or, an elastic member or a flexible member) (not shown) positioned between the pin 2122 of the hook 2120 and the second guide rail 1942. In an embodiment, the elastic body may be disposed on (e.g., attached to) the pin 2122 of the hook 2120 to face a first inner surface 2310C of the hook fastening groove 2310B. In some embodiments, the elastic body may be disposed in a recess provided on the pin 2122 of the hook 2120. In some embodiments, the elastic body may be interpreted as a part of the pin 2122 of the hook 2120, and the elastic body, which is a part of the pin 2122, may be positioned to correspond to a portion (e.g., the first inner surface 2310C of the hook fastening groove 2310B) of the second guide rail 1942, which has an interference relationship with the pin 2122. The elastic body may include silicone, rubber, or foam tape, but is not limited thereto, and may include various elastic materials, flexible materials, or buffer materials. Due to external impact applied to the slidable electronic device 1900 in an open state, in case that a force to move the second housing 1920 with respect to the first housing 1910 in the second direction ② (e.g., the slide-in direction) or a force to move the first housing 1910 with respect to the second housing 1920 in the first direction ① is generated, the elastic body may mitigate the external impact and the force.

According to various embodiments, the disclosure is not limited to the example in which a part of the pin 2122 of the hook 2120, which corresponds to the first inner surface 2310C of the hook fastening groove 2310B, is implemented as an elastic body, and the entire pin 2122 may be implemented as a material (e.g., an elastic member, a flexible member, or a buffer member) capable of mitigating external impact.

According to various embodiments, the elastic body may be disposed on (e.g., attached to) the first inner surface 2310C of the hook fastening groove 2310B. In some embodiments, the elastic body may be interpreted as a part for providing the first inner surface 2310C of the second guide rail 1942.

According to various embodiments, the elastic body 1800 may be provided in a form including an elastic structure, such as a spring, capable of buffering or absorbing external impact by using elastic deformation.

According to an embodiment, the slidable electronic device 1900 may be in an additional open state (see reference numeral "2202"). The additional open state may be a ready state for the switching when the slidable electronic device 1900 is switched from an open state (see FIG. 3) to a closed state (see reference numeral "2203"). The additional open state may be provided in case that the slidable electronic device 1900 is switched from an open state to a closed state. The additional open state of the slidable electronic device 1900 may be a state in which the second housing 1920 is further moved with respect to the first housing 1910 in the first direction ① (e.g., the slide-out direction) compared to an open state of the slidable electronic device 1900. In case that the slidable electronic device 1900 is switched from an open state to the additional open state, the fastening between the pin 2122 of the hook 2120 and the hook fastening groove 2310B may be released, and thus, a state, in which the second housing 1920 can slide in with respect to the first housing 1910, may be provided. In the additional open state of the slidable electronic device 1900, the slider 2134 of the lock 2130 may be positioned in the recess 2124 of the hook 2120. In the additional open state of the slidable electronic device 1900, the slider 2134 may act as an engagement part which prevents the hook 2120 from moving in the fourth direction ④ against the elasticity of the first compression spring 2151. In the additional open state of the slidable electronic device 1900, the pin 2122 of the hook 2120 may be positioned relative to the second block 2110 so as not to be engaged with the hook fastening groove 2310B. For example, in the additional open state of the slidable electronic device 1900, the pin 2122 of hook 2120 may not substantially protrude with respect to the second block 2110 in the fourth direction ④, or may be positioned so as not to be fastened to the hook fastening groove 2310B even though protruding. In the additional open state of the slidable electronic device 1900, the first compression spring 2151 may be in a more compressed state, compared to an open state of the slidable electronic device 1900. In the additional open state of the slidable electronic device 1900, the lock 2130 may be retreated and then positioned in the first direction ①, compared to an open state of the slidable electronic device 1900. In the additional open state of the slidable electronic device 1900, the second compression spring 2152 may be in a less compressed state or a substantially uncompressed state, compared to an open state of the slidable electronic device 1900.

According to an embodiment, a surface of the hook fastening groove 2310B may include the first inner surface 2310C and a second inner surface 2310D. The second inner surface 2310D may be positioned to be spaced apart from the first inner surface 2310C in the second direction ②. The second inner surface 2310D may be positioned to face the first inner surface 2310C. In an open state of the slidable electronic device 1900, the first inner surface 2310C may interfere so that the pin 2122 of the hook 2120 does not move in the first direction ①. The second inner surface 2310D may be provided as an inclination surface. In case that the slidable electronic device 1900 is switched from an open state to the additional open state, due to a driving force provided from a sliding drive device (e.g., the sliding drive device 43 in FIG. 4), the second housing 1920 may be moved with respect to the first housing 1910 coupled to the hook assembly 2101 in the first direction ① by a designated distance. Due to an interaction between the pin 2122 of the hook 2120 and an inclination surface of the second inner surface 2310D, the linear motion, in which the second housing 1920 is moved with respect to the first housing 1910 in the first direction ①, may be converted into a linear motion in which the hook 2120 is moved in the third direction ③. The hook 2120 may be moved in the third direction ③, the lock 2130 may be retreated in the first direction ① due to the elasticity of the second compression spring 2152, and due to this, the slider 2134 may be inserted into the recess 2124 of the hook 2120. In the additional open state of the slidable electronic device 1900, the second area ⓑ (see FIG. 4) of the flexible display module may be further withdrawn than an open state of the slidable electronic device 1900, but the withdrawn amount (e.g., an amount corresponding to about 1 mm to about 2 mm in the first direction ① when seen from above the front surface of the slidable electronic device 1900) may be substantially difficult for a user to perceive.

According to an embodiment, in case that the slidable electronic device 1900 is switched from the additional open state to a closed state, due to a driving force provided from the sliding drive device (e.g., the sliding drive device 43 in FIG. 4), the second housing 1920 may be moved with respect to the first housing 1910 in the second direction ②. Until the slidable electronic device 1900 reaches a closed state from the additional open state, the hook assembly 2101 may be maintained in an operation state which is the same as the additional open state of the slidable electronic device 1900.

According to an embodiment, the third housing 1930 (e.g., the third housing 23 in FIG. 4) may provide a support wall (or a support surface) 2330 corresponding to the third portion 2133 of the lock 2130. The support wall 2330 may become close to the third portion 2133 of the lock 2130 so as to press the lock 2130 in case that the slidable electronic device 1900 is switched from the additional open state to a closed state. When the slidable electronic device 1900 is switched from the additional open state to a closed state, the lock 2130 may be moved with respect to the second block 2110 in the second direction ② by a designated distance due to the pressing by the support wall 2330. In case that the slider 2134 of the lock 2130 is positioned so as not to be aligned with the recess 2124 in the outside the recess 2124 of the hook 2120, the hook 2120 may be moved in the fourth direction ④ by the elasticity of the first compression spring 2151. The pin 2122 of the hook 2120 may be inserted into the guide groove 2310A, and the guide groove 2310A may support the hook 2120 to limit a distance in which the hook 2120 is movable with respect to the second block 2110 in the fourth direction ④. The guide groove 2310A may be provided to have a depth shallower than the hook fastening groove 2310B in the fourth direction ④, and thus the pin 2122 of the hook 2120 may protrude less with respect to the second block 2110 in the fourth direction ④, compared to an open state of the slidable electronic device 1900. The slider 2134 of the lock 2130 may be positioned to be supported by an area outside the recess 2124 of the hook 2120. In a closed state of the slidable electronic device 1900, the first compression spring 2151 may be compressed less compared to that in the additional open state of the slidable electronic device 1900. In a closed state of the slidable electronic device 1900, the second compression spring 2152 may be compressed more compared to that in the additional open state of the slidable electronic device 1900. In a closed state of the slidable electronic device 1900, the fastening between the slider 2134 of the lock 2130 and the recess 2124 of the hook 2120 may be released. The slider 2134 of the lock 2130 may be supported by an area outside the recess 2124 of the hook 2120, and thus when the hook 2120 is aligned with the hook fastening groove 2310B in case that the slidable electronic device 1900 switches from a closed state to an open state, the hook 2120 may be moved in the fourth direction ④ by the elasticity of the first compression spring 2151 so that the pin 2122 of the hook 2120 is fastened to the hook fastening groove 2310B.

According to an example embodiment of the disclosure, a slidable electronic device (e.g., the slidable electronic device 2) may include a flexible display module (e.g., the flexible display module 24). The slidable electronic device may include a first housing (e.g., the first housing 21) in which a first area (e.g., the first area ⓐ) of the flexible display module is disposed. The slidable electronic device may include a second housing (e.g., the second housing 22) configured to be slidable with respect to the first housing. The second housing may be configured to support the second area (e.g., the second area ⓑ) of the flexible display module. The slidable electronic device may include a hook assembly (e.g., the first hook assembly 901) positioned in the second housing. The hook assembly may include a block (e.g., the block 910) disposed in the second housing. The hook assembly may include a hook (e.g., the hook 920) positioned in the block so as to be linearly movable with respect to the block. The hook assembly may include a lock (e.g., the lock 930) positioned in the block so as to be linearly movable with respect to the block in a direction perpendicular to the movement direction of the hook with respect to the hook. In a first state where the second housing is slid out with respect to the first housing by a first distance, the hook may be inserted into a hook fastening groove (e.g., the hook fastening groove 1212) provided on the first housing. In a second state where the second housing is further slid out with respect to the first housing by a second distance in the first state, the hook may be separated from the hook fastening groove, and the lock may be fastened to a recess (e.g., the recess 924) provided on the hook so as to fix the position of the hook.

According to an example embodiment of the disclosure, in a third state where the second housing (e.g., the second housing 22) is slid in with respect to the first housing (e.g., the first housing 22), the lock (e.g., the lock 930) may be pressed by the first housing and thus separated from the recess (e.g., the recess 924). In the third state, the hook (e.g., the hook 920) may be positioned at a position further moved with respect to the block (e.g., the block 910) than the second state.

According to an example embodiment of the disclosure, the lock (e.g., the lock 930) may be positioned in the block (e.g., the block 910) to be linearly movable with respect to the block in the same direction as the direction in which the second housing (e.g., the second housing 22) slides with respect to the first housing (e.g., the first housing 21). The hook (e.g., the hook 920) may be positioned in the block to be movable with respect to the block in a direction perpendicular to the direction in which the second housing slides with respect to the first housing.

According to an example embodiment of the disclosure, the hook fastening groove (e.g., the hook fastening groove 1212) may include a first inner surface (e.g., the first inner surface 1212*a*) and a second inner surface (e.g., the second inner surface 1212*b*) positioned opposite to the first inner surface. The first inner surface may be configured to interfere with the hook (e.g., the hook 920) inserted into the hook fastening groove so that the second housing (e.g., the second housing 22) does not move in a direction in which the second housing slides in with respect to the first housing (e.g., the first housing 21) in the first state. The hook may be linearly moved with respect to the block (e.g., the block 910) and then positioned, due to an interaction between the hook and an inclination surface provided by the second inner surface when being switched from the first state to the second state.

According to an example embodiment of the disclosure, an elastic body (e.g., the elastic body 1800) disposed on the hook (e.g., the hook 920) or the first inner surface (e.g., the first inner surface 1212*a*) may be included therein. The elastic body may be positioned between the hook and the first inner surface in the first state.

According to an example embodiment of the disclosure, the first housing (e.g., the first housing 21) may include a side wall (e.g., the second side wall 202) extending in a direction in which the second housing (e.g., the second housing 22) slides out with respect to the first housing from a first end to a second end thereof. The hook assembly (e.g., the hook assembly 901) may be positioned to correspond to the side wall, and the side wall may be configured to provide the hook fastening groove (e.g., the hook fastening groove 1212).

According to an example embodiment of the disclosure, a motor (e.g., the motor assembly 431) configured to provide power for sliding the second housing (e.g., the second housing 22) with respect to the first housing (e.g., the first housing 21) may be included therein. The motor may be positioned in the second housing. The first housing may include a side wall (e.g., the second side wall 202) extending in a direction in which the second housing slides out with respect to the first housing from a first end to a second end thereof. The hook assembly (e.g., the hook assembly 901) may be positioned between the motor and the side wall to correspond to the side wall, and the side wall may be configured to provide the hook fastening groove (e.g., the hook fastening groove 1212).

According to an example embodiment of the disclosure, the slidable electronic device may further include at least one compression spring (e.g., the first compression spring 951 and/or the second compression spring 952) positioned between the block (e.g., the block 910) and the hook (e.g., the hook 920).

According to an example embodiment of the disclosure, the slidable electronic device may further include at least one compression spring (e.g., the third compression spring 953) positioned between the block (e.g., the block 910) and the lock (e.g., the lock 930).

According to an example embodiment of the disclosure, the slidable electronic device may further include a multi-bar (e.g., the display support structure 2420) disposed on the rear surface of the second area (e.g., the second area ⓑ of the flexible display module (e.g., the flexible display module 24). The slidable electronic device may further include a first guide rail (e.g., the first guide rail 41) disposed at one side of the second housing (e.g., the second housing 22). One side part of the multi-bar may be inserted into the first guide rail. The slidable electronic device may further include a second guide rail (e.g., the second guide rail 42) disposed at the other side of the second housing. The other side part of the multi-bar may be inserted into the second guide rail.

According to an example embodiment of the disclosure, the slidable electronic device may further include a third housing (e.g., the third housing 23) configured to accommodate the second housing (e.g., the second housing 22) and connected to the second housing. When the second housing slides in with respect to the first housing (e.g., the first housing 21), at least a part of the second area (e.g., the second area ⓑ) of the flexible display module (e.g., the flexible display module 24) may be inserted into a space between the second housing and the third housing.

According to an example embodiment of the disclosure, a slidable electronic device (e.g., the slidable electronic device 1900) may include a flexible display module (e.g., the flexible display module 24). The slidable electronic device may include a first housing (e.g., the first housing 1910) in which a first area (e.g., the first area ⓐ) of the flexible display module is disposed. The slidable electronic device may include a second housing (e.g., the second housing 1920) configured to be slidable with respect to the first housing. The second housing may be configured to support a second area (e.g., the second area ⓑ) of the flexible display module. The slidable electronic device may include a third housing (e.g., the third housing 1930). The third housing configured to accommodate the second housing and be coupled to the second housing. The slidable electronic device may include a hook assembly (e.g., the hook assembly 2101) connected to the first housing. The hook assembly may include a block (e.g., the second block 2110) disposed in the second housing. The hook assembly may include a hook (e.g., the hook 2120) positioned in the block so as to be linearly movable with respect to the block. The hook assembly may include a lock (e.g., the lock 2130) positioned in the block so as to be linearly movable in a direction perpendicular to the movement direction of the hook with respect to the block. In a first state where the second housing is slid out with respect to the first housing by a first distance, the hook may be inserted into a hook fastening groove (e.g., the hook fastening groove 2310B) provided on the second housing or a member positioned between the second housing and the third housing. In a second state where the second housing is further slid out with respect to the first housing by a second distance in the first state, the hook may be separated from the hook fastening groove, and the lock may be fastened to a recess (e.g., the recess 2124) provided on the hook so as to fix the position of the hook.

According to an example embodiment of the disclosure, in a third state where the second housing (e.g., the second housing 1920) is slid in with respect to the first housing (e.g., the first housing 1910), the lock (e.g., the lock 2130) may be pressed by the third housing (e.g., the third housing 1930) and thus separated from the recess (e.g., the recess 2124). In the third state, the hook (e.g., the hook 2120) may be positioned at a position further moved with respect to the block (e.g., the second block 2110) than the second state.

According to an example embodiment of the disclosure, the lock (e.g., the lock 2130) may be positioned in the block (e.g., the second block 2110) to be linearly movable with respect to the block in the same direction as the direction in which the second housing (e.g., the second housing 1920) slides with respect to the first housing (e.g., the first housing 1910). The hook (e.g., the hook 2120) may be positioned in the block to be movable with respect to the block in a direction perpendicular to the direction in which the second housing slides with respect to the first housing.

According to an example embodiment of the disclosure, the slidable electronic device may further include a multi-bar (e.g., the display support structure 2420) disposed on the rear surface of the second area (e.g., the second area ⓑ) of the flexible display module (e.g., the flexible display module 24). The slidable electronic device may further include a first guide rail (e.g., the first guide rail 41) disposed at one side of the second housing. One side part of the multi-bar may be inserted into the first guide rail. The slidable electronic device may further include a second guide rail (e.g., the second guide rail 42 or 1942) disposed at the other side of the second housing. The other side part of the multi-bar may be inserted into the second guide rail.

According to an example embodiment of the disclosure, the hook fastening groove (e.g., the hook fastening groove 2310B) may include a first inner surface (e.g., the first inner surface 2310C) and a second inner surface (e.g., the second inner surface 2310D) positioned opposite to the first inner surface. The first inner surface may be configured to interfere with the hook (e.g., the hook 2120) inserted into the hook fastening groove so that the second housing does not move in a direction in which the second housing (e.g., the second housing 1920) slides in with respect to the first housing (e.g., the first housing 1910) in the first state. The hook may be linearly moved with respect to the block and then positioned, due to an interaction between the hook and an inclination surface provided by the second inner surface when being switched from the first state to the second state.

According to an example embodiment of the disclosure, the slidable electronic device may further include an LM guide (e.g., the LM guide 2001) configured to connect the first housing (e.g., the first housing 1910) and the second housing (e.g., the second housing 1920). The hook assembly (e.g., the hook assembly 2101) may be disposed on the LM guide.

According to an example embodiment of the disclosure, the LM guide (e.g., the LM guide 2001) may include a guide rail (e.g., the rail 2010) connected to the first housing (e.g., the first housing 1910), a guide block (e.g., the first block 2020) disposed in the second housing (e.g., the second housing 1920) and slidably connected to the guide rail, and a bearing placed between the guide rail and the guide block. The block (e.g., the second block 2110) of the hook assembly (e.g., the hook assembly 2101) may be connected to or integrally provided on the guide rail.

According to an example embodiment of the disclosure, the slidable electronic device may further include at least one compression spring (e.g., the first compression spring 2151) positioned between the block (e.g., the second block 2110) and the hook (e.g., the hook 2120), and at least one compression spring (e.g., the second compression spring 2152) positioned between the block and the lock (e.g., the lock 2130).

According to an example embodiment of the disclosure, the slidable electronic device may further include a multi-bar (e.g., the display support structure 2420) disposed on the rear surface of the second area (e.g., the second area ⓑ of the flexible display module (e.g., the flexible display module 24). The slidable electronic device may further include a first guide rail (e.g., the first guide rail 41) disposed at one side of the second housing (e.g., the second housing 1920). One side part of the multi-bar may be inserted into the first guide rail. The slidable electronic device may further include a second guide rail (e.g., the second guide rail 42 or 1942) disposed at the other side of the second housing. The other side part of the multi-bar may be inserted into the second guide rail. When the second housing slides in with respect to the first housing (e.g., the first housing 1910), at least a part of the second area of the flexible display module may be inserted into a space between the second housing and the third housing (e.g., the third housing 1930).

Embodiments disclosed in the disclosure and the drawings are merely specific examples presented to easily describe the technical content and to help understanding of embodiments, and are not intended to limit the scope of embodiments. Accordingly, in connection with a scope of various embodiments of the disclosure, the scope of various embodiments of the disclosure is to be interpreted to include not only embodiments disclosed herein but also changed or modified forms thereof.

The invention claimed is:

1. A slidable electronic device (2) comprising:

a flexible display module (24);

a first housing (21) in which a first area of the flexible display module (24) is disposed;

a second housing (22) configured to be slidable with respect to the first housing (21) and support a second area of the flexible display module (24); and a hook assembly (901) positioned in the second housing (22), wherein the hook assembly (901) comprises:

a block (910) disposed in the second housing (22);

a hook (920) positioned in the block so as to be linearly movable with respect to the block (910); and a lock (930) positioned in the block (910) so as to be linearly movable in a direction perpendicular to the movement direction of the hook (920) with respect to the block (910), wherein in a first state where the second housing (22) is slid out with respect to the first housing (21) by a first distance, the hook (920) is inserted into a hook fastening groove (1212) provided on the first housing (21), and wherein in a second state where the second housing (22) is further slid out with respect to the first housing (21) by a second distance in the first state, the hook (920) is separated from the hook fastening groove (1212), and the lock (930) is fastened to a recess (924) provided on the hook (920) so as to fix the position of the hook (920).

2. The slidable electronic device of the claim 1, wherein in a third state where the second housing (22) is slid in with respect to the first housing (21), the lock (930) is pressed by the first housing (21) and thus separated from the recess (924), and wherein in the third state, the hook (920) is positioned at a position further moved with respect to the block (910) than the second state.

3. The slidable electronic device of the claim 1, wherein the lock (930) is positioned in the block (910) to be linearly movable with respect to the block (910) in the same direction as the direction in which the second housing (22) slides with respect to the first housing (21), and wherein the hook (920) is positioned in the block (910) to be movable with respect to the block (910) in a direction perpendicular to the direction in which the second housing (22) slides with respect to the first housing (21).

4. The slidable electronic device of the claim 1, wherein the hook fastening groove (1212) comprises a first inner surface (1212*a*) and a second inner surface (1212*b*) positioned opposite to the first inner surface (1212*a*), wherein the first inner surface (1212*a*) is configured to interfere with the hook (920) inserted into the hook fastening groove (1212) so that the second housing (22) does not move in a direction in which the second housing (22) slides in with respect to the first housing (21) in the first state, and wherein the hook (920) is linearly moved with respect to the block (910) and then positioned, due to an interaction between the hook (920) and an inclination surface provided by the second inner surface (1212*b*) when being switched from the first state to the second state.

5. The slidable electronic device of the claim 1, wherein the first housing (21) comprises a side wall (202) extending in a direction in which the second housing (22) slides out with respect to the first housing (21) from a first end to a second end thereof, and wherein the hook assembly (901) is positioned to correspond to the side wall (202), and the side wall (202) is configured to provide the hook fastening groove (1212).

6. The slidable electronic device of the claim 1, comprising a motor (431) configured to provide power for sliding the second housing (22) with respect to the first housing (21), wherein the motor (431) is positioned in the second housing (22), wherein the first housing (21) comprises a side wall (202) extending in a direction in which the second housing (22) slides out with respect to the first housing (21) from a first end to a second end thereof, and wherein the hook assembly (901) is positioned between the motor (431) and the side wall (202) to correspond to the side wall (202), and the side wall (202) is configured to provide the hook fastening groove (1212).

7. The slidable electronic device of the claim 1, further comprising at least one compression spring (951, 952) positioned between the block (910) and the hook (920), and/or further comprising at least one compression spring (953) positioned between the block (910) and the lock (930).

8. The slidable electronic device of the claim 1, further comprising:

a multi-bar (2420) disposed on the rear surface of the second area of the flexible display module (24);

a first guide rail (41) which is disposed at one side of the second housing (22) and into which one side part of the multi-bar (2420) is inserted; and a second guide rail (42) which is disposed at the other side of the second housing (22) and into which the other side part of the multi-bar (2420) is inserted.

9. The slidable electronic device of the claim 1, further comprising a third housing (23) configured to accommodate the second housing (22) and connected to the second housing (22), wherein in case that the second housing (22) slides in with respect to the first housing (21), at least a part of the second area of the flexible display module (24) is inserted into a space between the second housing (22) and the third housing (23).

10. A slidable electronic device (1900) comprising:

a flexible display module (24);

a first housing (1910) in which a first area of the flexible display module (24) is disposed;

a second housing (1920) configured to be slidable with respect to the first housing (1910) and support a second area of the flexible display module (24);

a third housing (1930) configured to accommodate the second housing (1920) and coupled to the second housing (1920), and a hook assembly (2101) connected to the first housing (1910), wherein the hook assembly (2101) comprises:

a block (2110) disposed in the second housing (1920);

a hook (2120) positioned in the block (2110) so as to be linearly movable with respect to the block (2110); and a lock (2130) positioned in the block (2110) so as to be linearly movable in a direction perpendicular to the movement direction of the hook (2120) with respect to the block (2110), wherein in a first state where the second housing (1920) is slid out with respect to the first housing (1910) by a first distance, the hook (2120) is inserted into a hook fastening groove (2310B) provided on the second housing (1920) or a member positioned between the second housing (1920) and the third housing (1930), and wherein in a second state where the second housing (1920) is further slid out with respect to the first housing (1910) by a second distance in the first state, the hook (2120) is separated from the hook fastening groove (2310B), and the lock (2130) is fastened to a recess (2124) provided on the hook (2120) so as to fix the position of the hook (2120).

11. The slidable electronic device of the claim 10, wherein in a third state where the second housing (1920) is slid in with respect to the first housing (1910), the lock (2130) is pressed by the third housing (1930) and thus separated from the recess (2124), and wherein in the third state, the hook (2120) is positioned at a position further moved with respect to the block (2110) than the second state.

12. The slidable electronic device of the claim 10, wherein the lock (2130) is positioned in the block (2110) to be linearly movable with respect to the block (2110) in the same direction as the direction in which the second housing (1920) slides with respect to the first housing (1910), and wherein the hook (2120) is positioned in the block (2110) to be movable with respect to the block (2110) in a direction perpendicular to the direction in which the second housing (1920) slides with respect to the first housing (1910).

13. The slidable electronic device of the claim 10, further comprising:

a multi-bar (2420) disposed on the rear surface of the second area of the flexible display module (24);

a first guide rail (41) which is disposed at one side of the second housing (1920) and into which one side part of the multi-bar (2420) is inserted; and a second guide rail (42; 1942) which is disposed at the other side of the second housing (1920) and into which the other side part of the multi-bar (2420) is inserted, wherein the first guide rail (41) or the second guide rail (42; 1942) is configured to provide the hook fastening groove (2310B).

14. The slidable electronic device of the claim 11, wherein the hook fastening groove (2310B) comprises a first inner surface (2310C) and a second inner surface (2310D) positioned opposite to the first inner surface (2310C);

wherein the first inner surface (2310C) is configured to interfere with the hook (2120) inserted into the hook fastening groove (2310B) so that the second housing (1920) does not move in a direction in which the second housing (1920) slides in with respect to the first housing (1910) in the first state, and wherein the hook (2120) is linearly moved with respect to the block (2110) and then positioned, due to an interaction between the hook (2120) and an inclination surface provided by the second inner surface (2310B) when being switched from the first state to the second state.

15. The slidable electronic device of the claim 11, further comprising a linear motion (LM) guide (2001) configured to connect the first housing (1910) and the second housing (1920), wherein the hook assembly (2101) is disposed on the LM guide (2001), wherein the LM guide (2001) comprises a guide rail (2010) connected to the first housing (1910), a guide block (2020) disposed in the second housing (1920) and slidably connected to the guide rail (2010), and a bearing placed between the guide rail (2010) and the guide block (2020), and wherein the block (2110) of the hook assembly (2101) is connected to or integrally provided on the guide rail (2010).

16. The slidable electronic device of the claim 11, further comprising:

at least one compression spring (2151) positioned between the block (2110) and the hook (2120); and at least one compression spring (2152) positioned between the block (2110) and the lock (2130).

17. The slidable electronic device of the claim 11, further comprising:

a multi-bar (2420) disposed on the rear surface of the second area of the flexible display module (24);

a first guide rail (41) which is disposed at one side of the second housing (1920) and into which one side part of the multi-bar (2420) is inserted; and a second guide rail (42; 1942) which is disposed at the other side of the second housing (1920) and into which the other side part of the multi-bar (2420) is inserted, wherein in case that the second housing (1920) slides in with respect to the first housing (1910), at least a part of the second area of the flexible display module (24) is inserted into a space between the second housing (1920) and the third housing (1930).

* * * * *